(12) United States Patent
Kalra et al.

(10) Patent No.: US 11,295,475 B2
(45) Date of Patent: Apr. 5, 2022

(54) SYSTEMS AND METHODS FOR POSE DETECTION AND MEASUREMENT

(71) Applicant: BOSTON POLARIMETRICS, INC., Palo Alto, CA (US)

(72) Inventors: Agastya Kalra, Nepean (CA); Achuta Kadambi, Los Altos Hills, CA (US); Kartik Venkataraman, San Jose, CA (US); Vage Taamazyan, Moscow (RU)

(73) Assignee: BOSTON POLARIMETRICS, INC., Palo Alto, CA (US)

( * ) Notice: Subject to any disclaimer, the term of this patent is extended or adjusted under 35 U.S.C. 154(b) by 0 days.

(21) Appl. No.: 17/420,992

(22) PCT Filed: Jan. 29, 2021

(86) PCT No.: PCT/US2021/015926
§ 371 (c)(1),
(2) Date: Jul. 6, 2021

(87) PCT Pub. No.: WO2021/155308
PCT Pub. Date: Aug. 5, 2021

(65) Prior Publication Data
US 2022/0044441 A1    Feb. 10, 2022

Related U.S. Application Data

(60) Provisional application No. 63/001,445, filed on Mar. 29, 2020, provisional application No. 62/968,038, filed on Jan. 30, 2020, provisional application No. 62/967,487, filed on Jan. 29, 2020.

(51) Int. Cl.
*G06T 7/73* (2017.01)

(52) U.S. Cl.
CPC ..................................... *G06T 7/75* (2017.01)

(58) Field of Classification Search
CPC ............... G06T 7/70; G06T 7/73; G06T 7/75
See application file for complete search history.

(56) References Cited

U.S. PATENT DOCUMENTS

| 8,837,839 B1 | 9/2014 | Huber et al. |
| 2007/0122001 A1 | 5/2007 | Wang et al. |

(Continued)

OTHER PUBLICATIONS

International Search Report and Written Opinion for International Application No. PCT/US21/15926, dated Jun. 9, 2021, 11 pages.

(Continued)

*Primary Examiner* — Sam Bhattacharya
(74) *Attorney, Agent, or Firm* — Lewis Roca Rothgerber Christie LLP

(57) ABSTRACT

A method for estimating a pose of an object includes: receiving a plurality of images of the object captured from multiple viewpoints with respect to the object; initializing a current pose of the object based on computing an initial estimated pose of the object from at least one of the plurality of images; predicting a plurality of 2-D keypoints associated with the object from each of the plurality of images; and computing an updated pose that minimizes a cost function based on a plurality of differences between the 2-D keypoints and a plurality of 3-D keypoints associated with a 3-D model of the object as arranged in accordance with the current pose, and as projected to each of the viewpoints.

2 Claims, 26 Drawing Sheets

(56) References Cited

U.S. PATENT DOCUMENTS

2013/0051626 A1    2/2013   Abadpour et al.
2016/0335486 A1   11/2016   Fleishman et al.

OTHER PUBLICATIONS

Ba et al. "Physics-based Neural Networks for Shape from Polarization," In: Cornell University Library/Computer Science/Computer Vision and Pattern Recognition, Mar. 25, 2019, [online] [retrieved on May 25, 2021, retrieved from the internet <URL: https://arxiv.org/abs/1903. 10210>, entire document.

Cui et al. "Polarimetric Relative Pose Estimation," In: 2019 IEEE/CVF International Conference on Computer Vision, Oct. 27- Nov. 2, 2019, [online] [retrieved on May 25, 2021, retrieved from the internet <URL: 10.1109/ICCV.2019.00276>, entire document.

Acuna, David et al. "Devil is in the Edges: Learning Semantic Boundaries from Noisy Annotations," Proceedings of the IEEE/CVF Conference on Computer Vision and Pattern Recognition, 2019, pp. 11075-11083.

An, Gwon Hwan, et al. "Charuco Board-Based Omnidirectional Camera Calibration Method." *Electronics* 7.12 (2018): 421, 15 pages.

Atkinson, Gary A. et al. "Recovery of Surface Orientation From Diffuse Polarization" IEEE Transactions On Image Processing, vol. 15, No. 6, Jun. 2006, pp. 1653-1664.

Chen, Tian Qi et al., "Fast Patch-based Style Transfer of Arbitrary Style," arXiv:1612.04337v1 [cs.CV], 2016, 10 pages.

Collet, A., et al., "The MOPED framework: Object Recognition and Pose Estimation for Manipulation," The International Journal of Robotics Research 30(10) (2011), 22 pages.

Collet, A., et al., "Efficient Multi-View Object Recognition and Full Pose Estimation," In: 2010 IEEE International Conference on Robotics and Automation.(May 2010), 6 pages.

Deng, Jia et al. "ImageNet: A Large-Scale Hierarchical Image Database" *IEEE Computer Vision and Pattern Recognition (CVPR)*, 2009, 8 pages.

Dundar, Aysegul, et al., "Domain Stylization: A Strong, Simple Baseline for Synthetic to Real Image Domain Adaptation," arXiv:1807.09384v1 [cs.CV] 2018, 10 pages.

Fieraru, Mihai, et al. "Learning to Refine Human Pose Estimation," *Proceedings of the IEEE conference on computer vision and pattern recognition workshops.* 2018, pages 318-327.

Garrido-Jurado, Sergio, et al. "Automatic generation and detection of highly reliable fiducial markers under occlusion." *Pattern Recognition* 47.6 (2014): 390-402.

He, Kaiming, et al. "Mask R-CNN." *Proceedings of the IEEE International Conference on Computer Vision.* 2017, pp. 2961-2969.

He, Kaiming et al., Deep Residual Learning for Image Recognition. In Proceedings of the IEEE Conference on Computer Vision and Pattern Recognition, pp. 770-778, 2016.

Howard, Andrew, et al. "Searching for MobileNetV3." Proceedings of the IEEE International Conference on Computer Vision. 2019.

Howard, Andrew G., et al. "Mobilenets: Efficient convolutional neural networks for mobile vision applications." arXiv preprint arXiv: 1704.04861 (2017).

Karras, Tero, et al. "Analyzing and Improving the image Quality of StyleGAN," *Proceedings of the IEEE/CVF Conference on Computer Vision and Pattern Recognition*, 2020, pp. 8110-8119.

Krizhevsky, Alex, Ilya Sutskever, and Geoffrey E. Hinton. "ImageNet classification with deep convolutional neural networks." Advances in neural information processing systems. 2012.

Labbé, Yann, et al. "CosyPose: Consistent multi-view multi-object 6D pose estimation," *European Conference on Computer Vision.* Springer, Cham, 2020, 41 pages.

Li, Chi, et al., "A Unified Framework for Multi-View Multi-Class Object Pose Estimation," In: Proceedings of the European Conference on Computer Vision(ECCV) (2018), 16 pages.

Peng, Sida, et al., "PVNet: Pixel-wise Voting Network for 6D0F Pose Estimation," *Proceedings of the IEEE/CVF Conference on Computer Vision and Pattern Recognition.* 2019, pp. 4561-4570.

Ronneberger, Olaf, et al. "U-Net: Convolutional Networks for Biomedical Image Segmentation." *International Conference on Medical Image Computing and Computer-Assisted Intervention.* Springer, Cham, 2015, pp. 1-8.

Sheng, Lu, et al., "A Generative Model for Depth-based Robust 3D Facial Pose Tracking," *Proceedings of the IEEE Conference on Computer Vision and Pattern Recognition.* 2017, pp. 4488-4497.

Sandler, Mark, et al. "MobileNetV2: Inverted residuals and linear bottlenecks." Proceedings of the IEEE Conference on Computer Vision and Pattern Recognition. 2018.

Simonyan, Karen, and Andrew Zisserman. "Very deep convolutional networks for large-scale image recognition." arXiv preprint arXiv: 1409.1556 (2014).

Smirnov, Evgeny et al., "Hard Example Mining with Auxiliary Embeddings," Proceedings of the IEEE Conference on Computer Vision and Pattern Recognition Workshops, 2018, pp. 37-46.

Sofiiuk, Konstantin et al., "AdaptIS: Adaptive Instance Selection Network".

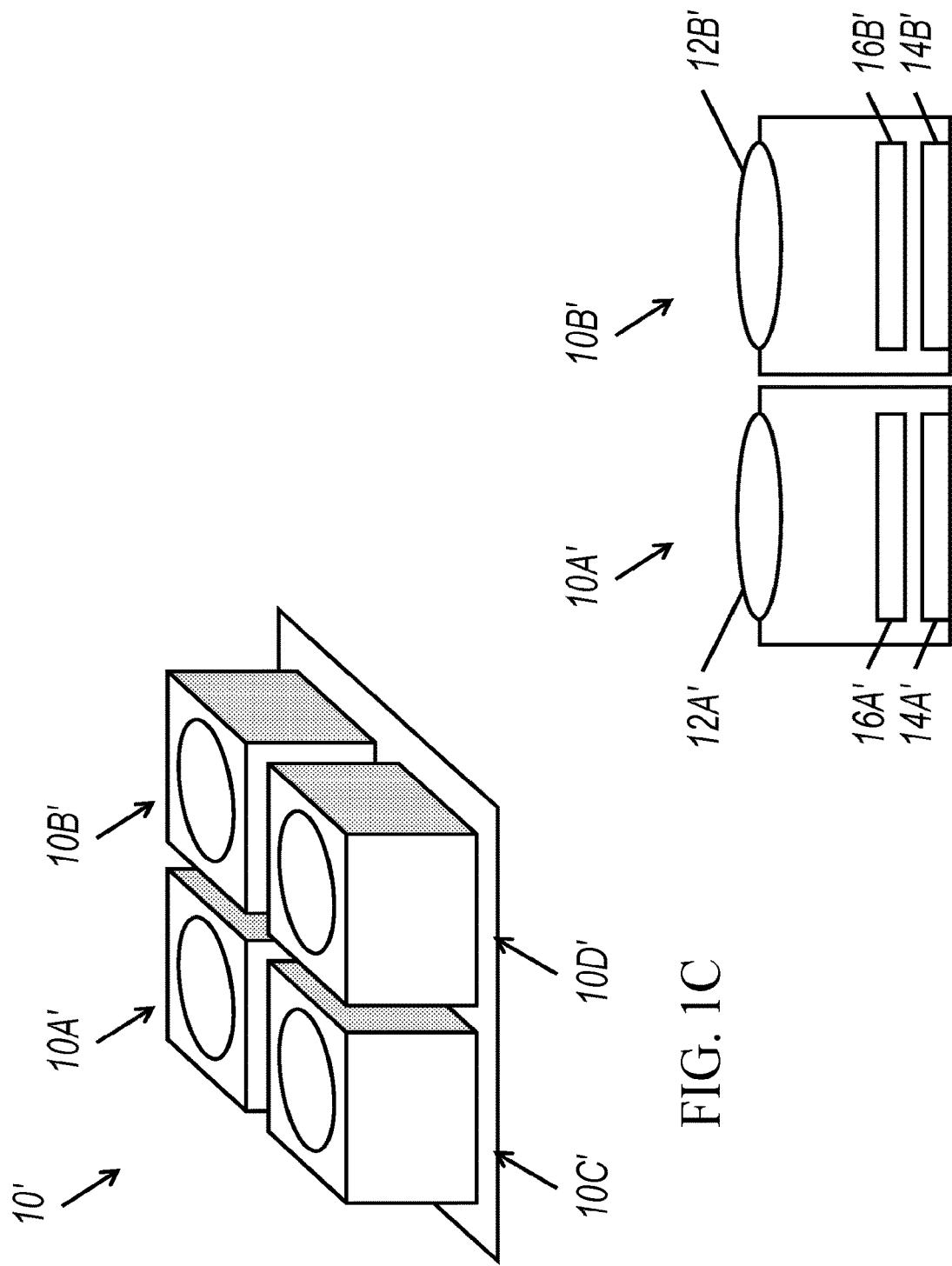

SYSTEMS AND METHODS FOR POSE DETECTION AND MEASUREMENT

CROSS-REFERENCE TO RELATED APPLICATIONS

This application is a U.S. National Phase Patent Application of International Application Number PCT/US2021/015926 filed on Jan. 29, 2021, which claims priority to and the benefit of U.S. Provisional Patent Application No. 62/967,487, filed in the United States Patent and Trademark Office on Jan. 29, 2020, U.S. Provisional Patent Application No. 62/968,038, filed in the United States Patent and Trademark Office on Jan. 30, 2020, and U.S. Provisional Patent Application No. 63/001,445, filed in the United States Patent and Trademark Office on Mar. 29, 2020, the entire disclosures of which are incorporated by reference herein.

FIELD

Aspects of embodiments of the present disclosure relate to the field of sensors, in particular systems and methods for performing measurements of the poses, such as positions and orientations, of objects in a scene.

BACKGROUND

In many areas of automation, such as robotics, sensors are used to determine the physical relationship of objects in the real world. For example, robotic systems often use sensing systems to measure the locations of various physical objects in order to, for example, grasp an object that may arrive at a variety of orientations, reorient the object into a desired position, and connect the object to another object. The position and orientation of an object with respect to a reference coordinate system may be referred to as a "pose" and, in a three-dimensional coordinate system, generally includes six degrees of freedom-rotation around three axes and translation along the three axes.

SUMMARY

Aspects of embodiments of the present disclosure relate to the field of sensors, in particular systems and methods for performing measurements of the poses of objects in a scene.

According to one embodiment of the present disclosure, a method for estimating a pose of an object includes: receiving a plurality of images of the object captured from multiple viewpoints with respect to the object; initializing a current pose of the object based on computing an initial estimated pose of the object from at least one of the plurality of images; predicting a plurality of 2-D keypoints associated with the object from each of the plurality of images; and computing an updated pose that minimizes a cost function based on a plurality of differences between the 2-D keypoints and a plurality of 3-D keypoints associated with a 3-D model of the object as arranged in accordance with the current pose, and as projected to each of the viewpoints.

Each of the plurality of differences may correspond to a different viewpoint of the viewpoints, and each of the differences may be computed for a viewpoint of the viewpoints based on a difference between: the plurality of 2-D keypoints associated with an image of the plurality of images corresponding to the viewpoint; and projecting the 3-D keypoints of the 3-D model arranged in the current pose to the viewpoint.

The cost function may be:

$$\min_{R_o, T_o} \sum_{i:N, j:M} c_{ij} \| [u_{ij}, v_{ij}] - K_j [R_j T_j][R_o T_o][x_i, y_i, z_i] \|$$

wherein $R_o, T_o$ is the pose of the object, i is an index iterating through N 3-D keypoints, j is an index iterating through M viewpoints, $c_{ij}$ is a confidence for a corresponding keypoint prediction $[u_{ij}, v_{ij}]$ of an i-th keypoint in an image for corresponding to a j-th viewpoint, $R_j, T_j, K_j$ are extrinsic parameters and intrinsic parameters of a j-th camera used to capture an image from a j-th viewpoint, and $[x_i, y_i, z_i]$ is an i-th 3-D keypoint.

The cost function may further accounts for symmetries in the object in accordance with:

$$\min_{R_o, T_o} \sum_{i:N, j:M} \min_{S \sim v_j} c_{ij} \| [u_{ij}, v_{ij}] - K_j S[R_j T_j][R_o T_o][x_i, y_i, z_i] \|$$

wherein $R_o, T_o$ is the pose of the object, i is an index iterating through N 3-D keypoints, j is an index iterating through M viewpoints, $c_{ij}$ is a confidence for a corresponding keypoint prediction $[u_{ij}, v_{ij}]$ of an i-th keypoint in an image from a j-th viewpoint, $R_j, T_j, K_j$ are extrinsic parameters and intrinsic parameters of the j-th camera used to capture the images from a j-th viewpoint, $[x_i, y_i, z_i]$ is an i-th 3-D keypoint, S is a transform between different symmetries of the object, and $v_j$ is the j-th view.

The predicting the plurality of 2-D keypoints may be performed using a deep learning keypoint detector.

The images may include polarization information, and the deep learning keypoint detector may be configured to compute predicted 2-D keypoints based on the polarization information of the images.

The deep learning keypoint detector may be trained based on synthesized training data including synthesized polarization information and synthesized keypoint labels.

The images may include polarization information, and the method may further include refining the updated pose by aligning the 3-D model with the polarization information.

The refining the updated pose may include: detecting one or more edges of the object in the images to generate one or more measured edge images; detecting correspondences between the one or more measured edges rendered edge images of the 3-D model arranged in the current pose; and iteratively refining the updated pose using multi-view perspective-n-point based on the detected correspondences.

The edges may be detected by: computing surface normals based on the polarization information; and detecting edges of the object at discontinuities in the surface normals.

The edges may be detected by: computing a plurality of instance segmentation maps from the images; and detecting edges of the object at boundaries of instances of the object in the instance segmentation maps.

The refining the updated pose may include: computing measured surface normals of the object based on the polarization information; placing the 3-D model of the object based on the updated pose; and iteratively updating the pose of the 3-D model to align the surface normals of the 3-D model with the measured surface normals.

According to one embodiment of the present disclosure, a computer-implemented method for processing images includes: receiving, by a computing system, a first image and a second image; invoking, by the computing system, a neural network and detecting a first instance of an object in the first image and a second instance of the object in the second image; determining a first region of the first instance of the object in the first image, and a second region of the second instance of the object in the second image; determining correspondence between the first instance of the object in the first region and the second instance of the object in the second region; and generating an output based on the determining of the correspondence.

The method may further include: generating a first segmentation mask based on determining the first region of the first instance of the object, and generating a second segmentation mask based determining the second region of the second instance of the object.

The method may further include: in response to determining correspondence between the first instance of the object in the first region and the second instance of the object in the second region, limiting a second processing task to the first region and the second region.

The second processing task may be for determining correspondence of one or more pixels in the first region to one or more pixels in the second region.

The second processing tasks may be for determining correspondence of one or more key-points in the first region to one or more keypoints in the second region.

The output may be a measure of disparity between the first image and the second image.

The output may be a three-dimensional relative pose between the first instance of the object and the second instance of the object.

The first image may be a first polarized image, and the first image may be captured by a polarization camera.

The first image may provide a first viewpoint of the object and the second image may provide a second viewpoint of the object different from the first viewpoint.

The determining correspondences between the first instance of the object in the first region and the second instance of the object in the second region may include: identifying an epipolar line associated with the first instance of the object; and constraining search of the second image along the epipolar line.

According to one embodiment of the present disclosure, a method for computing pose estimates of one or more objects in a scene includes: capturing a plurality of images of one or more objects in a scene from a plurality of viewpoints; performing instance segmentation on the images to compute a plurality of instance segmentation maps of one or more detected objects in the scene; computing one or more estimated depths of the one or more objects by matching instance segmentations between the instance segmentation maps; and estimating the poses of the one or more objects in accordance with multi-view joint optimization of a plurality of keypoints for each of the one or more detected objects based on the plurality of images across the plurality of viewpoints. The instance segmentation may be performed using the methods of instance segmentation in any of the above paragraphs.

The estimating the poses may include, for each of the one or more detected objects in the scene, providing regions of the images corresponding to a same one of the detected objects to the methods described above.

According to one embodiment of the present disclosure, a system includes: a main camera; one or more support cameras spaced apart from the main camera, the main camera and the one or more support cameras having overlapping fields of view; and a pose estimator including a processor and memory, the memory storing instructions that, when executed by the processor, cause the processor to control the main camera, the one or more support cameras and to perform the methods of any of the above.

The main camera and the one or more support cameras may form a passive camera system.

The system may further include an active projector configured to project structured light in an area within the overlapping fields of view of the main camera and the support cameras.

According to one embodiment of the present disclosure, a method for automatically calibrating a camera system in accordance with the above includes: receiving a plurality of images of an object in the overlapping fields of view of the main camera and the one or more support cameras, the images being captured from multiple viewpoints with respect to the object; initializing a current pose of the object based on computing an initial estimated pose of the object from at least one of the plurality of images; predicting a plurality of 2-D keypoints associated with the object from each of the plurality of images; and computing an updated pose of the object and updated viewpoints of the main camera and the one or more support camera that minimize a cost function based on a plurality of differences between the 2-D keypoints and a plurality of 3-D keypoints associated with a 3-D model of the object as arranged in accordance with the current pose, and as projected to each of the viewpoints.

The cost function may be:

$$\min_{R_o, T_o} \min_{R_j, T_j, K_j} \sum_{i:N, j:M} \min_{S \sim v_j} \|[u_{ij}, v_{ij}] - K_j[R_j T_j][R_o T_o][x_i, y_i, z_i]\|$$

wherein $R_o, T_o$ is the pose of the object, i is an index iterating through N 3-D keypoints, j is an index iterating through M viewpoints, $c_{ij}$ is a confidence for a corresponding keypoint prediction $[u_{ij}, v_{ij}]$ of an i-th keypoint in an image for corresponding to a j-th viewpoint, $R_j, T_j, K_j$ are extrinsic parameters and intrinsic parameters of the j-th camera used to capture an image from a j-th viewpoint, and $[x_i, y_i, z_i]$ is an i-th 3-D keypoint.

BRIEF DESCRIPTION OF THE DRAWINGS

The accompanying drawings, together with the specification, illustrate exemplary embodiments of the present invention, and, together with the description, serve to explain the principles of the present invention.

FIG. 1C is a perspective view of a polarization camera module according to one embodiment of the present disclosure.

FIG. 1D is a cross sectional view of a portion of a polarization camera module according to one embodiment of the present disclosure.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein.

Pose estimation generally refers to a computer vision technique for estimating or predicting the location and orientation of objects. Some forms of pose estimation refer to detecting the physical pose of a human figure, such as the position and orientation of a person's head, arms, legs, and joints. Pose estimation may also refer more generally to the position and orientation of various animate or inanimate physical objects in a scene. For example, autonomously navigating robots may maintain information regarding the physical poses of objects around them in order to avoid collisions and to predict trajectories of other moving objects. As another example, in the case of robotics for use in manufacturing, pose estimation may be used by robots to detect the position and orientation of physical manufacturing components, such that a robot arm can approach the component from the correct angle to obtain a proper grip on the part for assembly with other components of a manufactured product (e.g., gripping the head of a screw and threading the screw into a hole, whereas gripping a screw by the tip would make it difficult to insert into a hole).

Aspects of embodiments of the present disclosure relate to systems and methods for automated six degree of freedom (6-DoF) estimation of a wide variety of objects in a scene. The six degrees of freedom in three dimensional space include positional coordinates (e.g., x, y, and z translational coordinates in a three-dimensional global coordinate system) and orientation coordinates (e.g., θ, ϕ, and ψ rotational coordinates in the three-dimensional coordinate system).

Some aspects of embodiments of the present disclosure relate to particular techniques for performing 6-DoF estimation to compute the pose of a single object or the poses of multiple objects in a cluttered bin of those objects. Many objects have different bi-directional reflectance distribution functions (BRDF), making a single framework for 6DoF estimation difficult to achieve with comparative methods such as depth capture. To address this, some aspects of embodiments of the present disclosure relate to computing pose estimates or measurements using simulation, physics-based learning, and multi-view geometry to estimate the pose of any object imaged by an imaging system according to embodiments of the present disclosure.

Figure 1A:
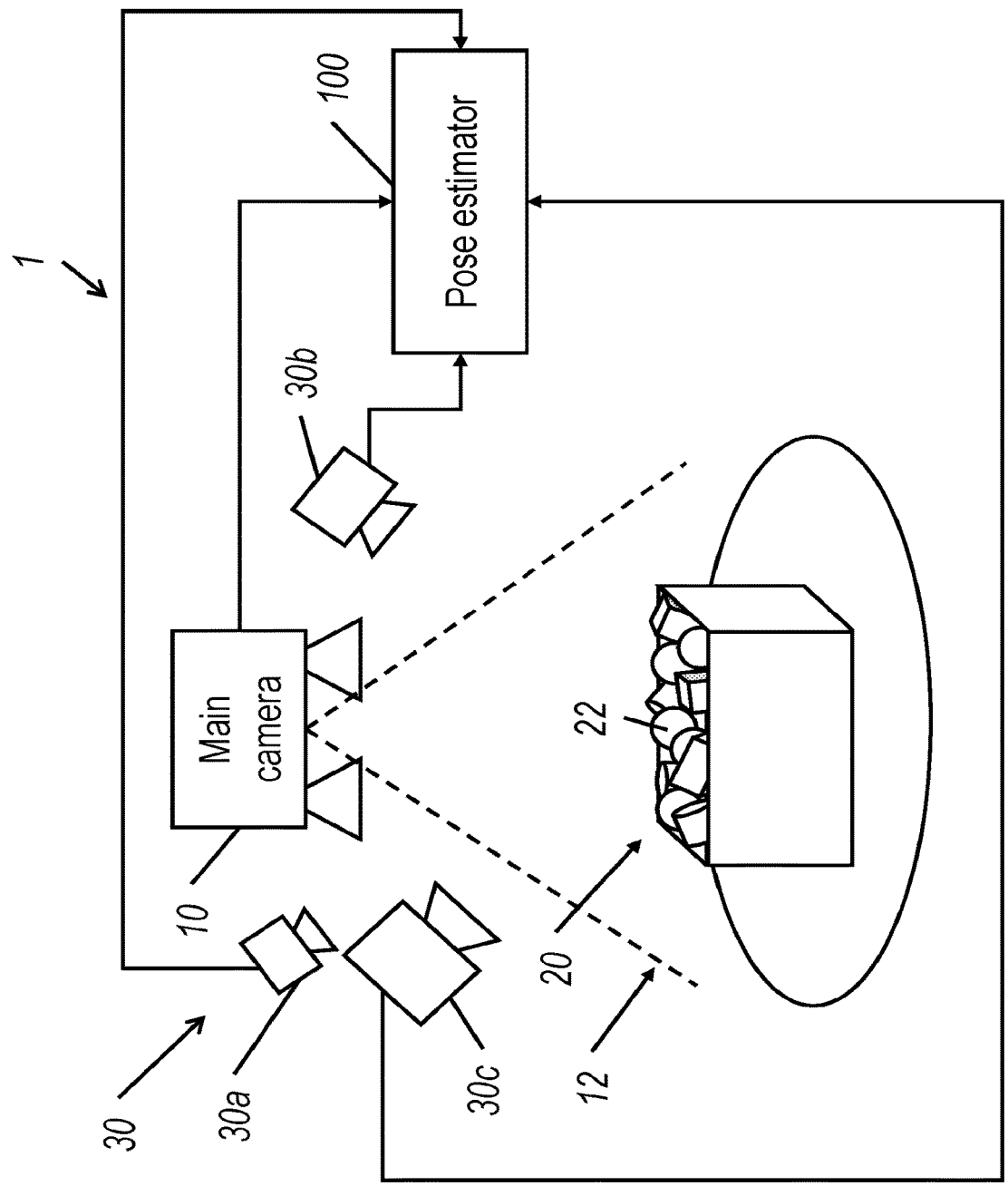
FIG. 1A is a schematic diagram depicting a pose estimation system according to one embodiment of the present disclosure.

FIG. 1A is a schematic diagram depicting a pose estimation system 1 according to one embodiment of the present disclosure. As shown in FIG. 1A, a main camera 10 is arranged such that its field of view 12 captures an arrangement 20 of objects 22 in a scene. In the embodiment shown in FIG. 1A, the main camera 10 is located above the support platform 40 (e.g., spaced apart from the objects 22 along the direction of gravity), but embodiments of the present disclosure are not limited thereto—for example, the pose estimator may be arranged to have a downward angled view of the objects 22.

In some embodiments, one or more support cameras 30 are arranged at different poses around the scene containing the arrangement 20 of objects 22. Accordingly, each of the support cameras 30, e.g., first support camera 30a, second support camera 30b, and third support camera 30c, captures a different view of the objects 22 from a different view point (e.g., a first viewpoint, a second viewpoint, and a third viewpoint, respectively). While FIG. 1A shows three support cameras 30, embodiments of the present disclosure are not limited thereto and may include, for example, at least one support camera 30 and may include more than three support cameras 30.

The support platform 40 may be any surface supporting the objects 22, such as a benchtop, tabletop, conveyor belt, or the like. A support platform 40 is not required, and the objects 22 or object 22 whose pose may be estimated by the pose estimator system may be supported by other devices, such as a movable arm of a robot, an overhead conveyor system, or the like.

A pose estimator 100 according to various embodiments of the present disclosure is configured to compute or estimate poses of the objects 22 based on information captured by the main camera 10 and the support cameras 30.

In more detail, the main camera 10 and the support cameras 30 are configured to estimate the poses of objects 22 detected within their fields of view 12. In the embodiment shown in FIG. 1A, the objects 22 are depicted abstractly as simple three-dimensional solids such as spheres, rectangular prisms, and cylinders. However, embodiments of the present disclosure are not limited thereto and characterization of pose estimators may be performed using any arbitrary object for which a pose with respect to a camera can be clearly defined.

In particular, a "pose" refers to the position and orientation of an object with respect to a reference coordinate system. For example, a reference coordinate system may be defined with the main camera 10 at the origin, where the direction along the optical axis of the main camera 10 (e.g., a direction through the center of its field of view 12) is defined as the z-axis of the coordinate system, and the x and y axes are defined to be perpendicular to one another and perpendicular to the z-axis. (Embodiments of the present disclosure are not limited to this particular coordinate system, and a person having ordinary skill in the art would understand that poses can be mathematically transformed to equivalent representations in different coordinate systems.)

Each object 22 may also be associated with a corresponding coordinate system of its own, which is defined with respect to its particular shape. For example, a rectangular prism with sides of different lengths may have a canonical coordinate system defined where the x-axis is parallel to its shortest direction, z-axis is parallel to its longest direction, the y-axis is orthogonal to the x-axis and z-axis, and the origin is located at the centroid of the object 22.

Generally, in a three-dimensional coordinate system, objects 22 have six degrees of freedom-rotation around three axes (e.g., rotation around x-, y-, and z-axes) and translation along the three axes (e.g., translation along x-, y-, and z-axes). For the sake of clarity, symmetries of the objects 22 will not be discussed in detail herein, but may be addressed, for example, by identifying multiple possible poses with respect to different symmetries (e.g., in the case of selecting the positive versus negative directions of the z-axis of a right rectangular prism), or by ignoring some rotational components of the pose (e.g., a right cylinder is rotationally symmetric around its axis).

In some embodiments, it is assumed that a three-dimensional (3-D) model or computer aided design (CAD) model representing a canonical or ideal version of each type of object 22 in the arrangement of objects 20 is available. For example, in some embodiments of the present disclosure, the objects 22 are individual instances of manufactured components that have a substantially uniform appearance from one component to the next. Examples of such manufactured components include screws, bolts, nuts, connectors, and springs, as well as specialty parts such electronic circuit components (e.g., packaged integrated circuits, light emitting diodes, switches, resistors, and the like), laboratory supplies (e.g. test tubes, PCR tubes, bottles, caps, lids, pipette tips, sample plates, and the like), and manufactured parts (e.g., handles, switch caps, light bulbs, and the like). Accordingly, in these circumstances, a CAD model defining the ideal or canonical shape of any particular object 22 in the arrangement 20 may be used to define a coordinate system for the object (e.g., the coordinate system used in the representation of the CAD model).

Based on a reference coordinate system (or camera space, e.g., defined with respect to the pose estimation system) and an object coordinate system (or object space, e.g., defined with respect to one of the objects), the pose of the object may be considered to be a rigid transform (rotation and translation) from object space to camera space. The pose of object 1 in camera space 1 may be denoted as $P_{c_1}^1$, and the transform from object 1 space to camera space may be represented by the matrix:

$$\begin{bmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{bmatrix}$$

where the rotation submatrix R:

$$R = \begin{bmatrix} R_{11} & R_{12} & R_{13} \\ R_{21} & R_{22} & R_{23} \\ R_{31} & R_{32} & R_{33} \end{bmatrix}$$

represents rotations along the three axes from object space to camera space, and the translation submatrix T:

$$T = \begin{bmatrix} T_1 \\ T_2 \\ T_3 \end{bmatrix}$$

represents translations along the three axes from object space to camera space.

If two objects—Object A and Object B—are in the same camera C coordinate frame, then the notation $P_{CA}$ is used to indicate the pose of Object A with respect to camera C and $P_{CB}$ is used to indicate the pose of Object B with respect to camera C. For the sake of convenience, it is assumed herein that the poses of objects are represented based on the reference coordinate system, so the poses of objects A and B with respect to camera space C may be denoted $P_A$ and $P_B$, respectively.

If Object A and Object B are actually the same object, but performed during different pose estimation measurements, and a residual pose $P_{err}$ or $P_{AB}$ ($P_{AB}=P_{err}$) is used to indicate a transform from pose $P_A$ to pose $P_B$, then the following relationship should hold:

$$P_A P_{err} = P_B \qquad (1)$$

and therefore $$P_{err} = P_A^{-1} P_B \qquad (2)$$

Ideally, assuming the object has not moved (e.g., translated or rotated) with respect to the pose estimator 10 between the measurements of pose estimates $P_A$ and $P_B$, then $P_A$ and $P_B$ should both be the same, and $P_{err}$ should be the identity matrix (e.g., indicating no error between the poses):

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

In a similar manner, the pose of a particular object can be computed with respect to views from two different cameras. For example, images of Object A captured by a main camera C can be used to compute the pose $P_{CA}$ of Object A with respect to main camera C. Likewise, images of Object A captured by a first support camera $S_1$ can be used to compute the pose $P_{S_1A}$ of object A with respect to the support camera $S_1$. If the relative poses of main camera C and support camera $S_1$ are known, then the pose $P_{S_1A}$ can be transformed to the coordinate system of the main camera C.

Ideally, assuming that the known relative poses of main camera C and support camera $S_1$ are accurate and the poses calculated based on the data captured by the two cameras is accurate, then $P_{CA}$ and $P_{S_1A}$ should both be the same, and $P_{err}$ should be the identity matrix (e.g., indicating no error between the poses):

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

Differences $P_{err}$ between the actual measured value as computed based on the estimates computed by the pose estimator 10 and the identity matrix may be considered to be errors:

$$R_{err} = \|R(P_{err})\| \qquad (3)$$

$$T_{err} = \|T(P_{err})\| \qquad (4)$$

where $R_{err}$ is the rotation error and $T_{err}$ is the translation error. The function R( ) converts $P_{err}$ into an axis-angle where the magnitude is the rotation difference, and the function T( ) extracts the translation component of the pose matrix.

The axis-angle representation from rotation matrix R is given by:

$$Tr(R) = 1 + 2\cos\theta \qquad (5)$$

$$|\theta| = \arccos\left(\frac{Tr(R) - 1}{2}\right) \qquad (6)$$

where Tr( ) denotes the matrix trace (the sum of the diagonal elements of the matrix), and θ represents the angle of rotation Some aspects of embodiments of the present disclosure relate to computing a high accuracy pose estimate of objects 22 in a scene based on a joint estimate of the poses the objects across the main camera 10 and the support cameras 30. Some aspects of embodiments of the present disclosure also relate to the calibration of camera systems based on computing joint estimates of poses of objects 22 within a scene.

Pose Estimation Hardware

In the embodiment shown in FIG. 1A, the pose estimation system 1 includes a main camera 10. and one or more support cameras 30. In some embodiments of the present disclosure, the main camera 10 includes a stereo camera. Examples of stereo cameras include camera systems that have at least two monocular cameras spaced apart from each other along a baseline, where the monocular cameras have overlapping fields of view and optical axes that are substantially parallel to one another. While embodiments of the present disclosure will be presented herein in embodiments where the main camera 10 and the support cameras 30 are passive cameras (e.g., that are not connected to a dedicated light projector and that instead use ambient lighting or other light sources), embodiments of the present disclosure are not limited thereto and may also include circumstances where one or more active light projector are included in the camera system, thereby forming an active camera system, where the active light projector may be configured to project structured light or a pattern onto the scene. The support cameras 30 may be stereo cameras, monocular cameras, or combinations thereof (e.g., some stereo support cameras and some monocular support cameras).

The main camera 10 and the support cameras 30 may use the same imaging modalities or different imaging modalities. Examples of imaging modalities include monochrome, color, infrared, ultraviolet, thermal, polarization, and combinations thereof.

FIGS. 1B, 1C, 1D, and 1E provide one example of a polarization camera system that may be used as a part of a main camera 10 according to some embodiments of the present disclosure.

Figure 1B:
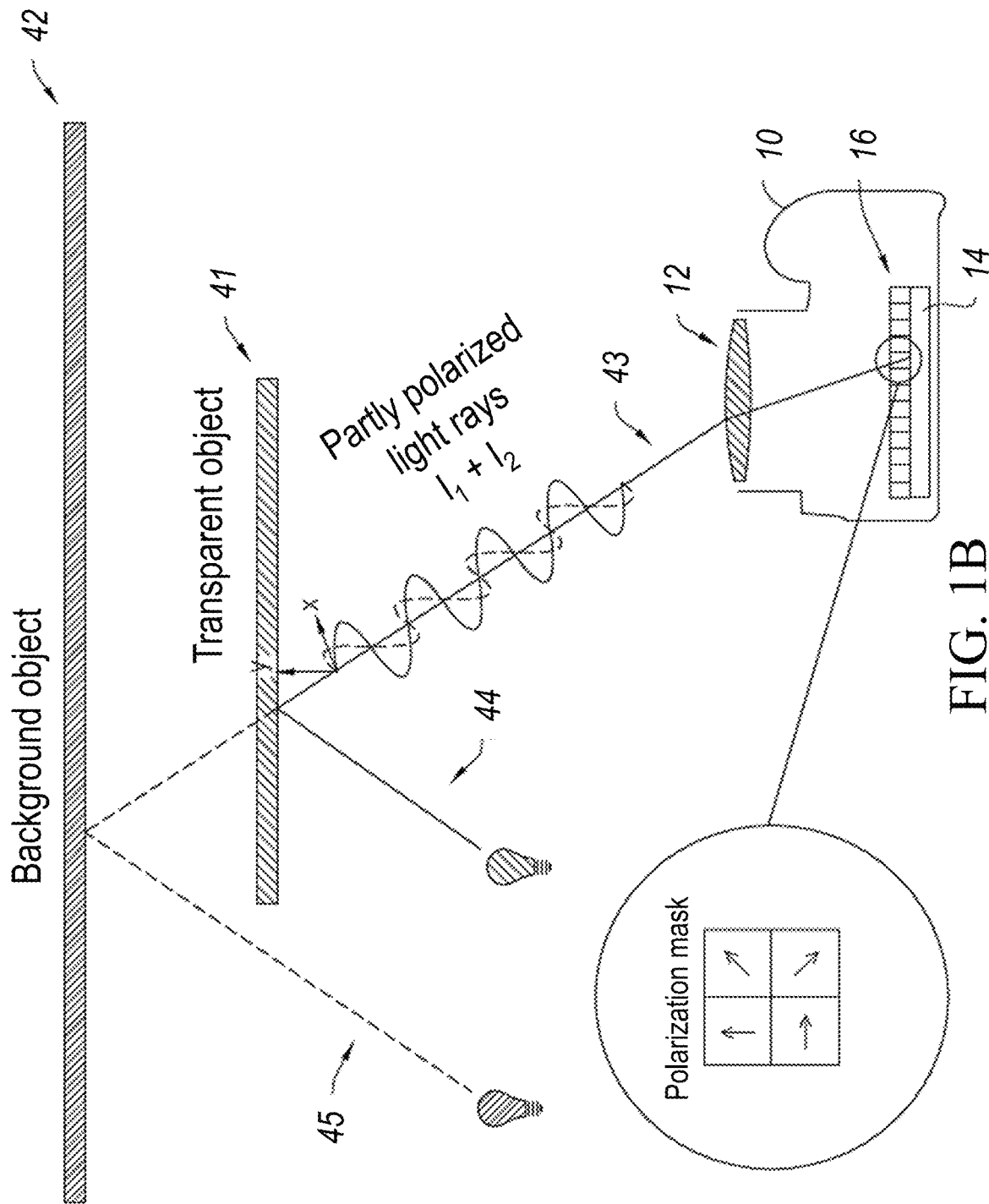
FIG. 1B is a high-level depiction of the interaction of light with transparent objects and non-transparent (e.g., diffuse and/or reflective) objects.

The interaction between light and transparent objects is rich and complex, but the material of an object determines its transparency under visible light. For many transparent household objects, the majority of visible light passes straight through and a small portion (~4% to ~8%, depending on the refractive index) is reflected. This is because light in the visible portion of the spectrum has insufficient energy to excite atoms in the transparent object. As a result, the texture (e.g., appearance) of objects behind the transparent object (or visible through the transparent object) dominate the appearance of the transparent object. For example, when looking at a transparent glass cup or tumbler on a table, the appearance of the objects on the other side of the tumbler (e.g., the surface of the table) generally dominate what is seen through the cup. This property leads to some difficulties when attempting to detect surface characteristics of transparent objects such as glass windows and glossy, transparent layers of paint, based on intensity images alone:

FIG. 1B is a high-level depiction of the interaction of light with transparent objects and non-transparent (e.g., diffuse and/or reflective) objects. As shown in FIG. 1B, a polarization camera 10 captures polarization raw frames of a scene that includes a transparent object 41 in front of an opaque background object 42. A light ray 43 hitting the image sensor 14 of the polarization camera 10 contains polarization information from both the transparent object 41 and the background object 42. The small fraction of reflected light 44 from the transparent object 41 is heavily polarized, and thus has a large impact on the polarization measurement, in contrast to the light 45 reflected off the background object 42 and passing through the transparent object 41.

Similarly, a light ray hitting the surface of an object may interact with the shape of the surface in various ways. For example, a surface with a glossy paint may behave substantially similarly to a transparent object in front of an opaque object as shown in FIG. 1B, where interactions between the light ray and a transparent or translucent layer (or clear coat layer) of the glossy paint causes the light reflecting off of the surface to be polarized based on the characteristics of the transparent or translucent layer (e.g., based on the thickness and surface normals of the layer), which are encoded in the light ray hitting the image sensor. Similarly, as discussed in more detail below with respect to shape from polarization (SfP) theory, variations in the shape of the surface (e.g., direction of the surface normals) may cause significant changes in the polarization of light reflected by the surface of the object. For example, smooth surfaces may generally exhibit the same polarization characteristics throughout, but a scratch or a dent in the surface changes the direction of the surface normals in those areas, and light hitting scratches or dents may be polarized, attenuated, or reflected in ways different than in other portions of the surface of the object. Models of the interactions between light and matter generally consider three fundamentals: geometry, lighting, and material. Geometry is based on the shape of the material. Lighting includes the direction and color of the lighting. Material can be parameterized by the refractive index or angular reflection/transmission of light. This angular reflection is known as a bi-directional reflectance distribution function (BRDF), although other functional forms may more accurately represent certain scenarios. For example, the bidirectional subsurface scattering distribution function (BSSRDF) would be more accurate in the context of materials that exhibit subsurface scattering (e.g. marble or wax).

A light ray 43 hitting the image sensor 14 of a polarization camera 10 has three measurable components: the intensity of light (intensity image/I), the percentage or proportion of light that is linearly polarized (degree of linear polarization/DOLP/$\rho$), and the direction of that linear polarization (angle of linear polarization/AOLP/$\phi$). These properties encode information about the surface curvature and material of the object being imaged, which can be used by the pose estimator 100 to detect transparent objects, as described in more detail below. In some embodiments, by using one or more polarization cameras, the pose estimator 100 can detect other optically challenging objects based on similar polarization properties of light passing through translucent objects and/or light interacting with multipath inducing objects or by non-reflective objects (e.g., matte black objects).

In more detail, the polarization camera 10 may further includes a polarizer or polarizing filter or polarization mask 16 placed in the optical path between the scene 1 and the image sensor 14. According to various embodiments of the present disclosure, the polarizer or polarization mask 16 is configured to enable the polarization camera 10 to capture images of the scene 1 with the polarizer set at various specified angles (e.g., at 45° rotations or at 60° rotations or at non-uniformly spaced rotations).

As one example, FIG. 1B depicts an embodiment where the polarization mask 16 is a polarization mosaic aligned with the pixel grid of the image sensor 14 in a manner similar to a red-green-blue (RGB) color filter (e.g., a Bayer filter) of a color camera. In a manner similar to how a color filter mosaic filters incoming light based on wavelength such that each pixel in the image sensor 14 receives light in a particular portion of the spectrum (e.g., red, green, or blue) in accordance with the pattern of color filters of the mosaic, a polarization mask 16 using a polarization mosaic filters light based on linear polarization such that different pixels receive light at different angles of linear polarization (e.g., at 0°, 45°, 90°, and 135°, or at 0°, 60° degrees, and 120°). Accordingly, the polarization camera 10 using a polarization mask 16 such as that shown in FIG. 1B is capable of concurrently or simultaneously capturing light at four different linear polarizations. One example of a polarization camera is the Blackfly® S Polarization Camera produced by FLIR® Systems, Inc. of Wilsonville, Oreg.

While the above description relates to some possible implementations of a polarization camera using a polarization mosaic, embodiments of the present disclosure are not limited thereto and encompass other types of polarization cameras that are capable of capturing images at multiple different polarizations. For example, the polarization mask 16 may have fewer than four polarizations or more than four different polarizations, or may have polarizations at different angles than those stated above (e.g., at angles of polarization of: 0°, 60°, and 120° or at angles of polarization of 0°, 30°, 60°, 90°, 120°, and 150°). As another example, the polarization mask 16 may be implemented using an electronically controlled polarization mask, such as an electro-optic modulator (e.g., may include a liquid crystal layer), where the polarization angles of the individual pixels of the mask may be independently controlled, such that different portions of the image sensor 14 receive light having different polarizations. As another example, the electro-optic modulator may be configured to transmit light of different linear polarizations when capturing different frames, e.g., so that the camera captures images with the entirety of the polarization mask set to, sequentially, to different linear polarizer angles (e.g., sequentially set to: 0 degrees; 45 degrees; 90 degrees; or 135 degrees). As another example, the polarization mask 16 may include a polarizing filter that rotates mechanically, such that different polarization raw frames are captured by the polarization camera 10 with the polarizing filter mechanically rotated with respect to the lens 12 to transmit light at different angles of polarization to image sensor 14.

Furthermore, while the above examples relate to the use of a linear polarizing filter, embodiments of the present disclosure are not limited thereto and also include the use of polarization cameras that include circular polarizing filters (e.g., linear polarizing filters with a quarter wave plate). Accordingly, in various embodiments of the present disclosure, a polarization camera uses a polarizing filter to capture multiple polarization raw frames at different polarizations of light, such as different linear polarization angles and different circular polarizations (e.g., handedness).

As a result, the polarization camera 10 captures multiple input images (or polarization raw frames) of the scene including the surfaces of the objects 22. In some embodiments, each of the polarization raw frames corresponds to an image taken behind a polarization filter or polarizer at a different angle of polarization $\phi_{pol}$ (e.g., 0 degrees, 45 degrees, 90 degrees, or 135 degrees). Each of the polarization raw frames is captured from substantially the same pose with respect to the scene 1 (e.g., the images captured with the polarization filter at 0 degrees, 45 degrees, 90 degrees, or 135 degrees are all captured by a same polarization camera 10 located at a same location and orientation), as opposed to capturing the polarization raw frames from disparate locations and orientations with respect to the scene. The polarization camera 10 may be configured to detect light in a variety of different portions of the electromagnetic spectrum, such as the human-visible portion of the electromagnetic spectrum, red, green, and blue portions of the human-visible spectrum, as well as invisible portions of the electromagnetic spectrum such as infrared and ultraviolet.

FIG. 1C is a perspective view of a polarization camera module according to one embodiment of the present disclosure. FIG. 1D is a cross sectional view of a portion of a polarization camera module according to one embodiment of the present disclosure. Some aspects of embodiments of the present disclosure relate to a polarization camera module in which multiple polarization cameras (e.g., multiple cameras, where each camera has a polarizing filter in its optical path) are arranged adjacent to one another and in an array and may be controlled to capture images in a group (e.g., a single trigger may be used to control all of the cameras in the system to capture images concurrently or substantially simultaneously). The polarizing filters in the optical paths of each of the cameras in the array cause differently polarized light to reach the image sensors of the cameras. The individual polarization cameras in the camera system have optical axes that are substantially perpendicular to one another, are placed adjacent to one another, and have substantially the same field of view, such that the cameras in the camera system capture substantially the same view of a scene 1, but with different polarizations. In some embodiments, the individual polarization cameras are arranged such that parallax shift between cameras is substantially negligible based on the designed operating distance of the camera system to objects in the scene, where larger spacings between the cameras may be tolerated if the designed operating distance is large. In some embodiments of the present disclosure, the polarization camera module includes at least three polarization cameras, each having a polarizing filter with a different polarization state (e.g., each at a different angle of linear polarization, such as 0°, 60°, and 120°).

For example, in the embodiment of the polarization camera module 10' shown in FIG. 1C, four cameras 10A', 10B', 10C', and 10D' are arranged in a 2×2 grid to form a camera array, where the four cameras have substantially parallel optical axes. The four cameras may be controlled together such that they capture images substantially simultaneously and using the same exposure settings (e.g., same aperture, length of exposure, and gain or "ISO" settings). In various embodiments of the present disclosure, each of the separate cameras 10A', 10B', 10C', and 10D' includes a different polarizing filter.

FIG. 1D shows a cross sectional view of two of the polarization cameras 10A' and 10B' shown in FIG. 1C. As seen in FIG. 1D, each a polarization camera (1A' and 10B') system includes a corresponding lens, a corresponding image sensor, and a corresponding polarizing filter. In particular, polarization camera 10A' includes lens 12A', image sensor 14A', and polarizing filter 16A'. Likewise, polarization camera 10B' includes lens 12B', image sensor 14B', and polarizing filter 16B'. In some embodiments of the present disclosure, the image sensors four cameras 10A', 10B', 10C', and 10D' are monolithically formed on a same semiconductor die, and the four cameras are located in a same housing with separate apertures for the lenses 12 corresponding to the different image sensors. Similarly, the polarizing filters 16 may correspond to different portions of a single physical layer that has different polarizing filters (e.g., different linear polarizing angles) in different regions of the layer (corresponding to the different cameras).

In some embodiments of the present disclosure, each of the cameras in the camera system 10' has a corresponding polarizing filter that is configured to filter differently polarized light. For example, in the embodiment shown in FIGS. 1C and 1D, polarizing filter 16A' of camera 10A' may be a linear polarizing filter oriented at an angle of 0°, polarizing filter 16B' of camera 10B' may be a linear polarizing filter oriented at an angle of 45°, polarizing filter 16C' of camera 10C' may be a linear polarizing filter oriented at an angle of 90°, and polarizing filter 16D' of camera 10D' may be a linear polarizing filter oriented at an angle of 135°. In some embodiments, one or more of the cameras may include a circular polarizer. In some embodiments of the present disclosure, the camera system 10' includes polarizing filters configured to filter light in at least two different polarizations. In some embodiments of the present disclosure, the camera system 10' includes polarizing filters configured to filter light in at least three different polarizations. In the embodiment shown in FIG. 1D, the polarizing filter 16 is located behind the lens 12 (e.g., between the lens 12 and the image sensor 14), but embodiments of the present disclosure are not limited thereto. In some embodiments, the polarizing filter is located in front of the lens 12.

In some embodiments, the various individual cameras of the camera array are registered with one another by determining their relative poses (or relative positions and orientations) by capturing multiple images of a calibration target, such as a checkerboard pattern, an ArUco target (see, e.g., Garrido-Jurado, Sergio, et al. "Automatic generation and detection of highly reliable fiducial markers under occlusion." *Pattern Recognition* 47.6 (2014): 2280-2292.) or a ChArUco target (see, e.g., An, Gwon Hwan, et al. "Charuco board-based omnidirectional camera calibration method." *Electronics* 7.12 (2018): 421). In particular, the process of calibrating the targets may include computing intrinsic matrices characterizing the internal parameters of each camera (e.g., matrices characterizing the focal length, image sensor format, and principal point of the camera) and extrinsic matrices characterizing the pose of each camera with respect to world coordinates (e.g., matrices for performing transformations between camera coordinate space and world or scene coordinate space).

While not shown in FIG. 1D, in some embodiments of the present disclosure, each polarization camera may also include a color filter having in a mosaic pattern such as a Bayer filter, such that individual pixels of the image sensors 14 receive light corresponding to, for example, red (R), green (G), and blue (B) portions of the spectrum, such that each camera captures light in a visible portion of the electromagnetic spectrum in accordance with a mosaic pattern. In some embodiments, a demosaicing process is used to compute separate red, green, and blue channels from the raw data. In some embodiments of the present disclosure, each polarization camera may be used without a color filter or with filters used to transmit or selectively transmit various other portions of the electromagnetic spectrum, such as infrared light.

Figure 1E:
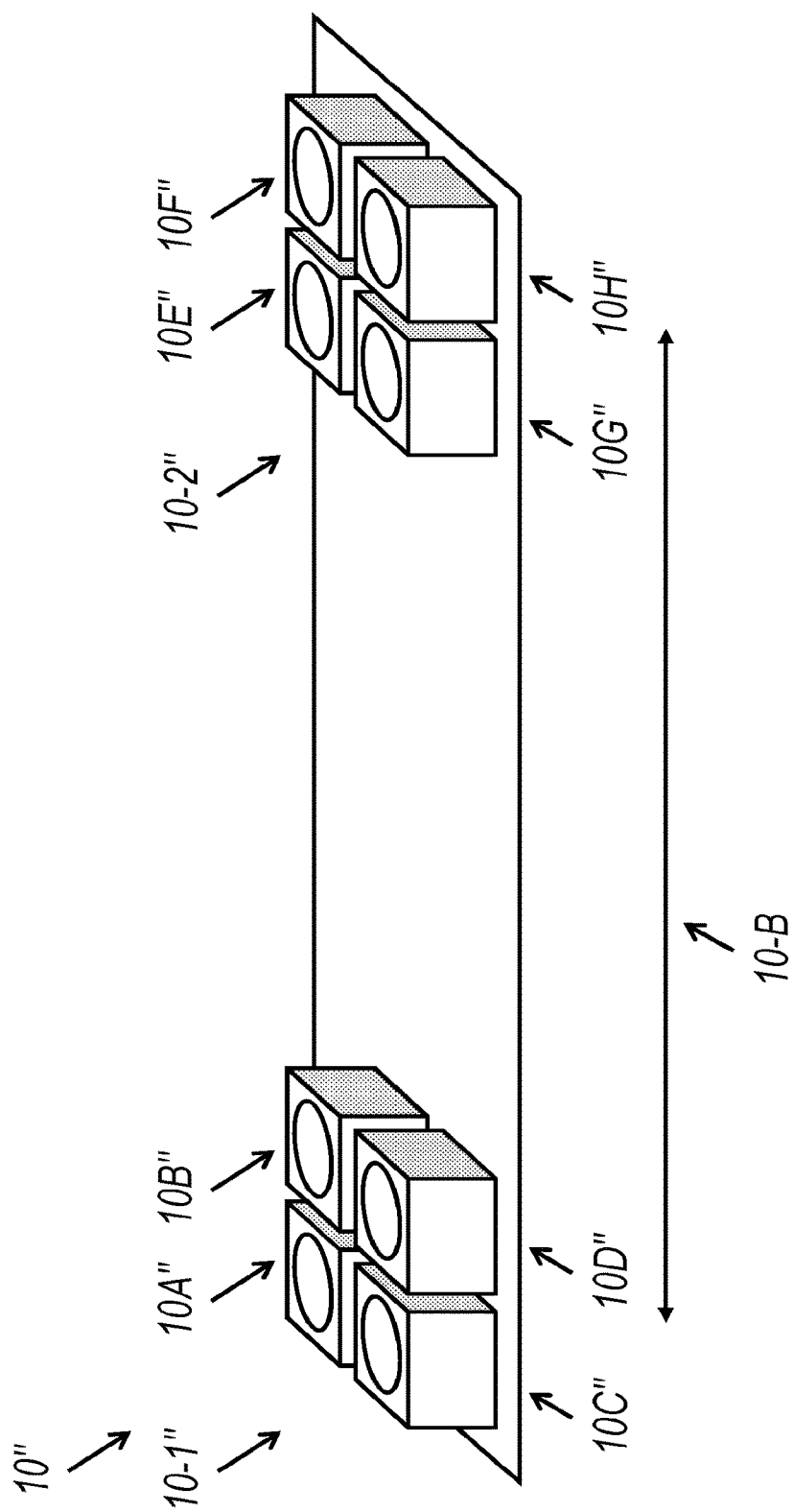
FIG. 1E is a perspective view of a stereo polarization camera system according to one embodiment of the present disclosure.

FIG. 1E is a perspective view of a stereo polarization camera system according to one embodiment of the present disclosure. In some applications, stereo vision techniques are used to capture multiple images of scene from different perspectives. As noted above, in some embodiments of the present disclosure, individual polarization cameras within a camera system are placed adjacent to one another such that parallax shifts between the cameras is substantially negligible based on the designed operating distance of the camera system to the subjects being imaged. In stereo polarization camera systems, some of the individual polarization cameras are spaced apart such that parallax shifts are significant and detectable for objects in the designed operating distance of the camera system. This enables the distances to various surfaces in a scene (the "depth") to be detected in accordance with a magnitude of a parallax shift (e.g., larger parallax shifts in the locations of corresponding portions of the images indicate that those corresponding portions are on surfaces that are closer to the camera system and smaller parallax shifts indicate that the corresponding portions are on surfaces that are farther away from the camera system). These techniques for computing depth based on parallax shifts are sometimes referred to as Depth from Stereo Accordingly, FIG. 1E depicts a stereo polarization camera system 10" having a first polarization camera module 10-1" and a second polarization camera module 10-2" having substantially parallel optical axes and spaced apart along a baseline 10-B. In the embodiment shown in FIG. 1E, the first polarization camera module 10-1" and includes polarization cameras 10A", 10B", 10C", and 10D" arranged in a 2×2 array similar to that shown in FIGS. 1C and 1D. Likewise, the second polarization camera module 10-2" and includes polarization cameras 10E", 10F", 10G", and 10H" arranged in a 2×2 array, and the overall stereo polarization camera module 10" includes eight individual polarization cameras (e.g., eight separate image sensors behind eight separate lenses). In some embodiments of the present disclosure, corresponding polarization cameras of polarization camera modules 10-1" and 10-2" are configured to capture polarization raw frames with substantially the same polarizations. For example, cameras 10A" and 10E" may both have linear polarizing filters at a same angle of 0°, cameras 10B" and 10F" may both have linear polarizing filters at a same angle of 45°, cameras 10C" and 10G" may both have linear polarizing filters at a same angle of 90°, and cameras 10D" and 10H" may both have linear polarizing filters at a same angle of 135°.

Embodiments of the present disclosure are not limited to the particular embodiment shown in FIG. 1E. In some embodiments, a stereo polarization camera system includes three or more polarization camera modules, where each polarization camera module includes multiple polarization cameras arranged in array and configured, using polarizing filters, to capture polarization raw frames of different polarizations. As noted above, in some embodiments of the present disclosure, one or more of the individual polarization cameras of a polarization camera module may include a color filter and, as such, one or more of the polarization cameras in a stereo polarization camera module may also include a color filter.

In a manner similar to that described for calibrating or registering cameras within a camera module, the various polarization camera modules of a stereo polarization camera system may also be registered with one another by capturing multiple images of calibration targets and computing intrinsic and extrinsic matrices for the various camera modules.

While the embodiment of a stereo polarization camera system shown in FIG. 1E includes two polarization camera modules, each having four polarization cameras, embodiments of the present disclosure are not limited thereto.

For example, in some embodiments of the present disclosure, a stereo polarization camera system includes a plurality of polarization camera modules, where each of the polarization camera modules includes three or more individual polarization cameras, each of the individual polarization cameras of a polarization camera module having polarizing filters with different polarization states (e.g., different angles of linear polarization).

In some embodiments of the present disclosure, a stereo polarization camera system includes a plurality of polarization camera modules that are spaced apart along one or more baselines, where each of the polarization camera modules includes a single polarization camera configured to capture polarization raw frames with different polarizations, in accordance with embodiments such as that described above with respect to FIG. 1B. For example, in some embodiments of the present disclosure, the polarization camera of each module may include a polarization mask (e.g., similar to the polarization mask shown in FIG. 1B) such that each individual polarization camera captures images where the pixels detect light in accordance with a mosaic pattern of different polarizing filters (e.g., polarizing filters at different angles). For example, in the embodiment shown in FIG. 1B, each 2×2 block of pixels of the polarization mask includes linear polarizers at linear polarization angles of 0°, 45°, 90°, and 135°. In other embodiments of the present disclosure, the individual polarization cameras may include mechanically or electronically controllable polarizing filters, as discussed above with respect to FIG. 1B, to enable the polarization cameras to capture polarization raw frames of different polarizations.

While the above embodiments specified that the individual polarization camera modules or the polarization cameras that are spaced apart along one or more baselines in the stereo polarization camera system have substantially parallel optical axes, embodiments of the present disclosure are not limited thereto. For example, in some embodiment of the present disclosure, the optical axes of the polarization camera modules are angled toward each other such that the polarization camera modules provide differently angled views of objects in the designed working distance (e.g., where the optical axes cross or intersect in the neighborhood of the designed working distance from the stereo camera system).

According to various embodiments of the present disclosure, the pose estimator 100 is implemented using one or more processing circuits or electronic circuits configured to perform various operations as described in more detail below. Types of electronic circuits may include a central processing unit (CPU), a graphics processing unit (GPU), an artificial intelligence (AI) accelerator (e.g., a vector processor, which may include vector arithmetic logic units configured efficiently perform operations common to neural networks, such dot products and softmax), a field programmable gate array (FPGA), an application specific integrated circuit (ASIC), a digital signal processor (DSP), or the like. For example, in some circumstances, aspects of embodiments of the present disclosure are implemented in program instructions that are stored in a non-volatile computer readable memory where, when executed by the electronic circuit (e.g., a CPU, a GPU, an AI accelerator, or combinations thereof), perform the operations described herein to compute a processing output 20, such as an instance segmentation map, from input polarization raw frames 18. The operations performed by the pose estimator 100 may be performed by a single electronic circuit (e.g., a single CPU, a single GPU, or the like) or may be allocated between multiple electronic circuits (e.g., multiple GPUs or a CPU in conjunction with a GPU). The multiple electronic circuits may be local to one another (e.g., located on a same die, located within a same package, or located within a same embedded device or computer system) and/or may be remote from one other (e.g., in communication over a network such as a local personal area network such as Bluetooth®, over a local area network such as a local wired and/or wireless network, and/or over wide area network such as the internet, such a case where some operations are performed locally and other operations are performed on a server hosted by a cloud computing service). One or more electronic circuits operating to implement the pose estimator 100 may be referred to herein as a computer or a computer system, which may include memory storing instructions that, when executed by the one or more electronic circuits, implement the systems and methods described herein.

Pose Estimation Based on Multi-View Camera Systems

Some aspects of embodiments of the present disclosure relate to estimating the poses of objects in a scene using systems of multiple independent cameras at large baselines to perform joint pose estimation. Some aspects of embodiments of the present disclosure relate to pose estimation by applying techniques including passive keypoint matching from multiple views (e.g., from a main camera 10 and a support camera 30) and re-projecting the keypoints onto different viewpoints (e.g., corresponding to different support cameras 30) to identify corresponding object instances in instance segmentation maps. We can then use the instance segmentation can then be used to detect more keypoints associated with the same object. These new keypoints can then be used to estimate the poses of objects in accordance with a multi-view perspective-n-point (PnP) algorithm according to embodiments of the present disclosure to further refine the estimated pose. Some embodiments also relate to using these additional viewpoints corresponding to different support cameras 30 to refine the depth predictions and edge predictions for refinement of the pose of the objects based on iterative closest point (ICP) and shape from polarization, as described in more detail below.

Figure 2A:
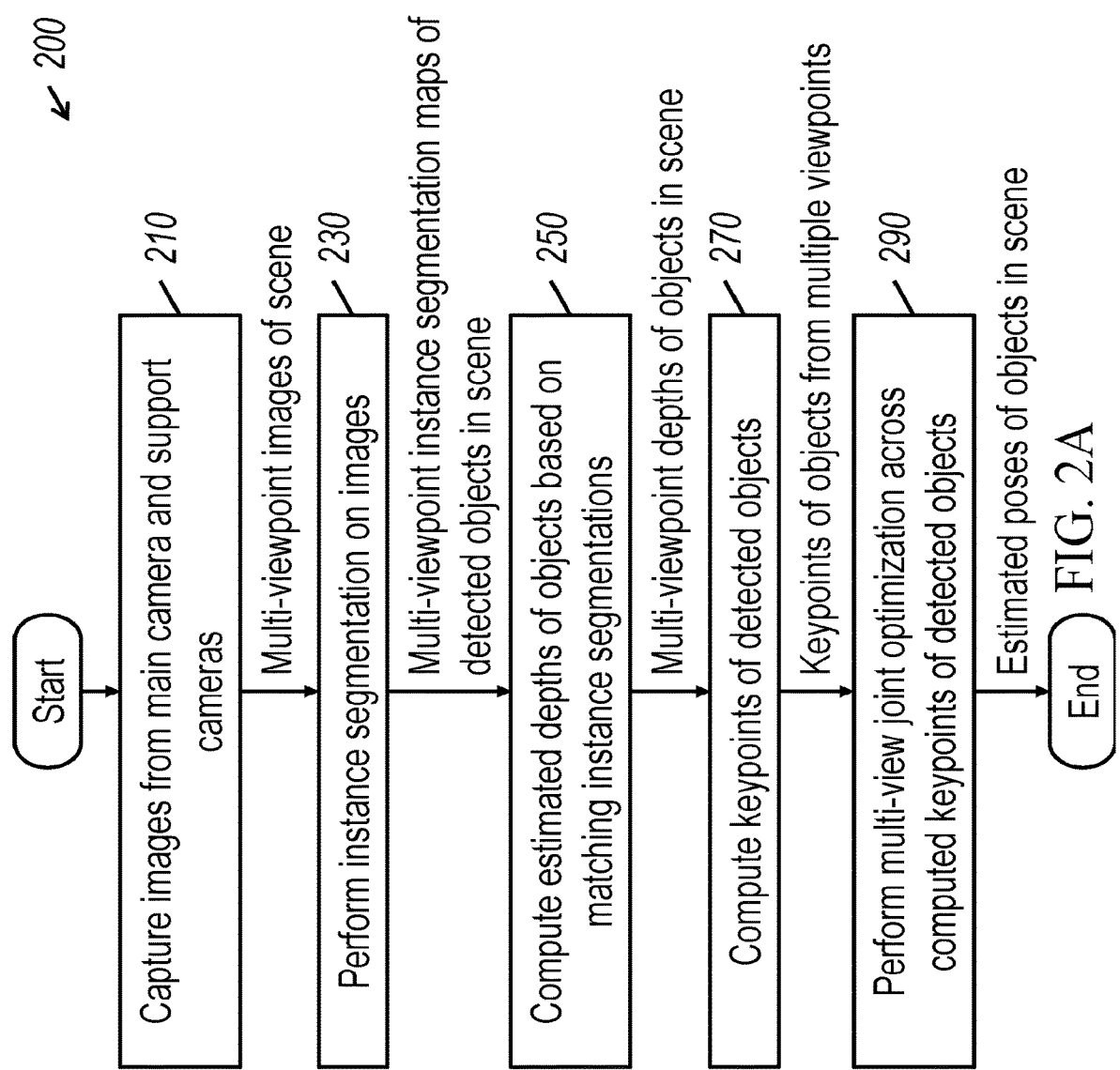
FIG. 2A is a flowchart depicting a method for estimating poses according to one embodiment of the present disclosure.

FIG. 2A is a flowchart depicting a method 200 for estimating poses according to one embodiment of the present disclosure. In various embodiments of the present disclosure operations of the method 200 shown in FIG. 2A may be performed by one or more processing circuits or electronic circuits that are components of a pose estimator 100.

In operation 210, the pose estimator 100 controls the main camera 10 and the one or more support cameras 30 to acquire multi-viewpoint images or a multi-view calibrated set of images of a scene. In particular, the set of images is multi-viewpoint or multi-view in the sense that the main camera and the support cameras capture images of a scene from different viewpoints. Some individual cameras may capture images from multiple viewpoints, such as the case of a stereo main camera and/or a stereo support camera, which may capture images from at least two viewpoints. For example, a main camera 10 in accordance with the embodiments shown in FIG. 1E may capture eight different images of a scene substantially concurrently and from substantially two different viewpoints by the first polarization camera module 10-1" and the second polarization camera module 10-2". In general, the main camera 10 and the support cameras 30 capture overlapping views of the same scene, thereby providing different views of substantially the same object or objects within the scene, noting that some objects may be visible from some viewpoints but not visible from other viewpoints due to occlusion between different objects in the scene.

Figure 2B:
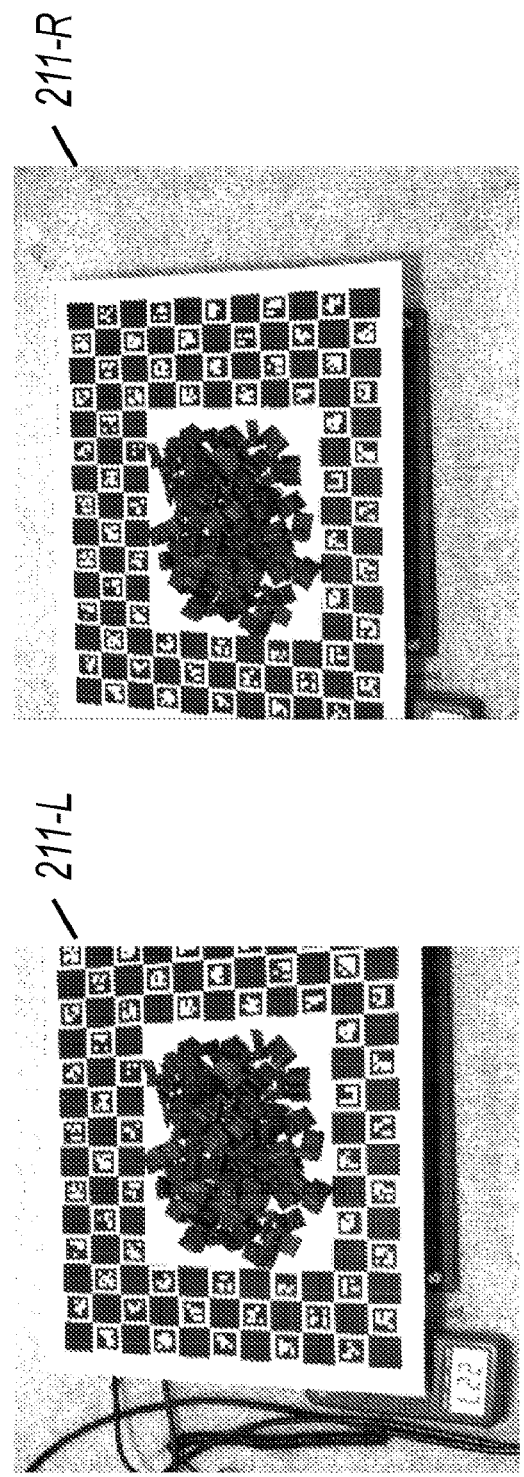
FIG. 2B depicts four views of a scene containing an arrangement of objects captured by cameras of a pose estimation system according to one embodiment of the present disclosure.
Figure 2B:
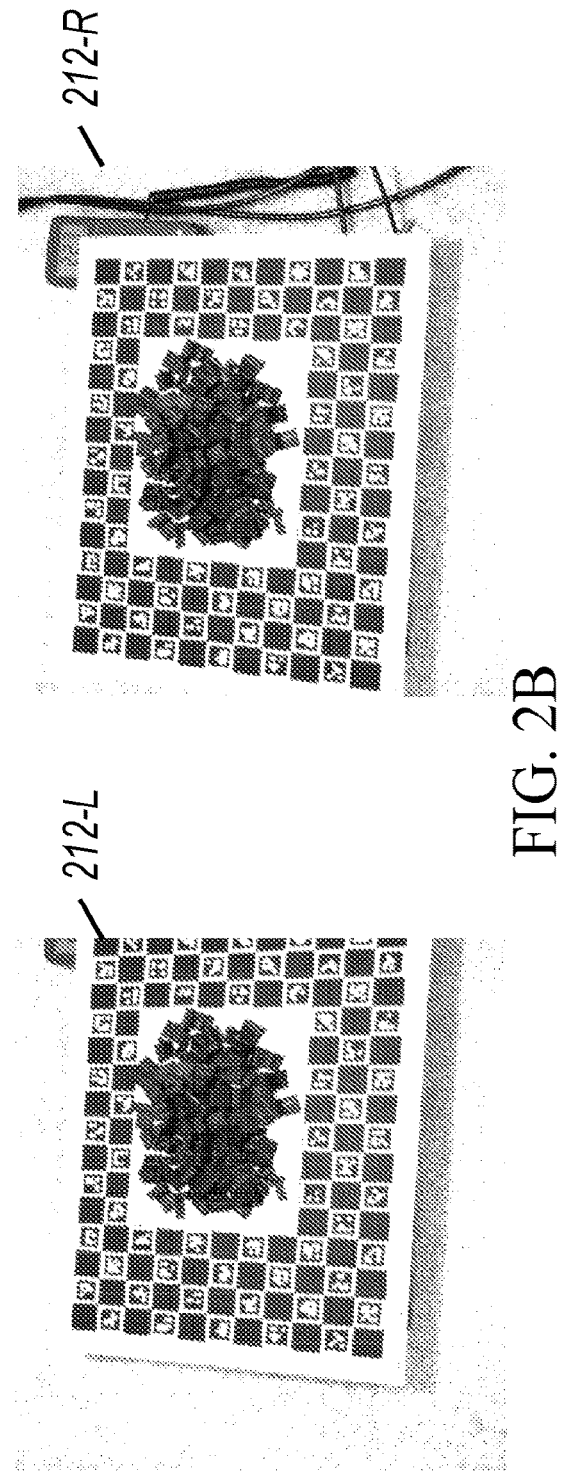

FIG. 2B depicts four views of a scene containing an arrangement of objects captured by cameras of a pose estimation system according to one embodiment of the present disclosure. In the embodiment of FIG. 2B, the four images are captured by two stereo cameras (e.g., the main camera 10 and a stereo camera among the support cameras 30). The first stereo camera captures a left image 211-L and a right image 211-R and the second stereo camera captures a left image 212-L and a right image 211-R, where the four images depict overlapping views of the same scene. In the particular scene shown in FIG. 2B, a collection of objects is placed inside a ChArUco board, where the ChArUco board provides fiducials for providing additional information regarding the poses of the cameras.

The set of images is referred to herein as being "calibrated" based on an assumption that the system of cameras including the main camera 10 and the one or more support cameras 30 are calibrated with respect to one another, e.g., that the relative poses of the cameras are known and stored by the pose estimator 100. Some aspects of embodiments of the present disclosure relate to the automatic calibration of camera systems, and will be described in more detail in a separate section below.

In some embodiments of the present disclosure, the pose estimator 100 further performs stereo rectification on the images received from the main camera and the one or more support cameras. Stereo rectification may include transforming the images to project images from different viewpoints onto the same image plane. For example, the images captured by the first polarization camera module 10-1" and the second polarization camera module 10-2" may be inherently rectified, due to intrinsic and extrinsic camera parameters. For example, lens distortions, imperfect physical alignment of the optical axes of the camera modules and/or between the main camera and support cameras, and the like may be corrected by the pose estimator 100 based on known calibration data collected during calibration operations before proceeding to further processing.

In operation 230, the pose estimator 100 performs instance segmentation on the multi-view images to compute separate instance segmentation maps for each view captured by the main camera 10 and the support cameras 30. Instance segmentation is a computer vision approach that identifies, for every pixel in an input image, a belonging instance of the object as well as the type or class of that object. For example, an image of a 3-D geometrical blocks of rectangular prisms, cylinders, and spheres, each "instance" corresponds to a different block, and an instance segmentation map would label each pixel with a different block identifier and a block type (rectangular prism, cylinder, or sphere).

One class of approaches to performing instance segmentation on input images is to supply input images to a convolutional neural network (CNN) that is trained to compute instance segmentation maps from those input images. Examples of image segmentation CNNs include Mask R-CNN (He, Kaiming, et al. "Mask R-CNN." *Proceedings of the IEEE International Conference on Computer Vision.* 2017), AlexNet (see, e.g., Krizhevsky, Alex, Ilya Sutskever, and Geoffrey E. Hinton. "ImageNet classification with deep convolutional neural networks." Advances in neural information processing systems. 2012), VGG (see, e.g., Simonyan, Karen, and Andrew Zisserman. "Very deep convolutional networks for large-scale image recognition." arXiv preprint arXiv:1409.1556 (2014)), ResNet-101 (see, e.g., Kaiming He, Xiangyu Zhang, Shaoqing Ren, and Jian Sun. Deep residual learning for image recognition. In Proceedings of the IEEE Conference on Computer Vision and Pattern Recognition, pages 770-778, 2016), MobileNet (see, e.g., Howard, Andrew G., et al. "Mobilenets: Efficient convolutional neural networks for mobile vision applications." arXiv preprint arXiv:1704.04861 (2017)), MobileNetV2 (see, e.g., Sandler, Mark, et al. "MobileNetV2: Inverted residuals and linear bottlenecks." Proceedings of the IEEE Conference on Computer Vision and Pattern Recognition. 2018), and MobileNetV3 (see, e.g., Howard, Andrew, et al. "Searching for MobileNetV3." Proceedings of the IEEE International Conference on Computer Vision. 2019.)

In many circumstances, the performance (e.g., accuracy of the segmentation maps) computed by a convolutional neural network is significantly improved when it is trained or re-trained based on data that is representative of the target domain in which it operates.

Accordingly, some aspects of embodiments of the present disclosure relate to systems and methods for training a machine learning model, such as a convolutional neural network, to compute instance segmentation maps for particular use cases.

In addition, as noted above, some types of materials may be difficult to image using standard imaging modalities such as color cameras. On the other hand, the use of polarization camera systems may make these objects and surfaces detectable. Some aspects of embodiments of the present disclosure relate to performing instance segmentation using polarimetric cues captured in accordance with embodiments of the present disclosure. Some techniques for performing instance segmentation using polarimetric cues are described in more detail in U.S. Provisional Patent Application No. 62/942, 113, filed in the United States Patent and Trademark Office on Nov. 30, 2019, U.S. Provisional Patent Application No. 63/001,445, filed in the United States Patent and Trademark Office on Mar. 29, 2020, and PCT Patent Application No. US2020/048604, filed in the United States Patent and Trademark Office on Aug. 28, 2020 the entire disclosures of which are incorporated by reference herein.

These aspects of embodiments of the present disclosure relating to the training of convolutional neural networks to perform instance segmentation will be described in more detail in a later section below.

By performing instance segmentation on images captured from each viewpoint of the camera system, including the main camera 10 and the support cameras 30, a plurality of instance segmentation maps are computed. Each instance segmentation map labels separate instances of the objects 22 visible that are visible in the captured images.

In operation 250, the pose estimator 100 matches instance segmentations across multiple stereo images to achieve approximate depth estimate per object. As noted above, in some embodiments, at least the main camera 10 is a stereo camera configured to capture a stereo pair images. Because the cameras (e.g., camera modules) of the main camera are relatively close, the stereo pairs of images will be similar in that the overall shapes of the detected object instances between images will be relatively similar and the relative locations of the detected instances of objects with respect to one another will be generally the same. Accordingly, in some embodiments, depth estimates of each object instance imaged by the stereo pair are computed by identifying corresponding instances detected in the separate instance segmentation maps and measuring the disparity (e.g., shift in position) in the locations of the instances within the segmentation between the two images, in a manner similar to depth from disparity using block matching. Details of systems and methods for automatically performing correspondence matching between instances is described in more detail in a section below regarding object level correspondences using segmentation.

In operation 270, the pose estimator 100 computes keypoints of the detected objects. In particular, each instance of each object detected by the instance segmentation process is extracted (e.g., cropped) from their corresponding images captured by the main camera 10 and the stereo cameras 30 to generate a collection of image patches or crops (along with the coordinate locations from which they were extracted from the original images). These image patches are supplied to a keypoint detector to compute a plurality of keypoints for each object detected in the scene. Each keypoint detected in the image patch may be represented by two-dimensional coordinates [u, v] e.g., in the coordinate space of the image captured from the viewpoint of the corresponding camera (e.g., main camera 10 or support camera 30).

Examples of keypoint detectors or feature detectors that may be used in operation 270 include, but are not limited to, scale-invariant feature transform (SIFT), speeded up robust features (SURF), gradient location and orientation histogram (GLOH), histogram of oriented gradients (HOG), basis coefficients, Haar wavelet coefficients, and the like.

Figure 2C:
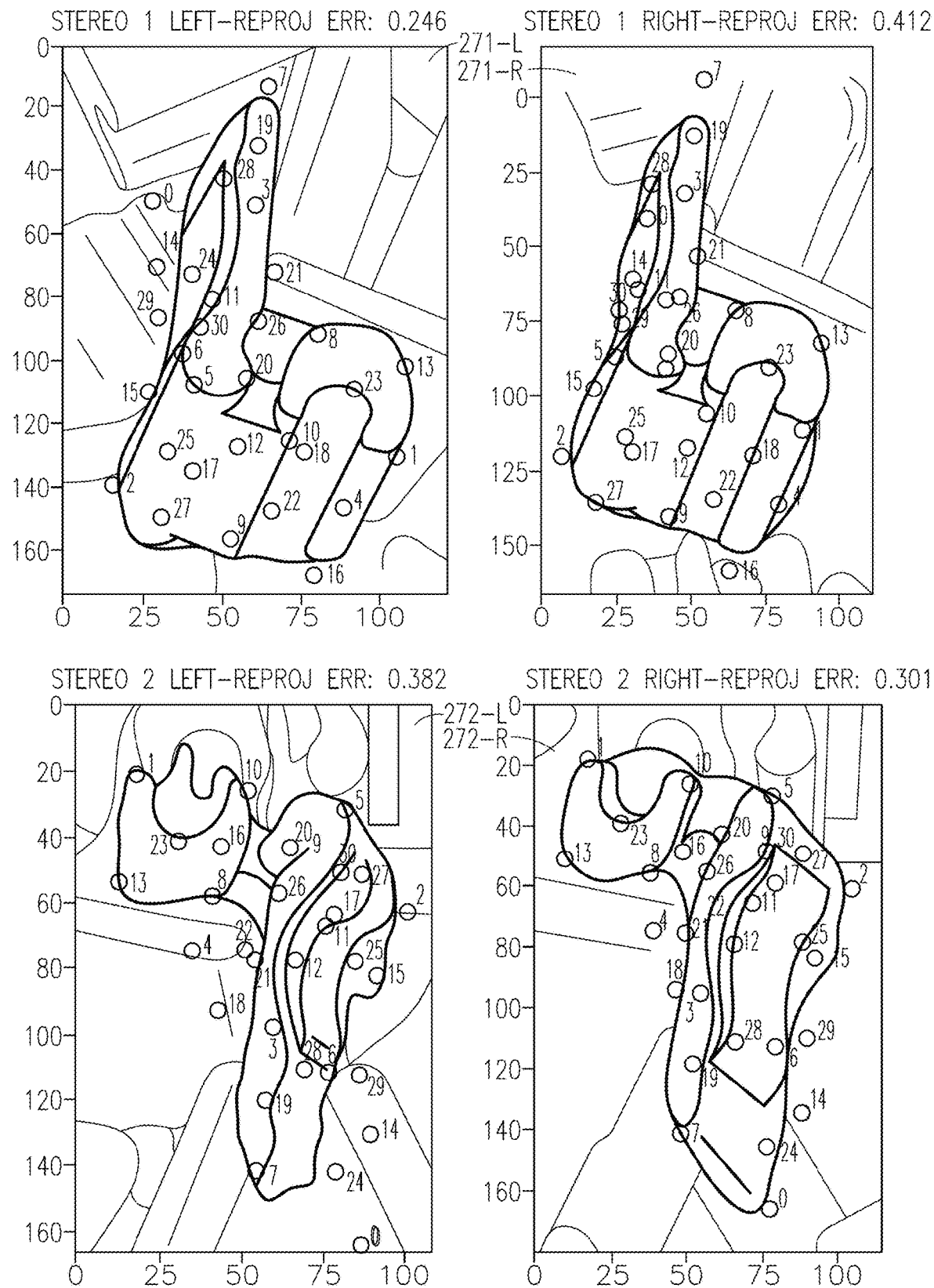
FIG. 2C is a depiction of 2-D keypoints detected in four different views of a same instance of an object from four different viewpoints captured by cameras of a pose estimation system according to one embodiment of the present disclosure.

FIG. 2C is a depiction of 2-D keypoints detected in four different views of a same instance of an object from four different viewpoints captured by cameras of a pose estimation system according to one embodiment of the present disclosure. In the embodiment shown in FIG. 2C, the object (e.g., a manufactured part) is viewed by two stereo cameras, Stereo 1 and Stereo 2, each stereo camera having a Left camera and a Right camera. Accordingly, FIG. 2C shows crops depicting the same object from a left image 271-L and a right image 271-R captured by camera Stereo 1 and crops depicting the same object from a left image 272-L and a right image 272-R captured by camera Stereo 2. Each dot in FIG. 2C represents a 2-D keypoint detected by a keypoint detector, where the numbers adjacent the dots represent keypoint identifiers, such that, in the case of perfect keypoint detection, the same keypoint identifiers across different views represent the same physical locations on the surface of the object.

In some embodiments of the present disclosure, keypoints in an image are detected using a trained keypoint detector, such as a trained convolutional neural network, as described in more detail below in another section regarding training convolutional neural networks. When applying a trained keypoint detector, each keypoint detected or predicted in the image may be associated with a corresponding confidence (e.g., probability that the given point is a keypoint).

In addition, as noted above, in some embodiments of the present disclosure, one or more of the main camera 10 and the support cameras 30 are polarization cameras configured to capture polarization information of the scene. Polarization information enables the detection of optically challenging surfaces of objects (e.g., surfaces that may be optically challenging to detect for a comparative color camera), such as transparent surfaces, highly reflective surfaces, matte black surfaces, and the like. Accordingly, in some embodiments, a trained keypoint detector is trained on polarization data (e.g., polarization raw frames, polarimetric cues, and/or polarization features in polarization representation spaces) to detect the keypoints on the optically challenging surfaces of objects based on polarization information captured from the scene. The training of keypoint detectors based on polarization data is described below in more detail in another section.

In operation 290, the pose estimator 100 performs multi-view joint optimization across the keypoints of objects across the multiple views of the objects captured by the main camera 10 and the support cameras 30 to compute estimated poses of objects in the scene.

In some embodiments, the pose estimator 100 computes the pose of each detected object in the scene independently, based on the separate keypoints detected for each detected object in accordance with the instance segmentation.

In operation 290, the pose estimator 100 performs multi-view object matching based on the images of a current detected object among the detected objects. In some embodiments, the pose estimator uses the keypoint predictions and stereo constraints to estimate object correspondences using a simple Hungarian matching algorithm (e.g., a linear sum assignment) and a custom cost function to compute the pose of an object in accordance with a multi-view perspective-n-point algorithm according to embodiments of the present disclosure.

Multi-View Perspective-n-Point

In some embodiments, the pose estimator 100 is configured to detect and to estimate a pose for particular predefined types of objects. For example, in the case of a pose estimator 100 configured for use in manufacturing robotics, the pose estimator 100 may be configured to detect the poses of the various end-effectors for robotic arms and the poses of various parts to be assembled in a manufactured product (e.g., screws, panels, cases, and the like). Accordingly, the pose estimator 100 stores a predefined set of keypoints for each type of object that it is configured to detect and compute poses for, where these keypoints correspond to distinctive three-dimensional points on the surface of the object. An i-th 3-D keypoint among a plurality of N 3-D keypoints associated with a particular object may be referred to herein in accordance with its Cartesian coordinates $[x_i, y_i, z_i]$. As one example, some keypoints on a screw may correspond to the point of the screw, an edge of the head of the screw, and the like.

In operation 290, the pose estimator 100 estimates a pose of the current object, represented by rotation transformation $R_o$ and translation transformation $T_o$ with respect to a global coordinate system (e.g., a coordinate system defined with respect to the main camera 10) based on the predefined 3-D keypoints ($[x_i, y_i, z_i]$) associated with the type of the current object (e.g., whether the object is a screw or a particular end-effector attached to a robotic arm) and the 2-D keypoints ($[u, v]$) detected in each view of the object.

In more detail, in some embodiments, the pose estimator 100 computes a pose $R_o$, $T_o$ that minimizes an error or difference, over all of the viewpoints (from the main camera 10 and the support cameras 30), between the detected 2-D keypoints and the predefined 3-D keypoints when the 3-D keypoints are projected into the 2-D spaces associated with each viewpoint. More precisely, in some embodiments, the pose estimator 100 minimizes or optimizes the following cost function:

$$\min_{R_o, T_o} \sum_{i:N, j:M} c_{ij} \|[u_{ij}, v_{ij}] - K_j[R_j T_j][R_o T_o][x_i, y_i, z_i]\| \quad (7)$$

where $R_o$, $T_o$ is the pose of the object, i is an index iterating through the N 3-D keypoints, j is an index iterating through the M viewpoints, $c_{ij}$ is a confidence for a corresponding keypoint prediction $[u_{ij}, v_{ij}]$ of an i-th keypoint in an image for corresponding to a j-th viewpoint, $R_j$, $T_j$, $K_j$ are the camera extrinsic parameters and intrinsic parameters of a j-th camera used to capture an image from the j-th viewpoint, and $[x_i, y_i, z_i]$ is an i-th 3-D keypoint.

In more detail, for each of the 3-D keypoints i and for each viewpoint j, the pose estimator 100 compares the i-th 2-D keypoint detected in the image captured from viewpoint j (keypoint $[u_{ij}, v_{ij}]$) with a transformed version of the corresponding i-th 3-D keypoint $[x_i, y_i, z_i]$ as that i-th 3-D keypoint is transformed in accordance with the current estimated object pose $[R_o T_o]$ and projected into the 2-D space of viewpoint j based on the camera extrinsic parameters $R_j T_j$ of viewpoint j (e.g., the relative pose between the camera at viewpoint j with respect to the global coordinate system) and the camera intrinsic parameters $K_j$ (e.g., internal characteristics of the camera at viewpoint j, such as lens distortions). The errors or costs are summed across all of the N different 3-D keypoints and across all of the M different viewpoints (e.g., one main camera and M−1 support cameras), and the pose estimator 100 applies an optimizer to compute an estimated object pose $R_o T_o$ that minimizes the overall cost or overall error. One example of an optimizer is applying gradient descent to find the object pose $R_o T_o$ that minimizes this error. In some embodiments, the optimization is performed jointly across all of the viewpoints, rather than iteratively considering each viewpoint one at a time.

Figure 2D:
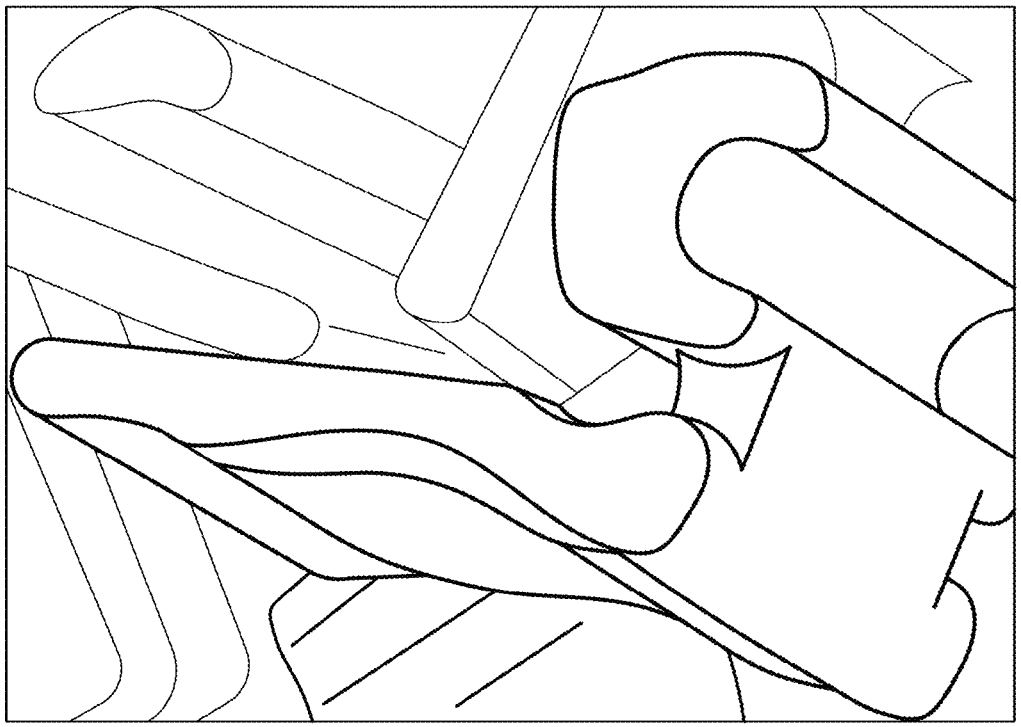
FIG. 2D depicts a crop of depicting a single object in a scene, as extracted from an image captured from one of the cameras and the same crop with an overlaid rendering of a 3-D model of the object posed within the scene in accordance with the estimated pose of the single object as computed by the pose estimator 100 according to one embodiment of the present disclosure.
Figure 2D:
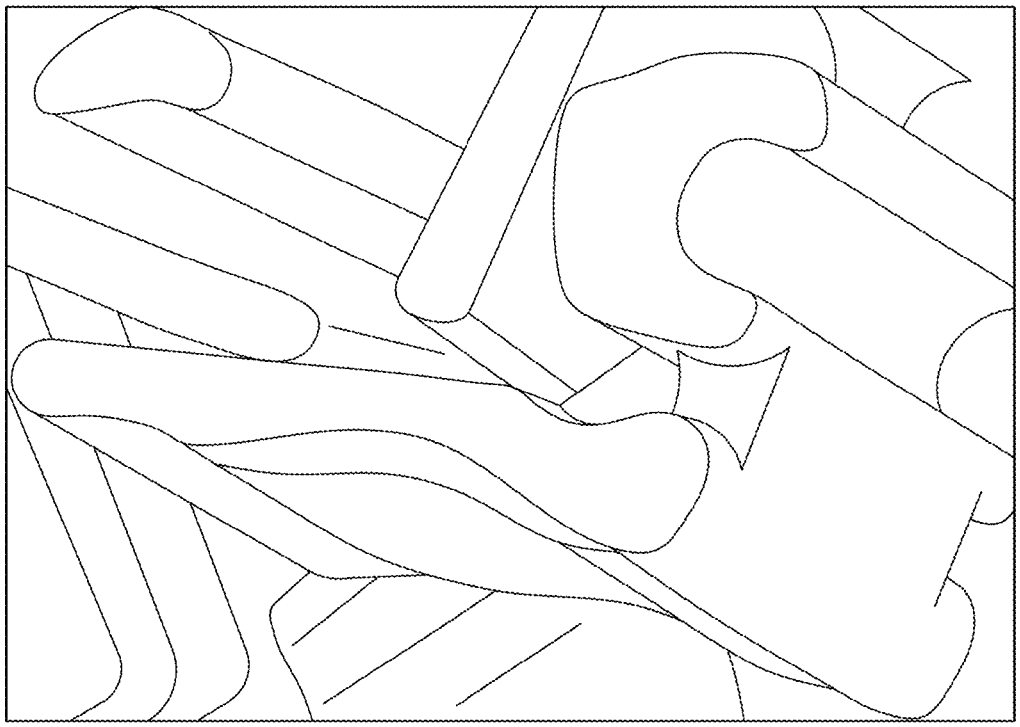

FIG. 2D depicts a crop of depicting a single object in a scene, as extracted from an image captured from one of the cameras and the same crop with an overlaid rendering of a 3-D model of the object posed within the scene in accordance with the estimated pose of the single object as computed by the pose estimator 100 according to one embodiment of the present disclosure.

Figure 2E:
FIG. 2E depicts an image of a scene containing multiple objects, as captured from one of the cameras and with overlaid renderings of a 3-D model of the objects posed within the scene in accordance with the estimated poses of objects that were detected and whose poses were by the pose estimator 100 according to one embodiment of the present disclosure.
Figure 2E:
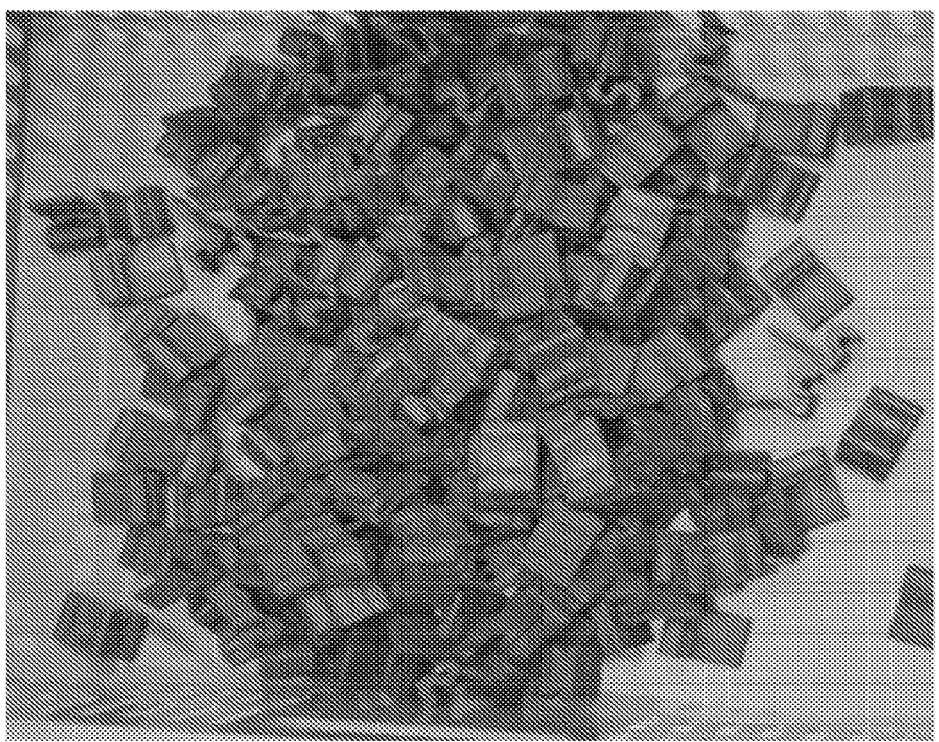

FIG. 2E depicts an image of a scene containing multiple objects, as captured from one of the cameras and with overlaid renderings of a 3-D model of the objects posed within the scene in accordance with the estimated poses of objects that were detected and whose poses were by the pose estimator 100 according to one embodiment of the present disclosure. In the particular case shown in FIG. 2E, the pose estimator 100 did not estimate poses for all of the objects in the scene, because, in some embodiments, objects that are extensively occluded (e.g., by other objects) or portions of the scene that fail to meet other criteria (e.g., failing to sufficiently match other views), may be left unanalyzed by the pose estimator 100, but may have their poses estimated at a later time, as objects shift within the scene and/or as objects are removed from the scene.

Symmetry Awareness in Keypoint Detection

For symmetric objects, there exists a 4×4 transform S such that, for a given pose of an object $P_o = S**P_o$. One example of a symmetric object is a cube, which has 8 symmetries. That means for any given of these 8 poses, the cube will look the same from a given viewpoint. However, keypoints are computed (or predicted) deterministically, so that a certain 2-D point on the image captured from one viewpoint can be matched to a certain 3-D point on the surface of the object. From another viewpoint, that 2-D point could be matched with a different 3-D point on the surface of the object. This means that the detected keypoints might not consistent between images from different viewpoints.

Accordingly, some embodiments of the present disclosure relate to modifying cost functions for estimating a pose $R_o, T_o$, of an object (such as Equation 7, above) with an additional term that defines a set of transforms (S) and that performs a search for the transform S that minimizes the reprojection error with respect to a specific view $v_j$ (e.g., the error associated with the reprojection of the i-th 3-D keypoint to 2-D space as viewed from viewpoint j), thereby enabling embodiments of the present disclosure to determine a minimal pose even when the same 3-D keypoint is labeled differently in different 2-D keypoint views. Equation 8, below, provides one example of a modified cost function to account for symmetries in the object:

$$\min_{R_o, T_o} \sum_{i:N, j:M} \min_{S \sim v_j} c_{ij} \|[u_{ij}, v_{ij}] - K_j S[R_j T_j][R_o T_o][x_i, y_i, z_i]\| \quad (8)$$

where S is a transform between different symmetries of the object, $v_j$ is the j-th view, and the remaining variables are defined as above with respect to Equation 7.

Figure 3:
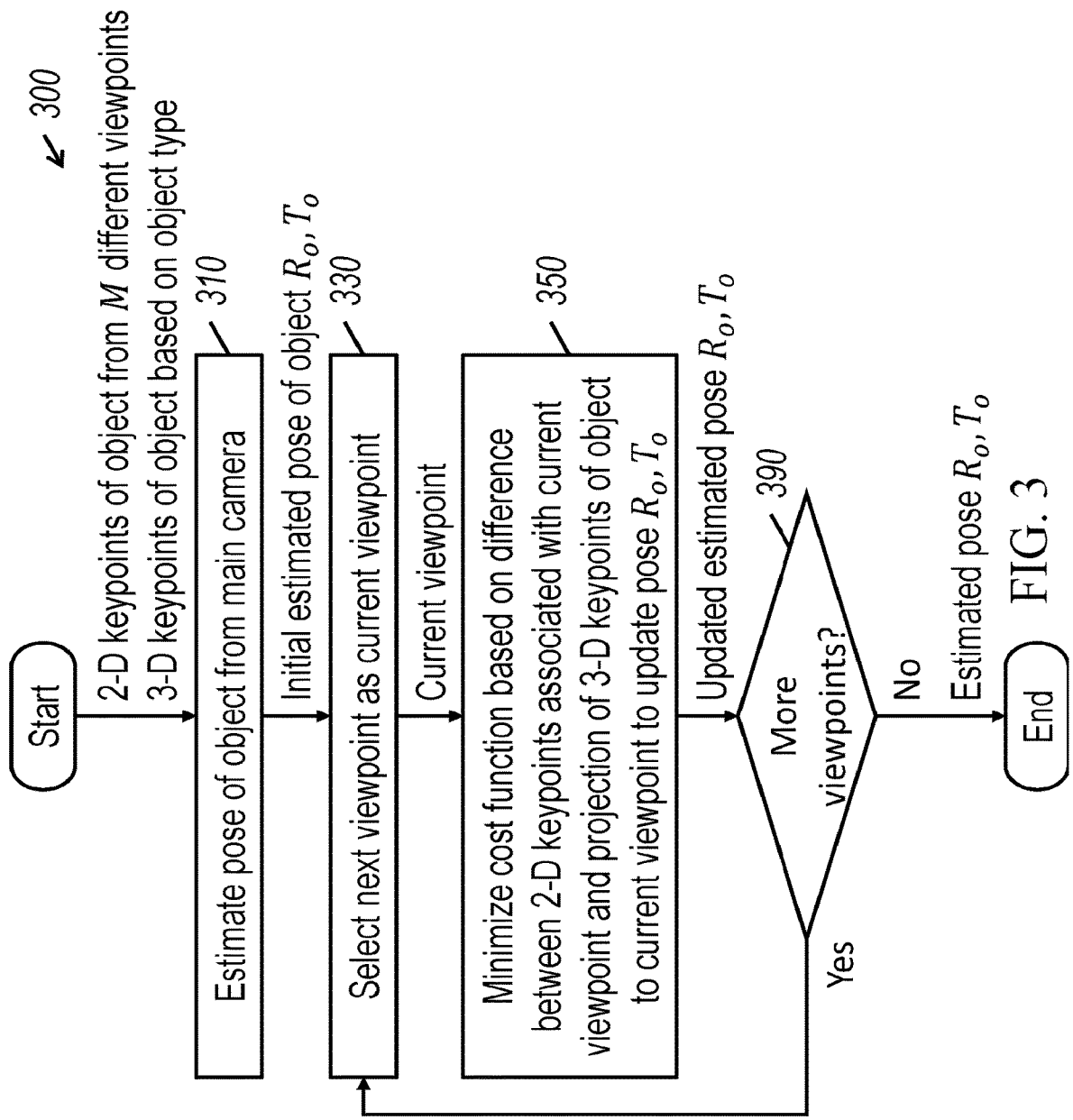
FIG. 3 is a flowchart depicting a method according to one embodiment of the present disclosure for estimating the pose of an object based on multiple views of the object.

In some embodiments, the pose estimator 100 iteratively refines the estimated pose $R_o$, $T_o$ of the current object on a viewpoint-by-viewpoint basis. FIG. 3 is a flowchart depicting a method 300 according to one embodiment of the present disclosure for estimating the pose of an object based on multiple views of the object. The process may begin with computing an estimated pose of the object based on images captured by the main camera 10. Because the main camera 10 is a depth camera (e.g., a stereo camera), the pose estimator 100 can compute the depth of surfaces in the scene based on disparity, and hence the depth of the surfaces of instances of objects detected in the scene.

In some embodiments, the pose estimator 100 aligns a 3-D model (e.g., CAD model) of the detected object with the portion of the depth map corresponding to an instance of the object to determine an initial estimated pose ($R_o, T_o$) of the object in operation 310.

In operation 330, the pose estimator 100 selects a next viewpoint among the remaining viewpoints (e.g., among the viewpoints corresponding to the support cameras) and sets that viewpoint as the "current viewpoint."

In operation 350, the pose estimator 100 minimizes a cost function (e.g., Equation 7 or 8, above) by computing an updated pose ($R_o, T_o$) that minimizes the difference or error between the 2-D keypoints of the object associated with the current viewpoint and the projection of the (pre-defined) 3-D keypoints to the current viewpoint. Because the expected pose of the object is expected to be close to the current estimate of the pose (e.g., the initial pose of the object computed in operation 310), in some embodiments the minimization process is restricted to searching a local window of values close to the current estimate, thereby improving the performance of the optimization process.

In operation 390, the pose estimator 100 determines whether there are additional viewpoints to consider. If so, then the process returns to operation 330 to select a next keypoint and to update the estimate based on the 2-D keypoints detected from the next viewpoint. If there are no additional keypoints, then the current estimate of the pose is output as the estimated pose ($R_o, T_o$) of the current object based on the multi-view keypoints.

In some embodiments, the combination of the main camera 10 and the support cameras 30 includes multiple stereo pairs (e.g., where the support cameras 30 include at least one stereo pair of cameras). In some of these embodiments, the entire segmentation, keypoint detection, and multi-view perspective-n-point process (e.g., of FIG. 2) is performed on each stereo pair independently, and then the pose estimator 100 matches objects based on 3D locations and epipolar lines across the multiple cameras. This leads to more accurate matches when the distance is larger, but may have a tradeoff of being more computationally intensive, which may result in longer runtimes.

Polarization Based Refinement

Some aspects of embodiments of the present disclosure relate to further refining the pose estimates computed in operation 290 based on polarization information. This process may be referred to herein as multi-view edge based refinement based on polarization, where one or more of the main camera 10 and/or the support cameras 30 are polarization cameras configured to capture polarization raw frames of the objects in a scene.

As noted above with respect to FIG. 1B, a light ray 43 hitting the image sensor 14 of a polarization camera 10 has three measurable components: the intensity of light (intensity image/I), the percentage or proportion of light that is linearly polarized (degree of linear polarization/DOLP/$\rho$), and the direction of that linear polarization (angle of linear polarization/AOLP/$\phi$).

Measuring intensity I, DOLP $\rho$, and AOLP $\phi$ at each pixel requires 3 or more polarization raw frames of a scene taken behind polarizing filters (or polarizers) at different angles, $\phi_{pol}$ (e.g., because there are three unknown values to be determined: intensity I, DOLP $\rho$, and AOLP $\phi$. For example, a polarization camera such as those described above with respect to FIGS. 1B, 1C, 1D, and 1E captures polarization raw frames with four different polarization angles $\phi_{pol}$, e.g., 0 degrees, 45 degrees, 90 degrees, or 135 degrees, thereby producing four polarization raw frames $I_{\phi pol}$, denoted herein as $I_0$, $I_{45}$, $I_{90}$, and $I_{135}$.

The relationship between $I_{\phi pol}$ and intensity I, DOLP $\rho$, and AOLP $\phi$ at each pixel can be expressed as:

$$I_{\phi pol} = I(1 + \rho \cos(2(\phi - \phi_{pol})) \quad (9)$$

Accordingly, with four different polarization raw frames $I_{\phi pol}$ ($I_0$, $I_{45}$, $I_{90}$, and $I_{135}$), a system of four equations can be used to solve for the intensity I, DOLP $\rho$, and AOLP $\phi$.

Shape from Polarization (SfP) theory (see, e.g., Gary A Atkinson and Edwin R Hancock. Recovery of surface orientation from diffuse polarization. IEEE transactions on image processing, 15(6):1653-1664, 2006.) states that the relationship between the refractive index (n), azimuth angle ($\theta_a$) and zenith angle ($\theta_z$) of the surface normal of an object and the (P and p components of the light ray coming from that object follow the following characteristics when diffuse reflection is dominant:

$$\rho = \frac{\left(n - \frac{1}{n}\right)^2 \sin^2(\theta_z)}{2 + 2n^2 - \left(n + \frac{1}{n}\right)^2 \sin^2\theta_z + 4\cos\theta_z\sqrt{n^2 - \sin^2\theta_z}} \quad (10)$$

$$\phi = \theta_a \quad (11)$$

and when the specular reflection is dominant:

$$\rho = \frac{2\sin^2\theta_z \cos\theta_z \sqrt{n^2 - \sin^2\theta_z}}{n^2 - \sin^2\theta_z - n^2\sin^2\theta_z + 2\sin^4\theta_z} \quad (12)$$

$$\phi = \theta_a - \frac{\pi}{2} \quad (13)$$

Note that in both cases p increases exponentially as Oz increases and if the refractive index is the same, specular reflection is much more polarized than diffuse reflection.

Accordingly, some aspects of embodiments of the present disclosure relate to applying SfP theory to detect or measure the gradients of surfaces (e.g., the orientation of surfaces or their surface normals or directions perpendicular to the surfaces) based on the raw polarization frames of the objects, as captured by the polarization cameras among the main camera 10 and the support cameras 30 and updating the estimated pose of the object by aligning a pre-existing 3-D model (e.g., CAD model) of the object with the measured surface normals of the object.

Leveraging polarization, a pose estimator 100 can accurately detect geometry and albedo edges of surface in the image. In circumstances where the pose estimator 100 stores a textured 3-D model (or CAD model) of the detected object, the pose estimator 100 also determines the geometry and albedo based edges for a given object pose as estimated by the multi-view pose estimation process discussed above (e.g., method 300). To refine the pose, the pose estimator 100 perturbs the pose in a similar fashion to an iterative closest point (ICP) algorithm until the edges of the 3-D model are aligned with the shape of the object (e.g., its edges and surface normals) computed from the images.

Figure 4:
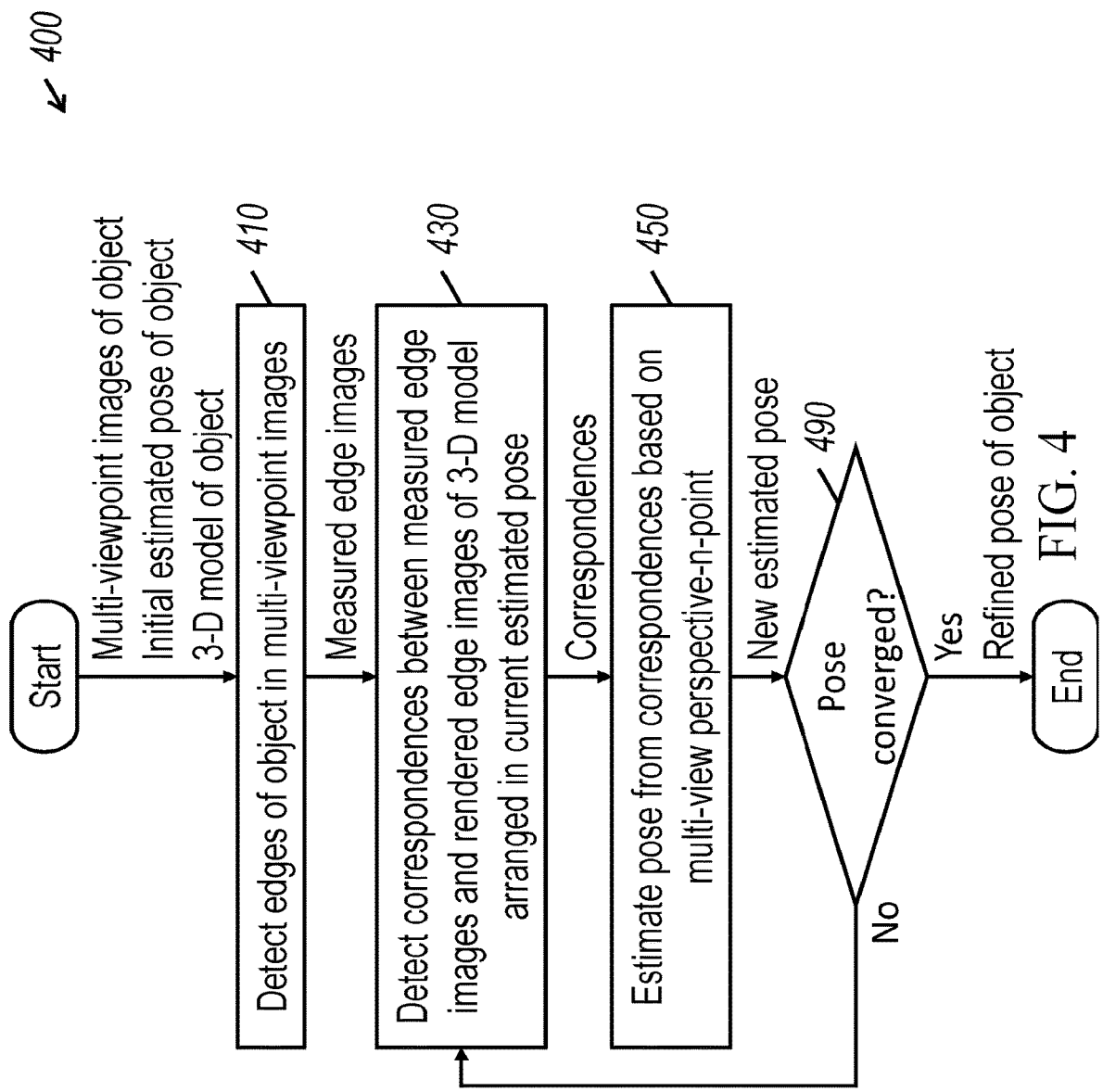
FIG. 4 is a flowchart of a method for edge-based refinement of a pose according to one embodiment of the present disclosure.

In more detail, FIG. 4 is a flowchart of a method for edge-based refinement of a pose based according to one embodiment of the present disclosure.

In operation 410, the pose estimator 100 computes multi-view edge images from the given multi-view input images. The multi-view edge images correspond to detected edges of the current object (whose pose is being estimated). These edges may include the outer boundary of the object against the rest of the scene (e.g., against a background or against other objects, detected or undetected, within the scene) and may also include internal edges, such as edges of a cube that are viewed head-on from the viewpoint of the image.

In some embodiments of the present disclosure, the edges of the object are detected based on shape from polarization, as described above, where edges correspond to the locations of discontinuities in the calculated surface normals. These discontinuities can be computed by applying an edge detection filter (such as the Canny edge detector or the differential edge detector, although embodiments of the present disclosure are not limited thereto). For example, in some embodiments of the present disclosure, a deep convolutional neural network is trained to detect edges in input images and/or features in polarization representation spaces (e.g. intensity, AOLP $\phi$, and DOLP $\rho$). Details on training neural networks based on polarization data are described in more detail below in another section.

In some embodiments of the present disclosure, a neural network trained to compute segmentation maps based on input images provided by the main camera 10 and the support cameras 30 computes its output segmentation maps with accurate and precise boundaries of the shapes. In more detail, some aspects of embodiments of the present disclosure relate to training deep learning models to perform semantic segmentation with sharp (e.g., low noise) and accurate boundaries in the instance segmentation map. Some techniques for performing semantic boundary prediction are described in Acuna, David, Amlan Kar, and Sanja Fidler. "Devil is in the edges: Learning semantic boundaries from noisy annotations." *Proceedings of the IEEE/CVF Conference on Computer Vision and Pattern Recognition.* 2019. By training such a deep learning model using labeled polarization information (e.g., polarization raw frames and/or features in polarization representation spaces, such as intensity, AOLP $\phi$, and DOLP $\rho$), embodiments of the present disclosure enable the accurate detection of boundaries of instances of optically challenging objects, in addition to objects that might otherwise be detectable by images captured by comparative color cameras.

Accordingly, in some embodiments of the present disclosure, the edges in an image are detected based on the locations of the boundaries of instances in a segmentation map corresponding to the image (e.g., computed, directly or indirectly, based on the image).

In some embodiments of the present disclosure, the pose estimator 100 detects edges based on a combination of shape from polarization and instance segmentation, as discussed above.

In operation 430, the pose estimator 100 detects correspondences between the measured edge images detected from the multi-viewpoint images of the object in operation 410 with rendered edges of a 3-D model of the object arranged in a virtual scene in accordance with the current pose estimate. In more detail, the current pose estimate $R_o$, $T_o$ (initialized based on a previously estimated pose, such as through multi-point perspective-n-point using keypoint matching, as described above with respect to FIG. 3) is used to transform the 3-D model of the object to approximate the pose of the real object in the scene. The pose estimator 100 then renders edge images of the 3-D model from the viewpoints associated with the cameras (e.g., the main camera 10 and the support cameras 30), as well as the depth of each pixel in the rendered scene (e.g., the distance from the virtual camera at a pose corresponding to the viewpoint of the corresponding real camera) and searches for correspondences (within a distance threshold) between edge pixels of the rendered edge images and the measured edge images.

In operation 450, the pose estimator 100 estimates a new pose based on the correspondences (e.g., based on minimizing a difference in positions between the correspondence as discussed above using multi-view perspective-n-point similar to that described above with respect to FIG. 3), and evaluates the new pose based on a loss computed using a cost function (such as based on a Gaussian pyramid to perform a multi-scale evaluation of the quality of the alignment between the locations of the edges based on the current estimated pose and the measured edges). If the new pose is better (e.g., has a lower loss than a previous best pose in accordance with a cost function), then this new pose is stored as the current best pose.

In operation 490, the pose estimator 100 determines whether the pose has converged, such as whether the change in the cost function (or current loss) is less than a threshold value (e.g., less than $10^{-4}$) between the previous best pose and the currently computed pose. If not, then the process returns to operation 430 to render images of the 3-D model of the object based on the current best pose and compute a new pose based on these rendered images in operation 450. If the pose has converged, then the current best pose $R_o, T_o$ is returned as the refined pose of the object.

The below table presents, as pseudocode, the edge alignment process described above with respect to FIG. 4:

TABLE

Edge Alignment Pseudo Code

```
prev_loss = inf
P_O = initial_pose # (from pose estimation pipeline, e.g., FIG. 3)
converged = False
while not converged:
    all_correspondences = [ ]
    for j, view_edges in enumerate(edge_images):
        rendered_edge_pixels = render_edges(Cam_j, P_i-1, cad_model)
        rendered_depth = render_depth(Cam_j, P_i-1, cad_model)
        potential_correspondences = [ ]
        for (x, y) in rendered_edge_pixels:
            correspondences = find_corr(x, y, view_edges,
distance_threshold)
            for (x2, y2) in correspondences:
                potential_correspondences.append([x2, y2,
depth2xyz(rendered_depth[x, y])])
        all_correspondences.append(potential_correspondences)
    best_loss = inf
    best_pose = None
    for i in range(iters):
        correspondences = random.sample(all_correspondences)
        pose_new = multi_view_pnp(correspondences)
        Loss = 0
        for j, view_edges in enumerate(edge_images):
            rendered_edge_pixels = render_edges(Cam_j, P_new, cad_model)
            Loss += GaussianPyramid(view_edges, rendered_edge_pixels)
        if Loss < best_loss:
            best_loss = Loss
            best_pose = pose_new
    if best_loss - prev_loss < 1e-4:
        converged = True
    else prev_loss = best_loss
```

Figure 5:
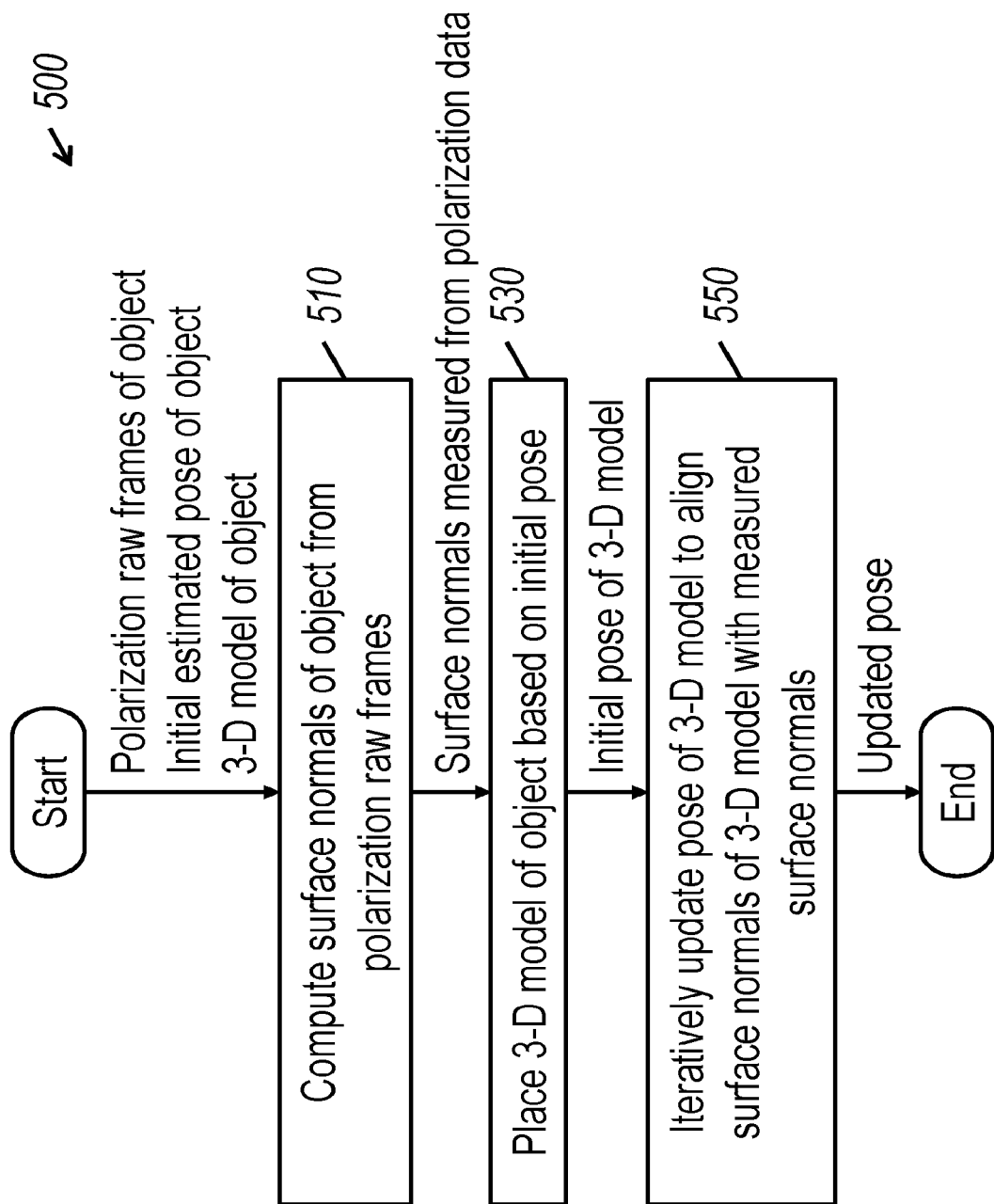
FIG. 5 is a flowchart depicting a method for surface normals-based refinement of a pose based on polarization data according to one embodiment of the present disclosure.

FIG. 5 is a flowchart depicting a method 500 for surface normals-based refinement of a pose based on polarization data according to one embodiment of the present disclosure. In the embodiment shown in FIG. 5, inputs to the method 500 include polarization raw frames of the current object (or extracted features in polarization representation spaces), an initial estimated pose of the object (e.g., as previously computed based on other techniques such as multi-view perspective-n-point), and a pre-existing 3-D model of the object (e.g., a 3-D model of the object stored by the pose estimator 100, where the pose estimator 100 identifies the 3-D model corresponding to the object based on a class of the object as identified through instance segmentation of the input images).

In operation 510, the pose estimator 100 computes or measures surface normals of the object based on polarization raw frames captured of the object. In more detail, the pose estimator 100 may take, as input, portions of polarization raw frames (that were captured by one or more polarization cameras among the main camera 10 and support cameras 30) that correspond to regions (detected through instance segmentation) corresponding to the current object. In some embodiments, only one of the cameras among the main camera 10 and the support cameras 30 is a polarization camera. In some embodiments, multiple cameras among the main camera and the support cameras 30 are (or include) polarization cameras. The polarization raw frames are used to compute features in polarization representation spaces (e.g., intensity I, DOLP $\rho$, and AOLP $\phi$) corresponding to the object, and these polarization features are used to compute the surface normals of the object (e.g., directions perpendicular to the surface of the object).

In operation 530, the pose estimator 100 places the 3-D model within the global coordinate system in accordance with a previously estimated pose, such as a pose estimate computed based on multi-view perspective-n-point, as discussed above.

The 3-D model of the object includes geometric definitions of the locations of the surfaces of the object, and in some embodiments, the pose estimator 100 computes the surface normals of the posed 3-D model. In operation 550, the pose estimator 100 iteratively updates the pose of the 3-D model to align the surface normals of the 3-D model with the surface normals measured in operation 510, in a manner similar to the iterative closest point (ICP) algorithm. In some embodiments, the pose estimator 100 computes a cost function that compares (e.g., computes a difference between) the surface normals of the 3-D model with the surface normals measured based on the polarization raw frames captured from each viewpoint having a polarization camera, and the pose estimator 100 updates the pose of the 3-D model of the object to minimize the difference between the surface normals of the posed 3-D model and the measured surface normals (e.g., computes a pose $R_o, T_o$, that minimizes the cost computed by the cost function). In some embodiments, the pose estimator 100 determines correspondences between the portions of the surfaces appearing in the images of the object and in a rendering of the 3-D model placed in the accordance with the current pose and computes the difference between the measured surface normals and the surface normals at the corresponding portions of the posed 3-D model.

In some embodiments of the present disclosure, the refinement of the pose estimates is performed based on both alignment based on detected edges (such as in accordance with the method 400 shown in FIG. 4) and alignment based on surface normals (such as in accordance with the method 500 shown in FIG. 5). For example, updating a pose $R_o, T_o$, of an object may jointly optimize a cost function that includes terms for both the error in the matching of measured edges of the object with the edges of the 3-D model posed in accordance with the current estimated pose and error in the matching of the measured surface normals of the object and the surface normals of the 3-D model posed in accordance with the current estimated pose.

Training Deep Neural Networks Based on Generated Training Data, Including Polarization Training Data Generally, a computer vision system for computing segmentation maps that classify objects depicted in a scene may include a trained convolutional neural network that takes two-dimensional images (e.g., as captured by a color camera) as input and outputs segmentation maps based on those images. Such a convolutional neural network may be a pre-trained on an existing data set such as ImageNet (see, e.g., see, e.g., J. Deng, W. Dong, R. Socher, L.-J. Li, K. Li and L. Fei-Fei, ImageNet: A Large-Scale Hierarchical Image Database. *IEEE Computer Vision and Pattern Recognition (CVPR)*, 2009). However, these existing data sets may contain images that are not representative of the images that are expected to be encountered in the particular application of the computer vision system, and therefore these pre-trained models may have poor performance on the particular computer vision task that the computer vision system is intended to perform. For example, a computer vision system for a manufacturing environment is more likely to encounter images of tools, partially assembled products, manufacturing components, and the like, rather than images of people, animals, household objects, and outdoors environments that may be found in more "general purpose" data sets.

As such, "retraining" relates to updating the parameters (e.g., connection weights) of a pre-trained model based on additional training data from a particular target domain associated with the task to be performed by the re-trained model. Continuing the above example, labeled images of tools, partially assembled products, components, and the like from a particular manufacturing environment may be used as training data for retraining a pre-trained model (e.g., a pre-trained convolutional neural network) to improve its performance in detecting and classifying objects encountered in that manufacturing environment. However, manually collecting different images of typical scenes in that manufacturing environment and labeling these images based on their ground truth values (e.g., identifying pixels that correspond to different classes of objects) is generally a time consuming and expensive task.

As noted above, three-dimensional (3-D) rendering computer graphics software may be used to generate training data for training machine learning models for performing computer vision tasks. For example, existing 3-D models of those tools, partially assembled products, and manufacturing components may be arranged in a virtual scene in accordance with the variety of ways in which such objects may be encountered in the real-world (e.g., including lighting conditions and 3-D models of support surfaces and equipment in the environment). For example, partially assembled products may be placed on a 3-D model of a conveyor belt, components may be located in a parts bin, and tools may be placed on a tool bench and/or within a scene in the process of positioning a component within a partially assembled product. Accordingly, a 3-D computer graphics rendering system is used to generate photorealistic images of the range of typical arrangements of objects in a particular environment. These generated images can also be automatically labeled. In particular, when the particular 3-D models used to depict each of the different types of objects are already associated with class labels (e.g., screws of various sizes, pre-assembled components, products at various stages of assembly, particular types of tools, etc.), segmentation maps can be automatically generated (e.g., by mapping surfaces of objects to their particular class labels).

However, 3-D rendering computer graphics software systems are generally tailored for generating images that represent typical imaging modalities based on the intensity of visible light (e.g., the intensities of red, green, and blue light). Such 3-D rendering software, such as Blender® by the Blender Foundation, generally does not account for behaviors of electromagnetic radiation that may be invisible or otherwise negligible when rendering photorealistic scenes. Examples of these additional behaviors include the polarization of light (e.g., as polarized light interacts with transparent objects and reflective objects in a scene, as detected by a camera with a polarizing filter in its optical path), thermal or infrared radiation (e.g., as emitted by warm objects in a scene and as detected by a camera system sensitive to detect infrared light), ultraviolet radiation (e.g., as detected by a camera system sensitive to ultraviolet light), combinations thereof (e.g., polarization with thermal radiation, polarization with visible light, polarization with ultraviolet light, etc.), and the like.

Therefore, aspects of embodiments of the present disclosure relate to systems and methods for modeling the behavior of various materials when imaged based on polarization or other imaging modalities. The data (e.g., images) generated in accordance with embodiments of the present disclosure may then be used as training data for training deep learning models such as deep convolutional neural networks to compute predictions based on imaging modalities other than standard imaging modalities (e.g., the intensity of visible light or light in a visible portion of the electromagnetic spectrum).

As a motivating example, embodiments of the present disclosure will be described in the context of generating synthetic images of objects captured through a polarizing filter (referred to herein as "polarization raw frames"), where these images may be used in training a deep neural network such as a convolutional neural network to perform a task based on polarization raw frames. However, embodiments of the present disclosure are not limited to generating synthetic polarization raw frames for training a convolutional neural network that takes polarization raw frames (or features extracted therefrom) as input data.

Figure 6:
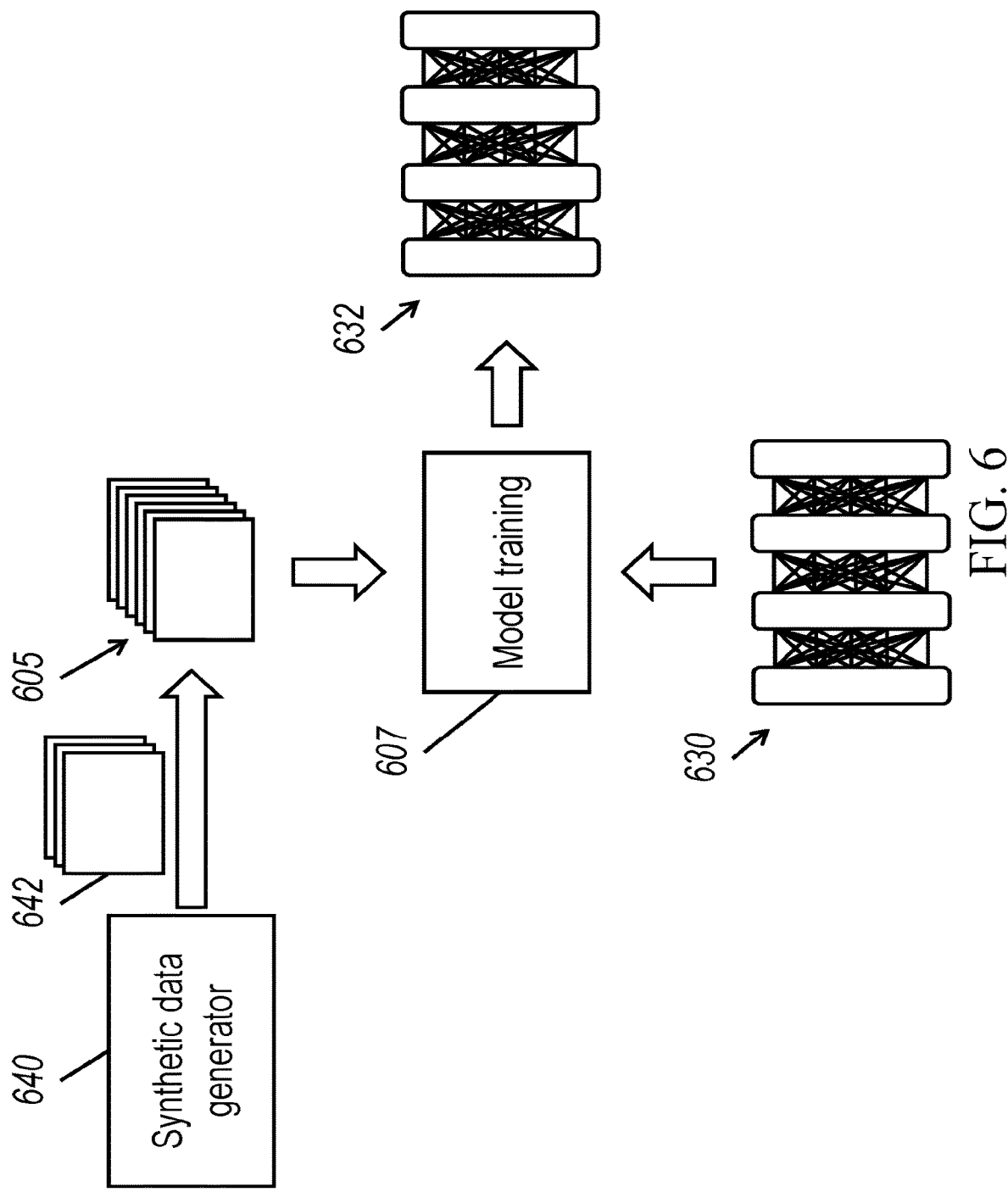
FIG. 6 is a block diagram depicting a system for training a statistical model to perform computer vision tasks based on images in various modalities, where the training is performed using data generated in accordance with embodiments of the present disclosure.

FIG. 6 is a block diagram depicting a system for training a statistical model to perform computer vision tasks based on images in various modalities, where the training is performed using data generated in accordance with embodiments of the present disclosure. as shown in FIG. 6, training data 605 is supplied to a model training system 607, which takes a model 630 (e.g., a pre-trained model or a model architecture with initialized weights) and uses the training data 5 to generate a trained model (or re-trained model) 632. The model 630 and the trained model 632 may be a statistical model such as a deep neural network (deep neural networks include convolutional neural networks). A synthetic data generator 640 according to embodiments of the present disclosure generates synthesized data 642, which may be included with the training data 605 for generating the trained model 632. The model training system 607 may apply an iterative process for updating the parameters of the model 630 to generate the trained model 632 in accordance with the supplied training data 605 (e.g., including the synthesized data 642). The updating of the parameters of the model 630 may include, for example, applying gradient descent (and, in the case of a neural network, backpropagation) in accordance with a loss function measuring a difference between the labels and the output of the model in response to the training data. The model training system 607 and the synthetic data generator 640 may be implemented using one or more electronic circuits.

According to various embodiments of the present disclosure, the model training system 607 and/or the synthetic data generator 640 are implemented using one or more electronic circuits configured to perform various operations as described in more detail below. Types of electronic circuits may include a central processing unit (CPU), a graphics processing unit (GPU), an artificial intelligence (AI) accelerator (e.g., a vector processor, which may include vector arithmetic logic units configured efficiently perform operations common to neural networks, such dot products and softmax), a field programmable gate array (FPGA), an application specific integrated circuit (ASIC), a digital signal processor (DSP), or the like. For example, in some circumstances, aspects of embodiments of the present disclosure are implemented in program instructions that are stored in a non-volatile computer readable memory where, when executed by the electronic circuit (e.g., a CPU, a GPU, an AI accelerator, or combinations thereof), perform the operations described herein to compute a segmentation map from input polarization raw frames or input polarization features in polarization representation spaces (e.g., intensity, AOLP, and DOLP). The operations performed by the model training system 607 and the synthetic data generator 640 may be performed by a single electronic circuit (e.g., a single CPU, a single GPU, or the like) or may be allocated between multiple electronic circuits (e.g., multiple GPUs or a CPU in conjunction with a GPU). The multiple electronic circuits may be local to one another (e.g., located on a same die, located within a same package, or located within a same embedded device or computer system) and/or may be remote from one other (e.g., in communication over a network such as a local personal area network such as Bluetooth®, over a local area network such as a local wired and/or wireless network, and/or over wide area network such as the internet, such a case where some operations are performed locally and other operations are performed on a server hosted by a cloud computing service). One or more electronic circuits operating to implement the model training system 607 and the synthetic data generator 640 may be referred to herein as a computer or a computer system, which may include memory storing instructions that, when executed by the one or more electronic circuits, implement the systems and methods described herein.

Figure 7B:
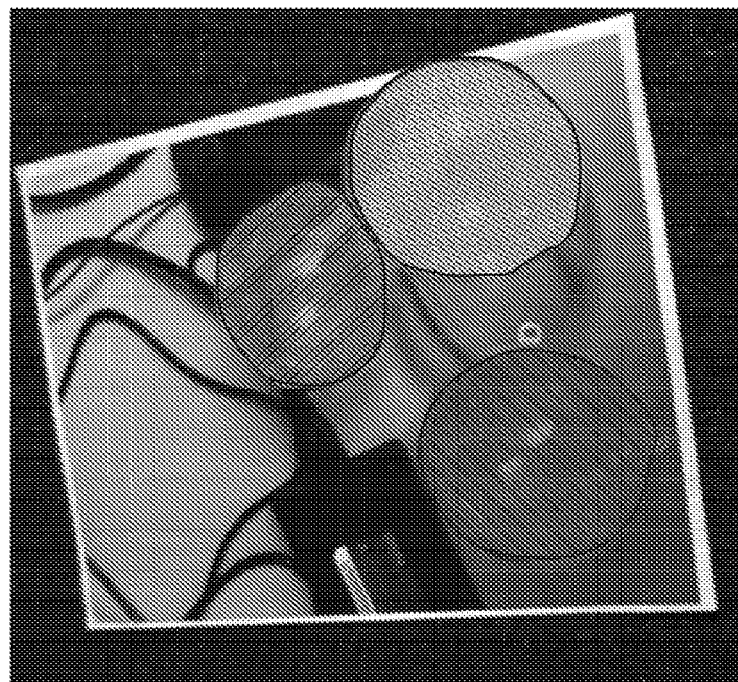
FIG. 7B depicts the intensity image of FIG. 7A with an overlaid segmentation mask as computed by a comparative Mask Region-based Convolutional Neural Network (Mask R-CNN) identifying instances of transparent balls, where the real transparent ball is correctly identified as an instance, and the two spoofs are incorrectly identified as instances.
Figure 7A:
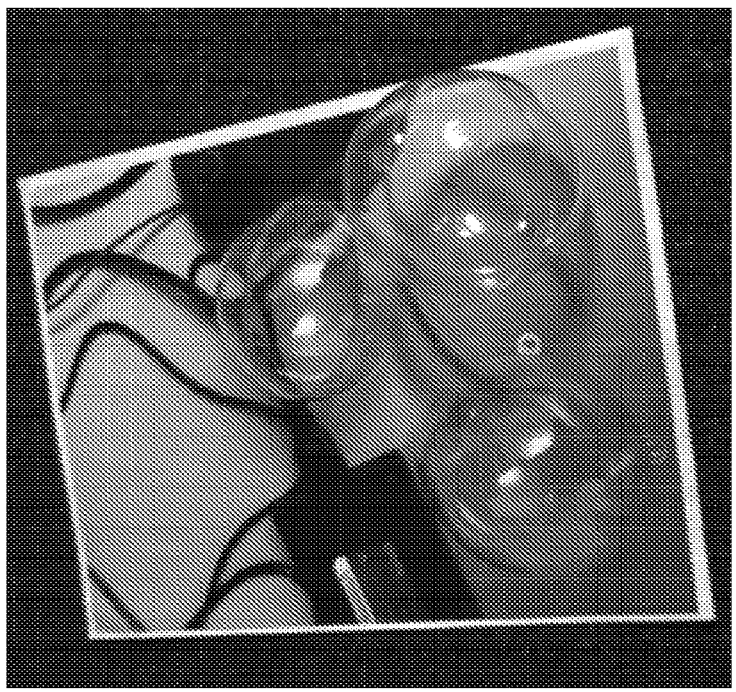
FIG. 7A is an image or intensity image of a scene with one real transparent ball placed on top of a printout of photograph depicting another scene containing two transparent balls ("spoofs") and some background clutter.

FIGS. 7A, 7B, 7C, and 7D provide background for illustrating the segmentation maps computed by a comparative approach and semantic segmentation or instance segmentation according to embodiments of the present disclosure. In more detail, FIG. 7A is an image or intensity image of a scene with one real transparent ball placed on top of a printout of photograph depicting another scene containing two transparent balls ("spoofs") and some background clutter. FIG. 7B depicts an segmentation mask as computed by a comparative Mask Region-based Convolutional Neural Network (Mask R-CNN) identifying instances of transparent balls overlaid on the intensity image of FIG. 7A using different patterns of lines, where the real transparent ball is correctly identified as an instance, and the two spoofs are incorrectly identified as instances. In other words, the Mask R-CNN algorithm has been fooled into labeling the two spoof transparent balls as instances of actual transparent balls in the scene.

Figure 7D:
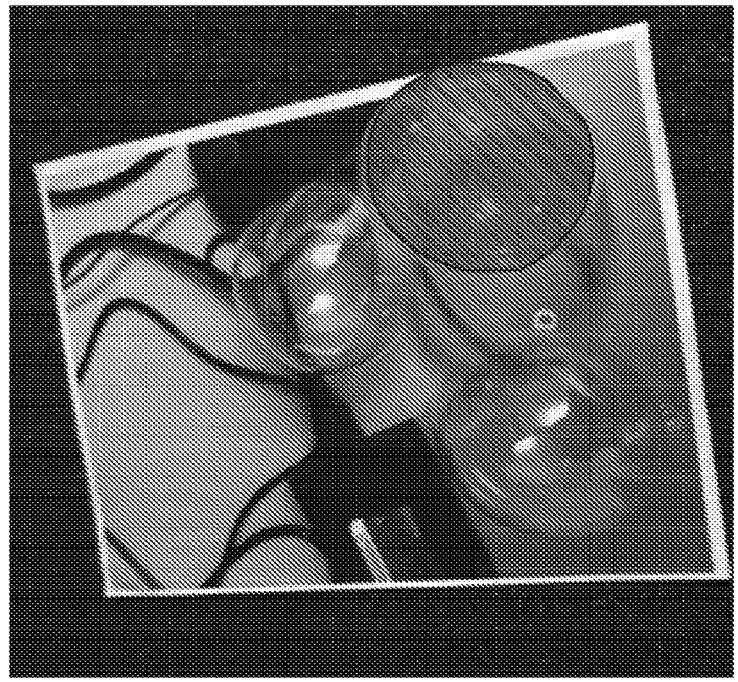
FIG. 7D depicts the intensity image of FIG. 7A with an overlaid segmentation mask as computed using polarization data in accordance with an embodiment of the present invention, where the real transparent ball is correctly identified as an instance and the two spoofs are correctly excluded as instances.
Figure 7C:
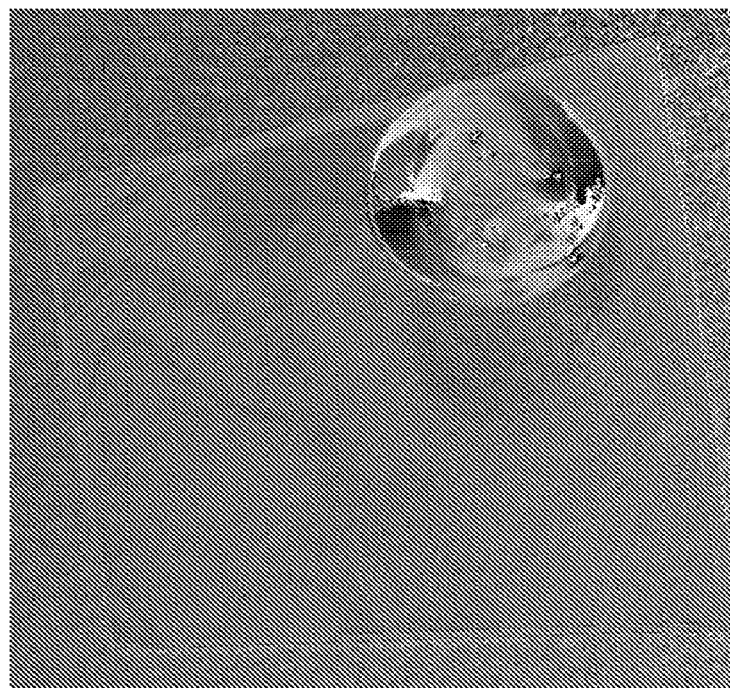
FIG. 7C is an angle of polarization image computed from polarization raw frames captured of the scene according to one embodiment of the present invention.

FIG. 7C is an angle of linear polarization (AOLP) image computed from polarization raw frames captured of the scene according to one embodiment of the present invention. As shown in FIG. 7C, transparent objects have a very unique texture in polarization space such as the AOLP domain, where there is a geometry-dependent signature on edges and a distinct or unique or particular pattern that arises on the surfaces of transparent objects in the angle of linear polarization. In other words, the intrinsic texture of the transparent object (e.g., as opposed to extrinsic texture adopted from the background surfaces visible through the transparent object) is more visible in the angle of polarization image of FIG. 7C than it is in the intensity image of FIG. 7A.

FIG. 7D depicts the intensity image of FIG. 7A with an overlaid segmentation mask as computed using polarization data in accordance with an embodiment of the present invention, where the real transparent ball is correctly identified as an instance using an overlaid pattern of lines and the two spoofs are correctly excluded as instances (e.g., in contrast to FIG. 7B, FIG. 7D does not include overlaid patterns of lines over the two spoofs). While FIGS. 7A, 7B, 7C, and 7D illustrate an example relating to detecting a real transparent object in the presence of spoof transparent objects, embodiments of the present disclosure are not limited thereto and may also be applied to other optically challenging objects, such as transparent, translucent, and non-matte or non-Lambertian objects, as well as non-reflective (e.g., matte black objects) and multipath inducing objects.

Figure 8:
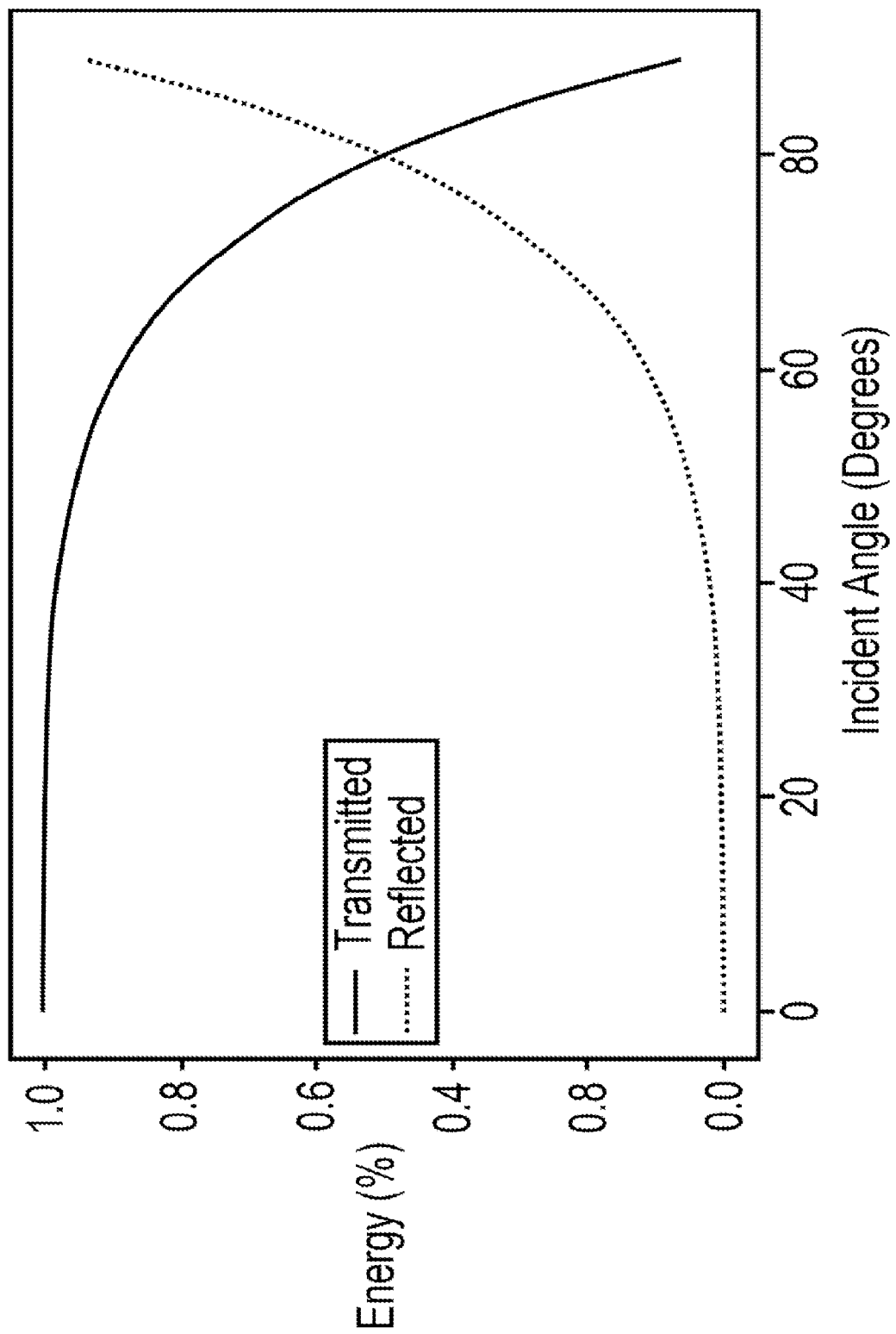
FIG. 8 is a graph of the energy of light that is transmitted versus reflected over a range of incident angles to a surface having a refractive index of approximately 1.5.

FIG. 8 is a graph of the energy of light that is transmitted versus reflected over a range of incident angles to a surface having a refractive index of approximately 1.5. As shown in FIG. 8, the slopes of the transmitted energy (shown in FIG. 8 with a solid line) and reflected energy (shown in FIG. 8 with a dotted line) lines are relatively small at low incident angles (e.g., at angles closer to perpendicular to the plane of the surface). As such, small differences in the angle of the surface may be difficult to detect (low contrast) in the polarization pattern when the angle of incidence is low (e.g., close to perpendicular to the surface, in other words, close to the surface normal). On the other hand, the slope of the reflected energy increases from flat, as the angle of incidence increases, and the slope of the transmitted energy decreases from flat (to have a larger absolute value) as the angle of incidence increases. In the example shown in FIG. 8 with an index of refraction of 1.5, the slopes of both lines are substantially steeper beginning at an incident angle of around 60°, and their slopes are very steep at an incident angle of around 80°. The particular shapes of the curves may change for different materials in accordance with the refractive index of the material. Therefore, capturing images of surfaces under inspection at incident angles corresponding to steeper portions of the curves (e.g., angles close to parallel to the surface, such as around 80° in the case of a refractive index of 1.5, as shown in FIG. 8) can improve the contrast and detectability of variations in the surface shapes in the polarization raw frames 18 and may improve the detectability of such features in tensors in polarization representation spaces, because small changes in incident angle (due to the small changes in the surface normal) can cause large changes in the captured polarization raw frames.

Figure 9:
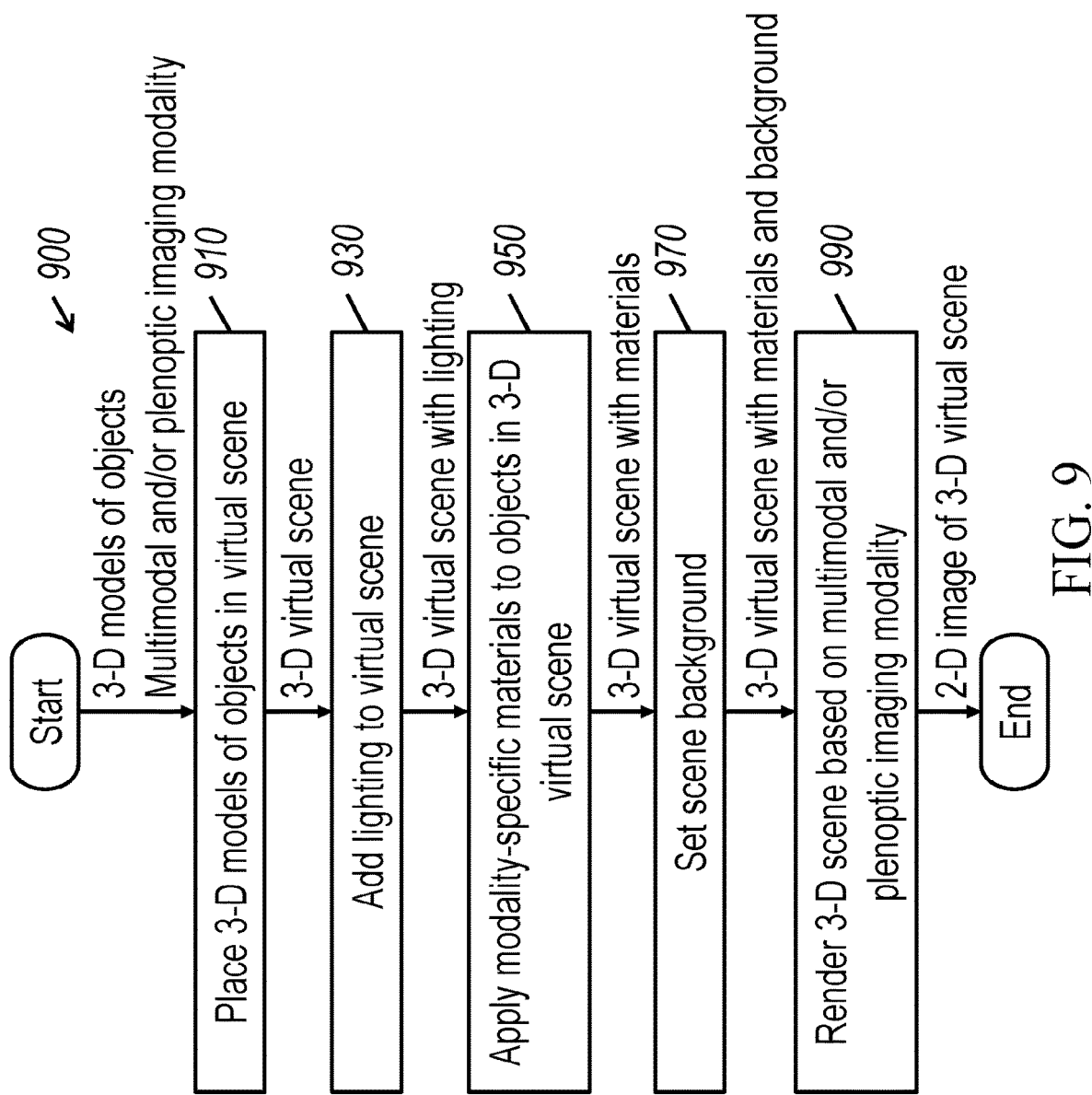
FIG. 9 is a flowchart depicting a pipeline for generating synthetic mages according to one embodiment of the present disclosure.

FIG. 9 is a flowchart depicting a pipeline for generating synthetic mages according to one embodiment of the present disclosure. In some embodiments of the present disclosure, the operations of FIG. 9 are performed by the synthetic data generator 40, for example, in special-purpose program instructions stored in a memory of the synthetic data generator 40 that, when executed by the processor of the synthetic data generator 40, cause the synthetic data generator 40 to perform the special-purpose operations described herein for generating synthetic images based on the physical simulation of optical phenomena. For the sake of convenience, aspects of embodiments of the present disclosure will be described in the context of applying polarization imaging in a manufacturing context to perform computer vision tasks on optically challenging manufacturing components and tools, such as objects having transparent, shiny metal, and/or dark matte surfaces.

In operation 910, the synthetic data generator 40 places 3-D models of objects in a virtual scene. In the context of generating synthetic images of scenes in a manufacturing environment, 3-D models of objects may be readily available from computer aided design (CAD) models of components and partially or fully assembled manufactured products. These CAD models may have previously been produced in the product design phase and may be obtained from, for example, the vendor of the component (e.g., from the vendor who supplied the components to the manufacturer), publicly available information (e.g., data sheets), or from internal product designers employed by the manufacturer. In some circumstances the CAD models may be manually generated based on specifications of a component.

In some embodiments of the present disclosure, the 3-D models of objects are placed in a virtual scene in a manner resembling the arrangement of those objects as they would be expected to be encountered for the particular computer vision task that the machine learning model will be trained to perform.

In the above example of computer vision in a manufacturing context, one task is to perform instance segmentation on a bin of components, where the components may be homogeneous (e.g., all the components in the bin are the same, such as a bin of springs or screws) or heterogeneous (e.g., a mix of different types of components, such as screws of different sizes or screws mixed with matching nuts). The objects may be randomly arranged within the bin, where the components may be oriented in many different directions in the bin, and where, in a bin of heterogeneous components, the different types of components are mixed together, as opposed to being separated in different parts of the bin. A computer vision system may be trained to compute a segmentation map of the bin, to identify the location and orientation of individual components within the bin (and, in the case of a bin of heterogenous components, the types of the objects). This segmentation map can then be used by an actuator system, such that a robotic arm, to pick components out of the bin and add the picked components to a partially assembled product.

Accordingly, in some embodiments of the present disclosure, the synthetic data generator 40 generates a scene of components in a bin by placing a 3-D model of a virtual bin in a scene, and dropping 3-D models of components into the virtual bin, as simulated using a physics simulation engine, such as a physics engine incorporated into a 3-D computer graphics rendering system. For example, the Blender® 3-D rendering software includes a physics system that simulates various physical real-world phenomena such as the movement, collision, and potential deformation of rigid bodies, cloth, soft bodies, fluids, and the like, as affected by gravity or other forces. Accordingly, a rigid body simulation may be used for simulating the dropping of rigid components (e.g., screws, bolts, relatively stiff springs) into a rigid virtual bin, and a soft body simulation may be used for elastic or deformable components (e.g., string, wire, plastic sheeting, etc.) into a rigid virtual bin.

In more detail, a variety of difference scenes representing different potential states of the bin may be generated, such as by dropping various numbers of instances of the 3-D models of the components into a virtual bin. For example, if a typical bin has a maximum capacity of 1,000 screws, various scenes can be generated by dropping 1,000 screws, 900 screws, 500 screws, 100 screws, and 10 screws into a virtual bin to generate different scenes representing different potential fullness states of the virtual bin. In addition, multiple scenes may be generated for any given number of screws (or the number of screws may be randomized between the generation of different scenes), where the arrangement of components within the bin is also randomized, such as by dropping components into the bin, one at a time, from different random locations above the bin.

Accordingly, in operation 910, the synthetic data generator 40 generates a scene containing an arrangement of representative objects.

In operation 930, the synthetic data generator 40 adds lighting to the virtual scene generated in operation 910. In particular, the synthetic data generator 40 adds one or more light sources to the virtual scene, where the light sources illuminate part or all of the surfaces of the objects in the bin. In some embodiments, the position of the one or more light sources is randomized, and multiple scenes are generated with light sources in different locations (e.g., different angles and distances) relative to the bin of parts in order to improve the robustness of the training. In some embodiments of the present disclosure, the virtual lighting includes virtual light sources that are representative of the light sources that would be found in environments in which the computer vision system is trained to operate. Examples of potential representative light sources include different color temperatures corresponding to, for example, incandescent lights, fluorescent lights, light emitting diode (LED) bulbs, natural light from a simulated window in the environment, and other forms of lighting technology, where the shape of the virtual lights (e.g., the direction of the rays emitted by the lights) may be in a range from direct light to diffuse light. In some embodiments of the present disclosure, the character of the light (e.g., color temperature and shape) is also randomized to generate different scenes with different types of lighting.

In operation 950, the synthetic data generator 40 applies modality-specific materials to the objects in the 3-D virtual scene. For example, in the case of generating synthesized polarization imaging data, polarization-specific materials are applied to the objects in the virtual scene, whereas in the case of generating synthesized thermal imaging data, thermal imaging-specific materials may be applied to the objects in the virtual scene. For the sake of illustration, polarization-specific materials will be described in detail herein, but embodiments of the present disclosure are not limited thereto and may also be applied to generating and applying materials specific to multimodal imaging modalities and/or plenoptic imaging modalities.

Some aspects of embodiments of the present disclosure relate to domain randomization, in which the material appearance of objects in a scene are randomized beyond the typical appearance of the objects. For example, in some embodiments, a large number of materials with random colors (e.g., thousands of different materials of different, randomly selected colors) are applied to the different objects in the virtual scene. In a real-world environment, the objects in a scene generally have well-defined colors (e.g., rubber washers generally all look matte black and screws may be particular shades of shiny black, matte black, gold, or shiny metal). However, real-world objects can often have different appearances due to changes in lighting conditions, such as the color temperature of lights, reflections, specular highlights, and the like. Accordingly, applying randomization to the colors of the materials applied to the objects when generating training data expands the domain of the training data to also encompass unrealistic colors, thereby increasing diversity in the training data for training a more robust machine learning model that is capable of making accurate predictions (e.g., more accurate instance segmentation maps) in a wider variety of real-world conditions.

Some aspects of embodiments of the present disclosure relate to performing texture mapping to generate models of materials that are dependent on one or more parameters (parameterized materials) in accordance with the imaging modality. For example, as discussed above, the appearance of a given surface in a scene, as imaged by a polarization camera system, may change based on the properties of the material of the surface, the spectral profile and polarization parameters of the illumination source or illumination sources (light sources) in the scene, the incident angle of light onto the surface, and the viewpoint angle of the observer (e.g., the polarization camera system). As such, simulating the physics of polarization for different materials is a complex and computationally-intensive task.

As such, some aspects of embodiments of the present disclosure relate to emulating the physics of various imaging modalities based on empirical data, such as real-world images captured of real-world materials. In more detail, an imaging system implementing the particular imaging modality of interest (e.g., a polarization camera system) is used to collect sample images from an object made of the particular material of interest. In some embodiments, the collected sample images are used to compute an empirical model of the material, such as its surface light-field function (e.g., a bi-directional reflectance density function or BRDF).

Generally, some techniques for generating empirical models of materials include capturing samples of images of representative materials from multiple viewing angles and with multiple different illumination angles.

Figure 10:
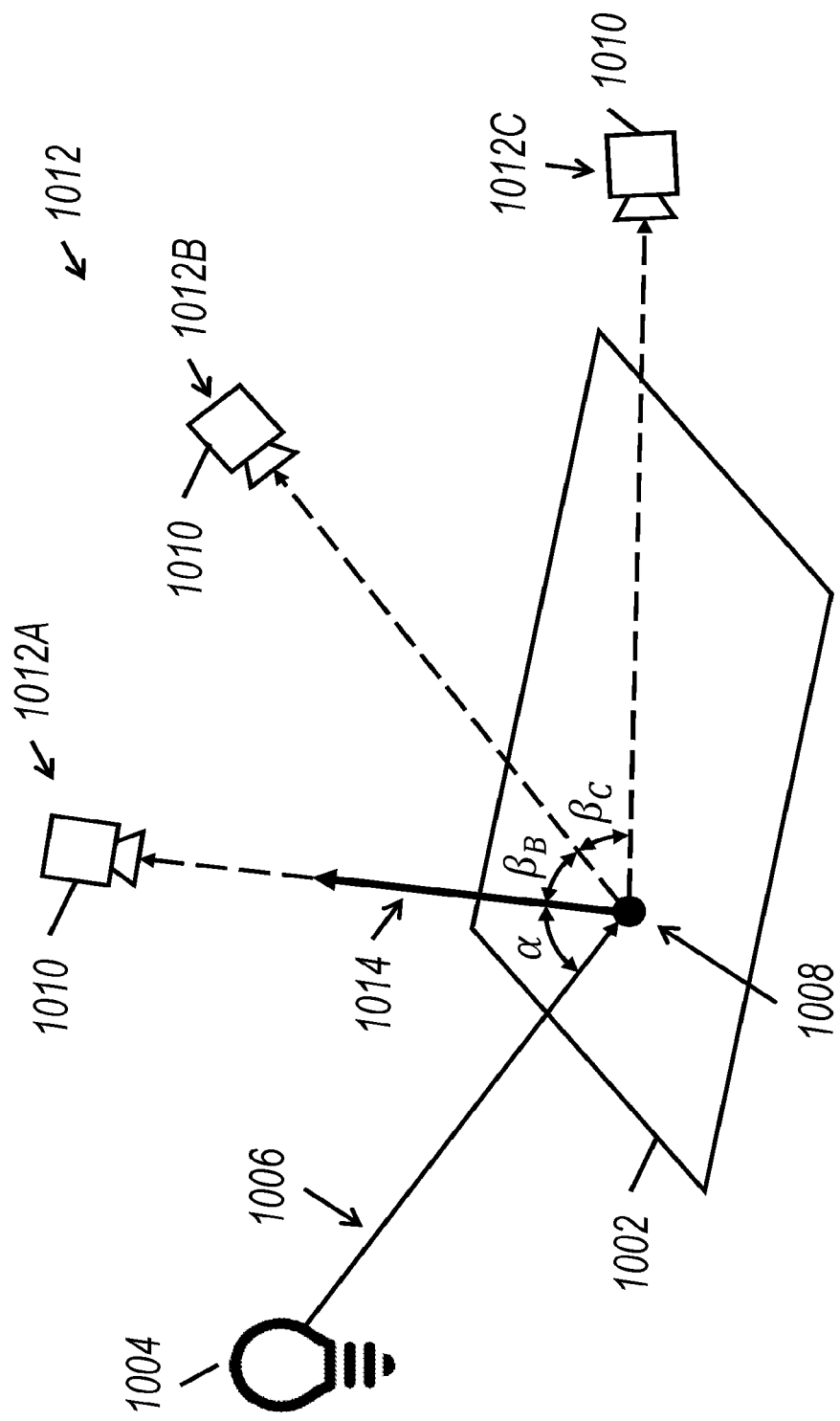
FIG. 10 is a schematic diagram of the sampling a real material from multiple angles using a polarization camera system according to one embodiment of the present disclosure.

FIG. 10 is a schematic diagram of the sampling a real material from multiple angles using a polarization camera system according to one embodiment of the present disclosure. As shown in FIG. 10, a surface 1002 of a physical object (e.g., a washer, a screw, or the like) is made of a material of interest (e.g., respectively, black rubber, chrome plated stainless steel, or the like). In operation 810, this material is placed into a physical scene (e.g., on a laboratory benchtop). A physical illumination source 1004, such as an LED lamp or a fluorescent lamp is placed in the scene and arranged to illuminate at least a portion of the surface 1002. For example, as shown in FIG. 10, ray 1006 emitted from the physical illumination source 1004 is incident on a particular point 1008 of the surface 1002 at an incident angle α at a particular point 1008 on the surface 1002 with respect to the normal direction 1014 of the surface 1002 at that particular point 1008.

An imaging system is used to capture images of the surface 1002 of the object from multiple poses with respect to the normal direction of the surface. In the embodiment shown in FIG. 10, a polarization camera system 1010 is used as the imaging system to capture images of the surface 1002, including the portions illuminated by the physical illumination source 1004 (e.g., including the particular point 1008). The polarization camera system 1010 captures images the surface 1002 from different poses 1012, such as by moving the polarization camera system 1010 from one pose to the next, and capturing polarization raw frames from each pose. In the embodiment shown in FIG. 10, the polarization camera system 1010 images the surface 1002 at a fronto-parallel observer angle β of 0° in first pose 1012A (e.g., a fronto-parallel view from directly above or aligned with the surface normal 1014 at the point 1008), at an intermediate observer angle β such as an angle of 45° with respect to the surface normal 1014 in second pose 1012B, and at a shallow observer angle β (e.g., slightly less than 90°, such as 89°) with respect to the surface normal 1014 in third pose 1012C.

As discussed above, a polarization camera system 1010 is generally configured to capture polarization raw frames with polarization filters at different angles (e.g., with a polarization mosaic having four different angles of polarization in the optical path of a single lens and sensor system, with an array of four cameras, each of the cameras having a linear polarization filter at a different angle, with a polarizing filter set at a different angle for different frames captured at different times from the same pose, or the like).

Each of these perspectives or poses 1012 gives a different polarization signal due to the nature of the physics of polarization. Accordingly, by capturing images of the surface 1002 from different observer angles, a model of the BRDF of the material can be estimated based on interpolating between the images captured with the physical illumination source 1004 at one or more closest corresponding incident angles α by the camera system at the one or more poses 1012 having closest corresponding observer angles β.

Methods for generating empirical plenoptic models (e.g., polarization models) of materials based on sampling are described in more detail in PCT Patent Application No. US21/12073; filed in the United States Patent and Trademark Office on Jan. 4, 2021, the entire disclosure of which is incorporated by reference herein.

Referring back to FIG. 9, in some embodiments, in operation 970 the synthetic data generator 40 sets a virtual background for the scene. In some embodiments, the virtual background is an image captured using the same imaging modality as the modality being simulated by the synthetic data generator 40. For example, in some embodiments, when generating synthetic polarization images, the virtual background is a real image captured using a polarization camera, and when generating synthetic thermal images, the virtual background is a real image captured using a thermal camera. In some embodiments, the virtual background is an image of an environment similar to the environments in which the trained machine learning model is intended to operate (e.g., a manufacturing facility or factory in the case of computer vision systems for manufacturing robots). In some embodiments, the virtual background is randomized, thereby increasing the diversity of the synthetic training data set.

In operation 990, the synthetic data generator 40 renders the 3-D scene based on the specified imaging modality (e.g., polarization, thermal, etc.) using one or more of the empirically derived, modality-specific models of materials. Some aspects of embodiments of the present disclosure relate to rendering images based on an empirical model of a material according to one embodiment of the present disclosure. The empirical model of the material may be developed as discussed above, based on samples collected from images captured of real-world objects made of the material of interest.

Generally, a 3-D computer graphics rendering engine generates 2-D renderings of virtual scenes by computing the color of each pixel in the output image in accordance with the color of a surface of the virtual scene that is depicted by that pixel. For example, in a ray tracing rendering engine, a virtual ray of light is emitted from the virtual camera into the virtual scene (in reverse of the typical path of light in the real world), where the virtual ray of light interacts with the surfaces of 3-D models of objects in the virtual scene. These 3-D models are typically represented using geometric shapes such as meshes of points that define flat surfaces (e.g., triangles), where these surfaces may be assigned materials that describe how the virtual ray of light interacts with the surface, such as reflection, refraction, scattering, dispersion, and other optical effects, as well as a texture that represents the color of the surface (e.g., the texture may be a solid color or may be, for example, a bitmap image that is applied to the surface). The path of each virtual ray of light is followed (or "traced") through the virtual scene until it reaches a light source in the virtual scene (e.g., a virtual light fixture) and the accumulated modifications of the textures encountered along the path from the camera to the light source are combined with the characteristics of the light source (e.g., color temperature of the light source) to compute the color of the pixel. This general process may be modified as understood by those skilled in the art, such as performing anti-aliasing (or smoothing) by tracing multiple rays through different parts of each pixel and computing the color of the pixel based on a combination (e.g., average) of the different colors computed by tracing the different rays interacting with the scene.

Systems and methods for rendering plenoptic images (e.g., polarization images or images in polarization representation spaces) based on these empirical plenoptic models are described in more detail in PCT Patent Application No. US21/12073; filed in the United States Patent and Trademark Office on Jan. 4, 2021, the entire disclosure of which is incorporated by reference herein.

Accordingly, aspects of embodiments of the present disclosure relate to simulation environments that are configured to simulate the 3D geometry of the objects of interest (e.g., the types of objects whose poses are to be estimated by the pose estimator 100), lighting conditions, and material properties. The simulation of material properties includes the ability to simulate various physical phenomena including specular reflections, material color, roughness, and the polarization of light and its reflections from the different materials, where at least some plenoptic material properties, such as polarization of light, are simulated based on empirical models of materials.

Data Generation Using Simulation

Figure 11:
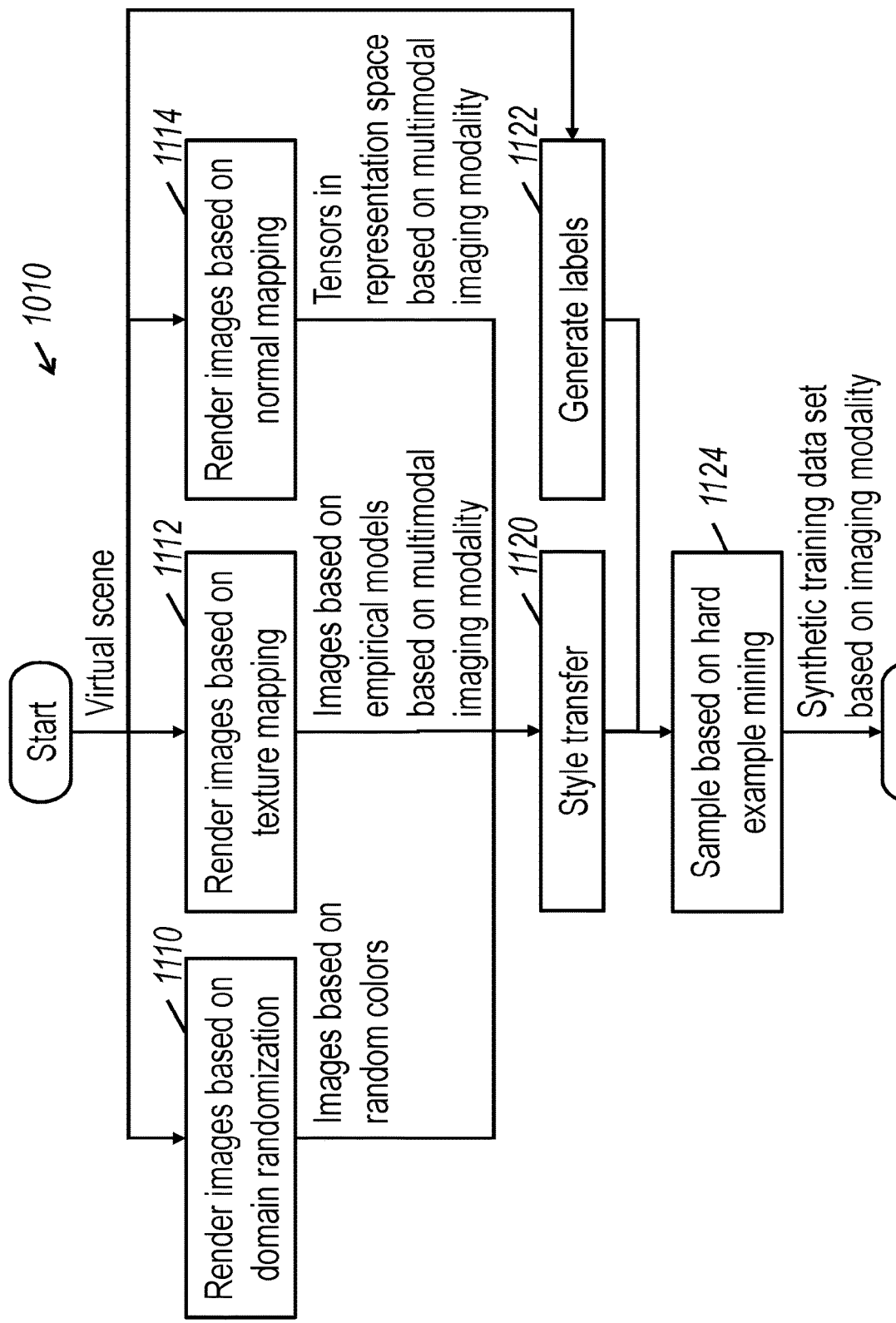
FIG. 11 is a flowchart depicting a method for generating a training data set according to one embodiment of the present disclosure.

Some aspects of embodiments of the present disclosure relate to combinations of the above techniques for generating synthetic images for training machine learning models. FIG. 11 is a flowchart depicting a method for generating a training data set according to one embodiment of the present disclosure. One or more virtual scenes representative of the target domain may be generated as discussed above (e.g., for generating images of bins of components, by selecting one or more 3-D models of components and dropping instances of the 3-D models into a container). For example, some aspects of embodiments of the present disclosure relate to forming a training data set based on: (1) images generated purely by domain randomization in operation 1110, (2) images generated purely through texture mapping (e.g., applying plenoptic materials to the surfaces of the objects) in operation 1112, and (3) images generated purely through normal mapping (e.g., polarization space feature maps such as in DOLP ρ and AOLP φ images generated based on the surface normals of the objects) in operation 1114.

In addition, the training data set may include images generated using models of materials generated by interpolating between different empirically generated models, as parameterized in embedding space, as discussed above.

In some embodiments of the present disclosure, the images generated in accordance with (1) domain randomization, (2) texture mapping, and (3) normal mapping are further processed by applying style transfer or other filter to the generated image in operation 1120, respectively, before adding the image to the training data set. Applying style transfer causes images that appear somewhat different, as generated using the three techniques described above, to have a more consistent appearance. In some embodiments, the style transfer process transforms the synthesized input images to appear more similar to an image captured based on the imaging modality of interest (e.g., causing images generated using (1) domain randomization and feature maps generated using (3) normal mapping to appear more like polarization raw frames) or by causing the synthesized input images to appear more artificial, such as by applying an unrealistic painterly style to the input images (e.g., causing images generated using (1) domain randomization, (2) renderings using texture mapping, and feature maps generated using (3) normal mapping to appear like a painting made with a paintbrush on canvas).

In some embodiments, a neural style transfer network is trained and used to perform the style transfer in operation 1120 on the images selected for the training data set, such as SytleGAN (see, e.g., Karras, Tero, et al. "Analyzing and improving the image quality of stylegan." *Proceedings of the IEEE/CVF Conference on Computer Vision and Pattern Recognition.* 2020.) for complex global style transfers; patched based networks (see, e.g., Chen, Tian Qi, and Mark Schmidt. "Fast patch-based style transfer of arbitrary style." arXiv preprint arXiv:1612.04337 (2016).) for local style transfers; and networks using domain adaptation (see, e.g., Dundar, Aysegul, et al. "Domain stylization: A strong, simple baseline for synthetic to real image domain adaptation." arXiv preprint arXiv:1807.09384 (2018)). As a result, all of the images in the training data set may have a similar style or appearance regardless of the method by which the images were obtained (e.g., whether through (1) domain randomization, (2) texture mapping, (3) normal mapping, or other sources such as real images of objects as captured using an imaging system implementing the modality of interest, such as polarization imaging or thermal imaging), as transformed by a style transfer operation.

In addition, some aspects of embodiments of the present disclosure relate to performing additional or other data augmentations to the generated images including but not limited to: style randomization, gaussian noise, affine transformations, edge blur and distortion.

When generating training data for supervised learning, the synthetic data generator 640 also automatically generates labels (e.g., desired outputs) for the synthesized images in operation 1124. For example, when generating training data for training a machine learning model to perform an image classification task, the generated label for a given image may include the classes of the objects depicted in the image. These classification label may be generated by identifying each unique type of object that is visible in the virtual scene. As another example, when generating training data for training a machine learning model to perform an instance segmentation task, the generated label may include a segmentation map where each instance of each object is uniquely identified (e.g., with a different instance identifier) along with its class (e.g., where objects of the same type have the same class identifier). For example, a segmentation map may be generated by tracing rays from the camera into the virtual scene, where each ray may intersect with some first surface of the virtual scene. Each pixel of the segmentation map is labeled accordingly based on the instance identifier and class identifier of the object containing the surface that was struck by the ray emitted from the camera through the pixel. As still another example, when generating training data for training a keypoint detector a keypoints are selected using standard 3-D keypoint selection methods. In some embodiments the farthest point algorithm is used to select keypoints on the 3-D model that are as far apart from each other as possible, thus forcing them to be on different parts of the object.

In some embodiments of the present disclosure, the images for the training data set are sampled in operation 1124 from the synthesized data sets (1), (2), and (3) based on hard example mining (see, e.g., Smirnov, Evgeny, et al. "Hard example mining with auxiliary embeddings." *Proceedings of the IEEE Conference on Computer Vision and Pattern Recognition Workshops.* 2018.) Using hard example mining to sample the synthesized data sets can improve the efficiency of the training process by reducing the size of the training set to remove substantially redundant images that would not have much impact on the training process while keeping the "hard examples" that have more of an impact on the resulting trained model.

As discussed above, and referring to FIG. 1 the resulting training data set of synthesized data 642 generated by the synthetic data generator 640 is then used as training data 605 by a model training system 607 to train a model 630, such as a pre-trained model or a model initialized with random parameters, to produce a trained model 632. Continuing the example presented above in the case of generating training data in accordance with a polarization imaging modality, the training data set 605 may be used to train the model 630 to operate on polarization input features such as polarization raw frames (e.g., the images generated through texture mapping) and tensors in polarization representation spaces (e.g., images generated through normal mapping).

Accordingly, the training data 605 including the synthesized data 642 is used to train or retrain a machine learning model 630 to perform a computer vision task based on a particular imaging modality. For example, synthetic data in accordance with a polarization imaging modality may be used to retrain a convolutional neural network that may have been pre-trained to perform instance segmentation based on standard color images to perform instance segmentation based on polarization input features.

In deployment, a trained model 632 trained based on training data generated in accordance with embodiments of the present disclosure is then configured to take input similar to the training data such as polarization raw frames and/or tensors in polarization representation spaces (where these input images are further modified by the same style transfer, if any, that was applied when generating the training data) to generate predicted outputs such as segmentation maps. For example, in some embodiments, models trained to perform tasks such as instance segmentation and keypoint detection are used by the pose estimator 100 to compute segmentation maps and to detect keypoints in operations 230 and 270, respectively, as shown in FIG. 2A. Examples of architectures appropriate for these computer vision tasks include, but are not limited to: Mask R-CNN for segmentation and keypoint (see, e.g., He, Kaiming, et al. "Mask R-CNN." *Proceedings of the IEEE International Conference on Computer Vision.* 2017), U-Net (see, e.g., Ronneberger, Olaf, Philipp Fischer, and Thomas Brox. "U-net: Convolutional networks for biomedical image segmentation." *International Conference on Medical Image Computing and Computer-Assisted Intervention.* Springer, Cham, 2015), and AdaptIS (see, e.g., Sofiiuk, Konstantin, Olga Barinova, and Anton Konushin. "Adaptis: Adaptive Instance Selection Network." *Proceedings of the IEEE/CVF International Conference on Computer Vision.* 2019).

Accordingly, while comparative systems for computing pose estimates rely on either real world training data or specific depth sensors to achieve generalized 6DoF performance, embodiments of the present disclosure can be applied to any type of object for which an accurate 3-D model (e.g., CAD model) is available. The systems and methods can also be applied to any imaging technique, so long as the output resembles something that is achievable with the generation of simulated data. In addition, embodiments of the present disclosure may also be used to train neural networks to perform computer vision tasks based on higher-dimensional optical data, such as information from polarization cues. Accordingly, some embodiments of the present disclosure relate to combinations of deep learning models (e.g., convolutional neural networks) trained based on training data generated by a rendering engine according to embodiments of the present disclosure, including training based on polarization cues, for performing six degree of freedom (6 DoF) pose estimation as discussed above.

Object Level Correspondences Using Segmentation

When multiple cameras that are spaced apart are used for image capture, each of the multiple cameras (e.g. main and support cameras 10, 30) may capture an image of one or more objects of interest, from a different viewpoint. Instance segmentation maps (also referred to as instance segmentation masks) may be generated to identify and delineate the objects in the captured images. Although the same objects are depicted in the various images, the instance segmentation maps generated based on the various images may differ when the images depict the objects from different viewpoints. Current art mechanisms may perform global pixel-level correspondence for identifying a block of pixels of the first image that correspond to a group of pixels of the second image. Such correspondence may be desirable for performing depth estimation for each object instance. Computing pixel-level correspondences on a global level (e.g. for an entire image), however, may be computationally expensive. Accordingly, it is desirable to have a more efficient way of finding correspondences of portions of images depicting different viewpoints of the same object.

In general terms, embodiments of the present disclosure are directed to reducing a search space for conducting image processing tasks such as, for example, pixel-level correspondence. In one embodiment, instance segmentation is performed to identify different instances of objects in images portraying a scene as viewed from different viewpoints, and instance segmentation maps/masks may be generated in response to the instance segmentation operation. The instance segmentation masks may then be employed for computing object level correspondences.

In one embodiment, object level correspondence allows the matching of a first instance of an object appearing in a first image that depicts a first viewpoint, to a second instance of the same object appearing in a second image that depicts a second viewpoint. Once object level correspondence is performed, the search space for performing, for example, pixel-level correspondence, may be limited to the regions of the image that correspond to the same object. Reducing the search space in this manner may result in faster processing of pixel-level correspondence and other similar tasks.

Figure 12:
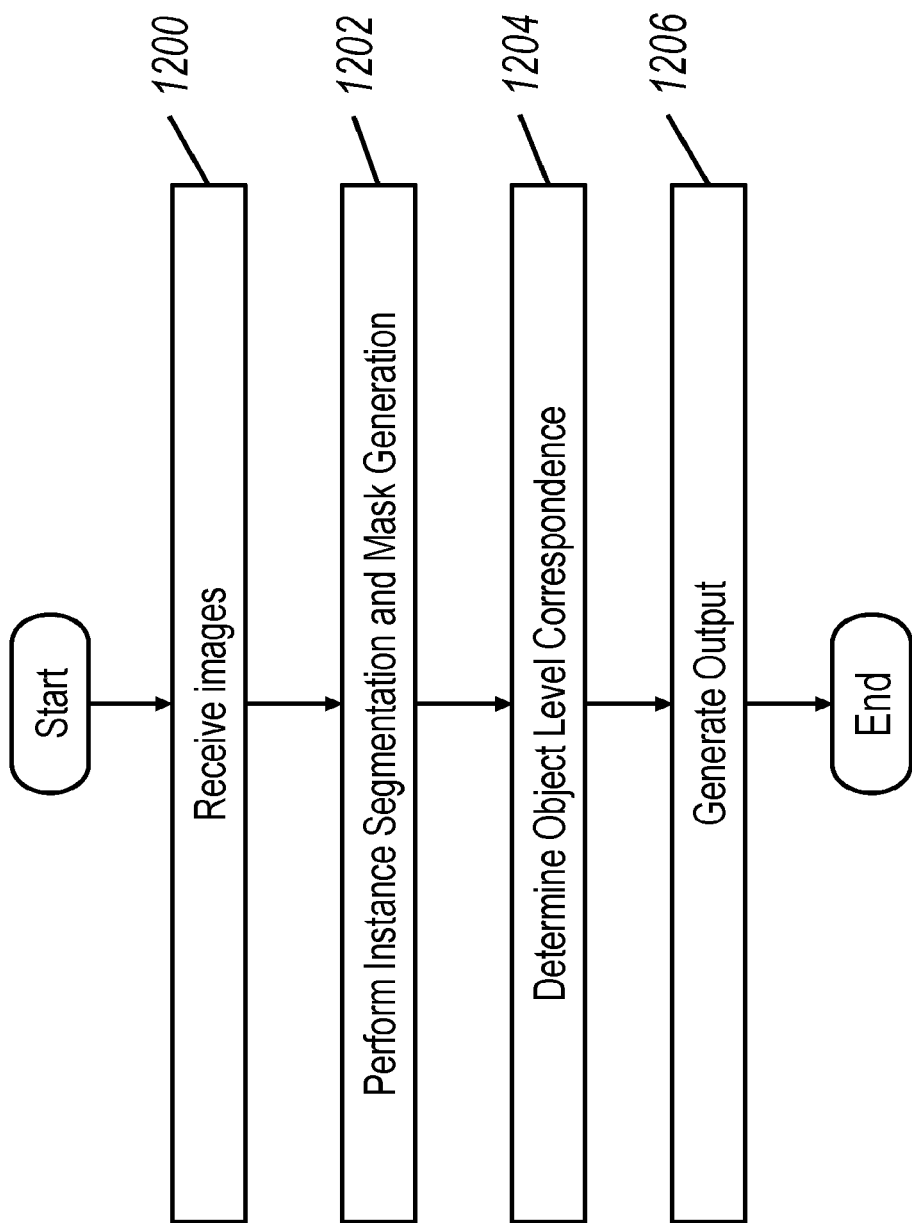
FIG. 12 is a flow diagram of a process for object level correspondence according to one embodiment.

FIG. 12 is a flow diagram of a process for object level correspondence according to one embodiment. The process may be implemented by one or more processing circuits or electronic circuits that are components of the pose estimator 100. It should be understood that the sequence of steps of the process is not fixed, but can be modified, changed in order, performed differently, performed sequentially, concurrently, or simultaneously, or altered into any desired sequence, as recognized by a person of skill in the art.

The process starts, and at block 1200, the pose estimator 100 receives multi-view images from the main and support cameras 10, 30. A first image captured by one of the cameras may depict one or more objects in a scene from a first viewpoint, and a second image captured by a second camera may depict the one or more objects in the scene from a second viewpoint different from the first viewpoint. The images captured by the cameras may be, for example, polarized images and/or images that have not undergone any polarization.

At block 1202 the pose estimator 100 performs instance segmentation and mask generation based on the captured images. In this regard, the pose estimator 100 classifies various regions (e.g. pixels) of an image captured by a particular camera 10, 30 as belonging to particular classes of objects. Each of the different instances of the objects in the image may also be identified, and unique labels be applied to each of the different instances of objects, such as by separately labeling each object in the image with a different identifier.

In one embodiment, segmentation masks delineating the various object instances are also be generated. Each segmentation mask may be a 2-D image having the same dimensions as the input image, where the value of each pixel may correspond to a label (e.g. a particular instance of the object depicted by the pixel). A different segmentation mask may be generated for different images depicting different viewpoints of the objects of interest. For example, a first segmentation mask may be generated to depict object instances in a first image captured by a first camera, and a second segmentation mask may be generated to depict object instances in a second image captured by a second camera. As convolutional neural network such as, for example, a Mask R-CNN, may be employed for generating the segmentation masks.

At block 1204, the pose estimator 100 engages in object-level correspondence of the objects identified in the segmentation masks. In this regard, the pose estimator may invoke a matching algorithm to identify a segmented instance of a particular object in one image as corresponding (or matching) a segmented instance of the same object in another image. The matching algorithm may be constrained to search for matching object instances along an epipolar line through an object instance in one image to find a corresponding object instance in a different image. In one embodiment, the matching algorithm compares different features of the regions corresponding to the segmented object instances to estimate the object correspondence. The matching of object instances from one image to another may narrow a search space for other image processing tasks such as, for example, performing pixel level correspondence or keypoint correspondence. The search space may be narrowed to the identified regions of the images that are identified as corresponding to the same object.

At block 1206, the pose estimator 100 generates an output based on the object-level correspondence. The output may be, for example, a measure of disparity or an estimated depth (e.g., distance from the cameras 10, 30) of the object based on the disparity between corresponding instances as depicted in the various images. In one embodiment, the output is a three-dimensional relative pose between the first instance of the object and the second instance of the object, as computed based on, for example, multi-view keypoint perspective-n-point and/or subsequent pose refinement as discussed above with respect to FIGS. 2A, 3, 4 and 5.

Figure 13:
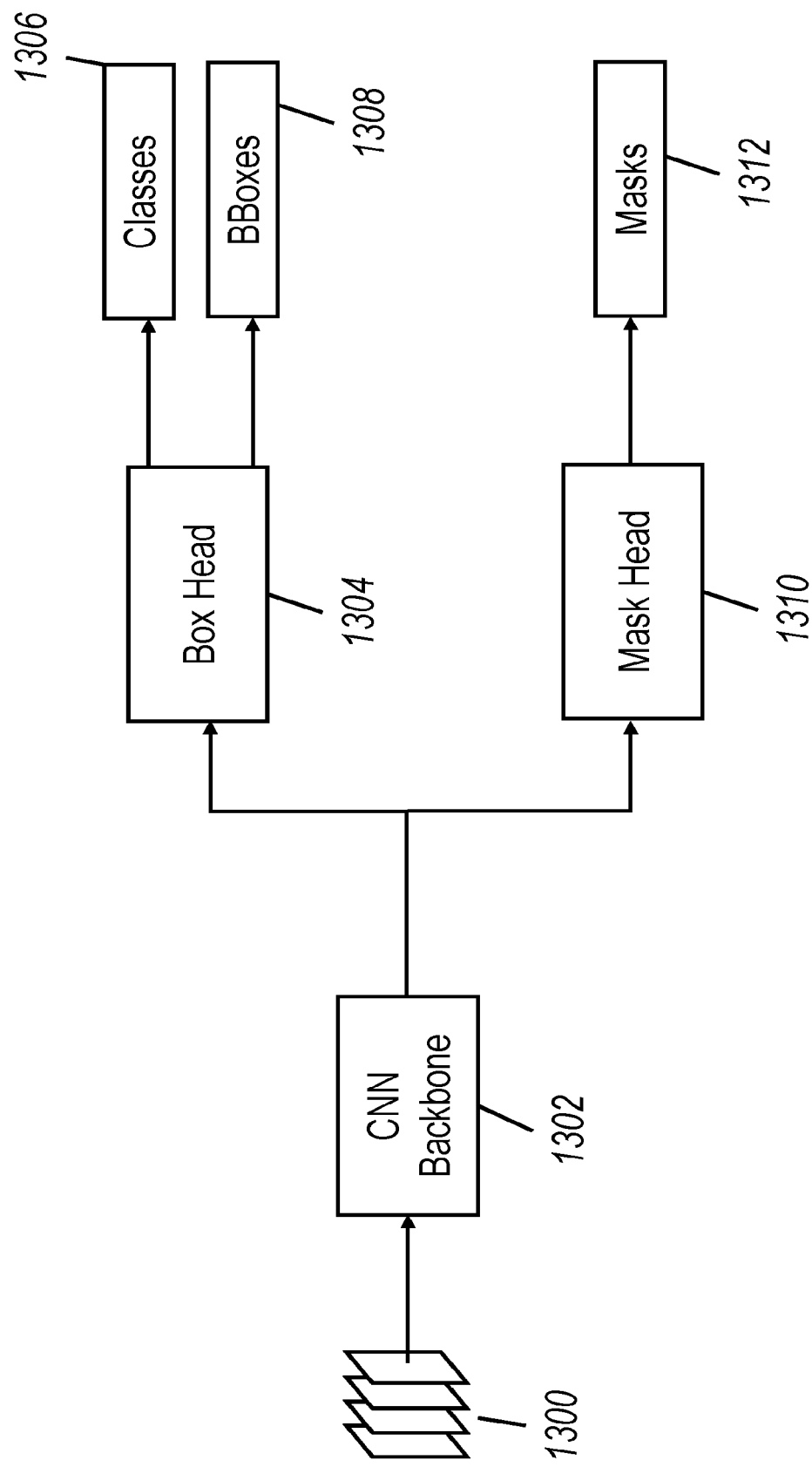
FIG. 13 is a block diagram of an architecture for instance segmentation and mask generation of step according to one embodiment.

FIG. 13 is a block diagram of an architecture for instance segmentation and mask generation of step 1002 according to one embodiment. Input images 1300 captured by the various cameras 10, 30 are provided to a deep learning network 1302 such as, for example, a CNN backbone. In the embodiments where the images include polarized images, the deep learning network may be implemented as a Polarized CNN backbone as described in PCT Patent Application No. US2020/048604, the content of which is incorporated herein by reference.

In one embodiment, the deep learning network 1302 is configured to generate feature maps based on the input images 1300, and employ a region proposal network (RPN) to propose regions of interest from the generated feature maps. The proposals by the CNN backbone may be provided to a box head 1304 for performing classification and bounding box regression. In one embodiment, the classification outputs a class label 1306 for each of the object instances in the input images 1300, and the bounding box regression predicts bounding boxes 1308 for the classified objects. In one embodiment, a different class label 1306 is provided to each instance of an object.

Figure 15:
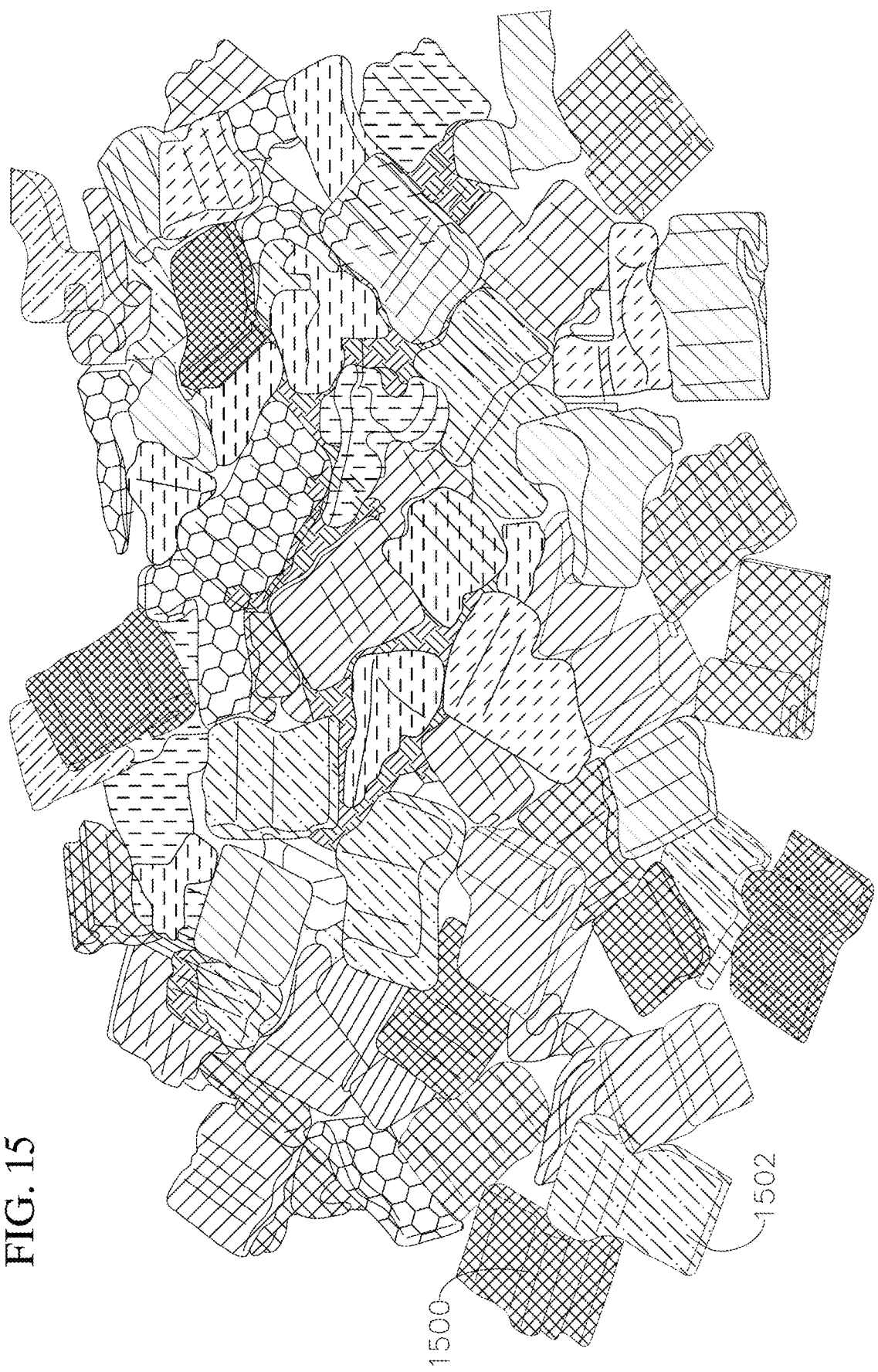
FIG. 15 is an instance segmentation mask generated for the image 211-L in FIG. 2B according to one embodiment.

The proposals by the CNN backbone may also be provided to a mask head 1310 for generating instance segmentation masks. The mask head 1306 may be implemented as a fully convolutional network (FCN). In one embodiment, the mask head 1310 is configured to encode a binary mask for each of the object instances in the input images 1300. An example instance segmentation mask is depicted in FIG. 15.

Figure 14:
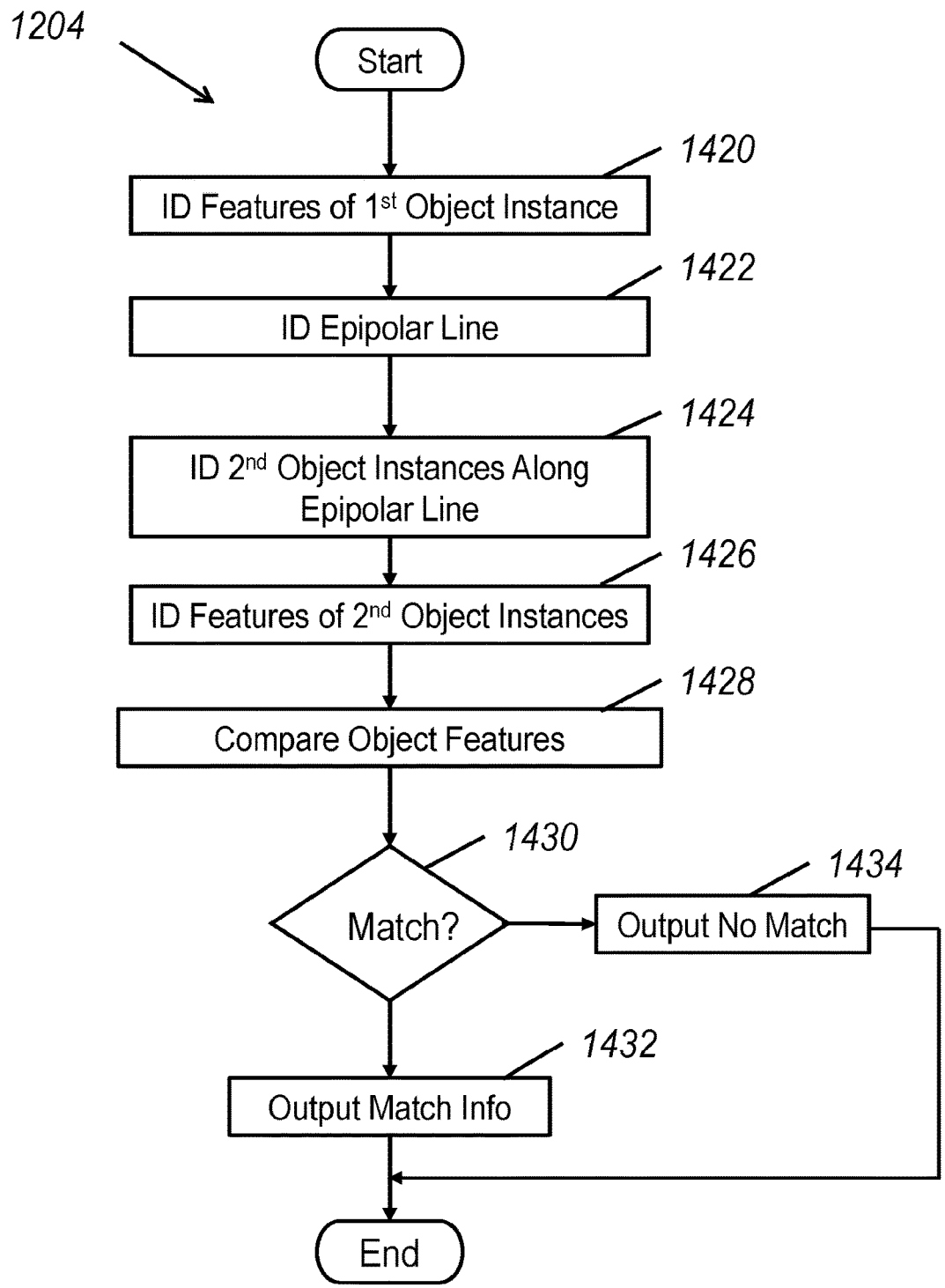
FIG. 14 is a more detailed flow diagram of a matching algorithm employed at step 1204 (FIG. 12) for identifying object-level correspondence for a particular object instance in a first segmentation mask according to one embodiment.

FIG. 14 is a more detailed flow diagram of a matching algorithm employed at step 1204 (FIG. 12) for identifying object-level correspondence for a particular object instance in a first segmentation mask according to one embodiment. The process may repeat for all object instance identified in the first segmentation mask. The sequence of steps of the process of FIG. 14 is not fixed, but can be modified, changed in order, performed differently, performed sequentially, concurrently, or simultaneously, or altered into any desired sequence, as recognized by a person of skill in the art.

At block 1420, the matching algorithm identifies features of a first object instance in a first segmentation mask. The identified features for the first object instance may include a shape of the region of the object instance, a feature vector in the region, and/or keypoint predictions in the region. The shape of the region for the first object instance may be represented via a set of points sampled along the contours of the region. Where a feature vector in the region is used as the feature descriptor, the feature vector may be an average deep learning feature vector extracted via a convolutional neural network.

At block 1422, the matching algorithm identifies an epipolar line through the first object instance in the first segmentation mask.

At block 1424, the matching algorithm identifies one or more second object instances in a second segmentation mask that may correspond to the first object instance. A search for the second object instances may be constrained to the epipolar line between the first segmentation map and the second segmentation map that runs through the first object instance. In one embodiment, the matching algorithm searches approximately along the identified epiploar line to identify object instances in the second segmentation mask having a same class identifier as the first object instance. For example, if the first object instance belongs to a "dog" class, the matching algorithm evaluates object instances in the second segmentation mask that also belong to the "dog" class, and ignores objects that belong to a different class (e.g., a "cat" class).

At block 1426, the matching algorithm identifies the features of the second object instances that belong the same class. As with the first object instance, the features of a particular second object instance may include a shape of the region of the second object instance, a feature vector representing the region, and/or keypoint predictions in the region.

At block 1428, the matching algorithm compares the features of the first object instance to the features of second object instances for determining a match. In one embodiment, the matching algorithm identifies a fit between the features of the first object instance and features of the second object instances for selecting a best fit. In one embodiment, the best fit may be identified via a matching function such as the Hungarian matching function. In one embodiment, the features of the object instances are represented as probability distributions, and the matching function attempts to find a match of the probability distributions that minimizes a Kullback-Leibler (KL) divergence.

At block 1430, a determination is made as to whether a match has been found. If the answer is YES, an output is generated at block 1432. The output may include, for example, information (e.g. object ID) of the second object instance that matched the first object instance.

If the answer is NO, an output may be generate indicating a match failure at block 1434.

FIG. 15 is an instance segmentation mask generated for the image 211-L in FIG. 2B according to one embodiment. The segmentation mask may identify each region 1600, 1602 of the image that contains an instance of an identified object, along with their distinctive boundaries. Each identified mask region may take the shape of the object instance that is identified. The pixels within the identified mask region may be associated with one or more values identifying the particular object instance and object type.

Figures 16A, 16B:
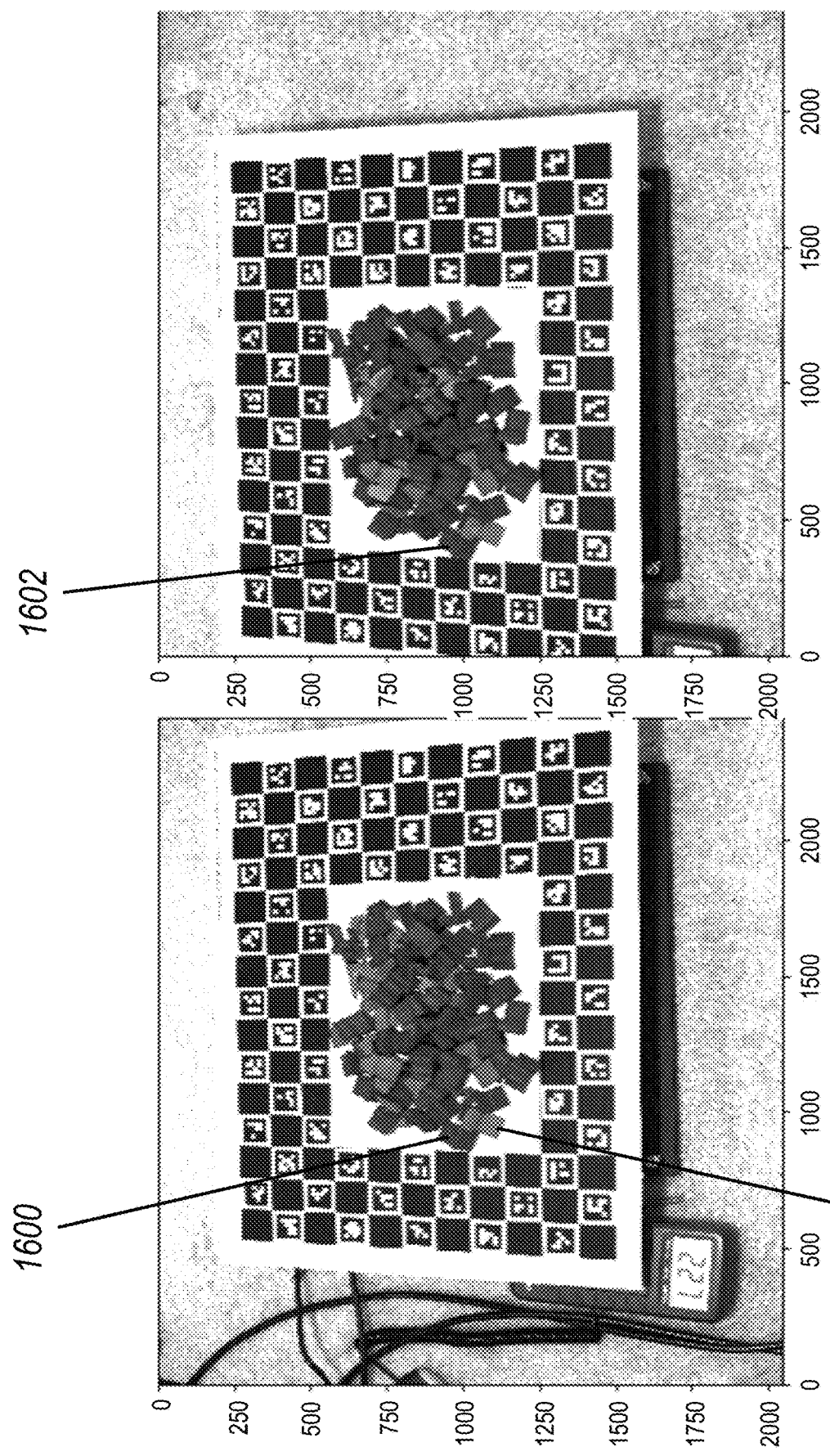
FIG. 16A and FIG. 16B are images depicting results of the process for determining object level correspondence described with respect to FIG. 12, according to one embodiment.

FIG. 16A and FIG. 16B are images depicting results of the process for determining object level correspondence described with respect to FIG. 12, according to one embodiment. In the example of FIGS. 16A and B, the matching is for objects depicted in images 1500a, 1500b. For example, as a result of running the process of FIG. 12, object instance 1600 in FIG. 16A may be identified as corresponding/matching object instance 1602 in FIG. 16B. Certain object instances, however, may result in no match. For example, no match is found for object instance 1604 in FIG. 16A.

Hardware System Auto-Calibration

Some aspects of embodiments of the present disclosure relate to systems and methods for automatic calibration of the camera system, including the main camera 10 and the support cameras 30. Some aspects of embodiments of the present disclosure relate to optimizing a cost function (e.g., as shown in equations 7 and 8, above) when estimating of the poses of objects in a scene imaged by the main camera 10 and the support cameras 30. These cost functions assume that the relative poses associated with each of the viewpoints is known—that is, that the calibration parameters of each of the camera is known.

The camera calibrations generally fall into three categories: camera intrinsics, stereo extrinsics, and device or system extrinsics. Initial estimate of all three can be computed using standard camera calibration, but these initial estimates may be imprecise. Accordingly, some embodiments of the present disclosure relate to active calibration from the parts themselves. In particular, some aspects of embodiments of the present disclosure relate to jointly finding the poses of the objects in the scene and calibrations of the cameras (extrinsic parameters $R_j$, $T_j$ and intrinsic parameters $K_j$ for a j-th camera) by jointly optimizing the below cost function in Equation 14:

$$\min_{R_o, T_o} \min_{R_j, T_j, K_j} \sum_{i:N, j:M} \min_{S \sim v_j} \|[u_{ij}, v_{ij}] - K_j[R_j T_j][R_o T_o][x_i, y_i, z_i]\| \quad (14)$$

Equation 14 represents the reprojection of the keypoints $[x_i, y_i, z_i]$ of 3D objects (indexed by i) to the 2D predicted keypoints $[u_{ij}, v_{ij}]$ (indexed by the current keypoint i as seen from the camera at the j-th viewpoint) using the cameras and object pose matrices. This active calibration using deep learning-based keypoints with arbitrary objects (e.g., as opposed to specialized calibration targets) enables calibration of M cameras using a bin of cluttered parts 22, even using a passive camera system (e.g., without the use of an active light projector).

Figure 17:
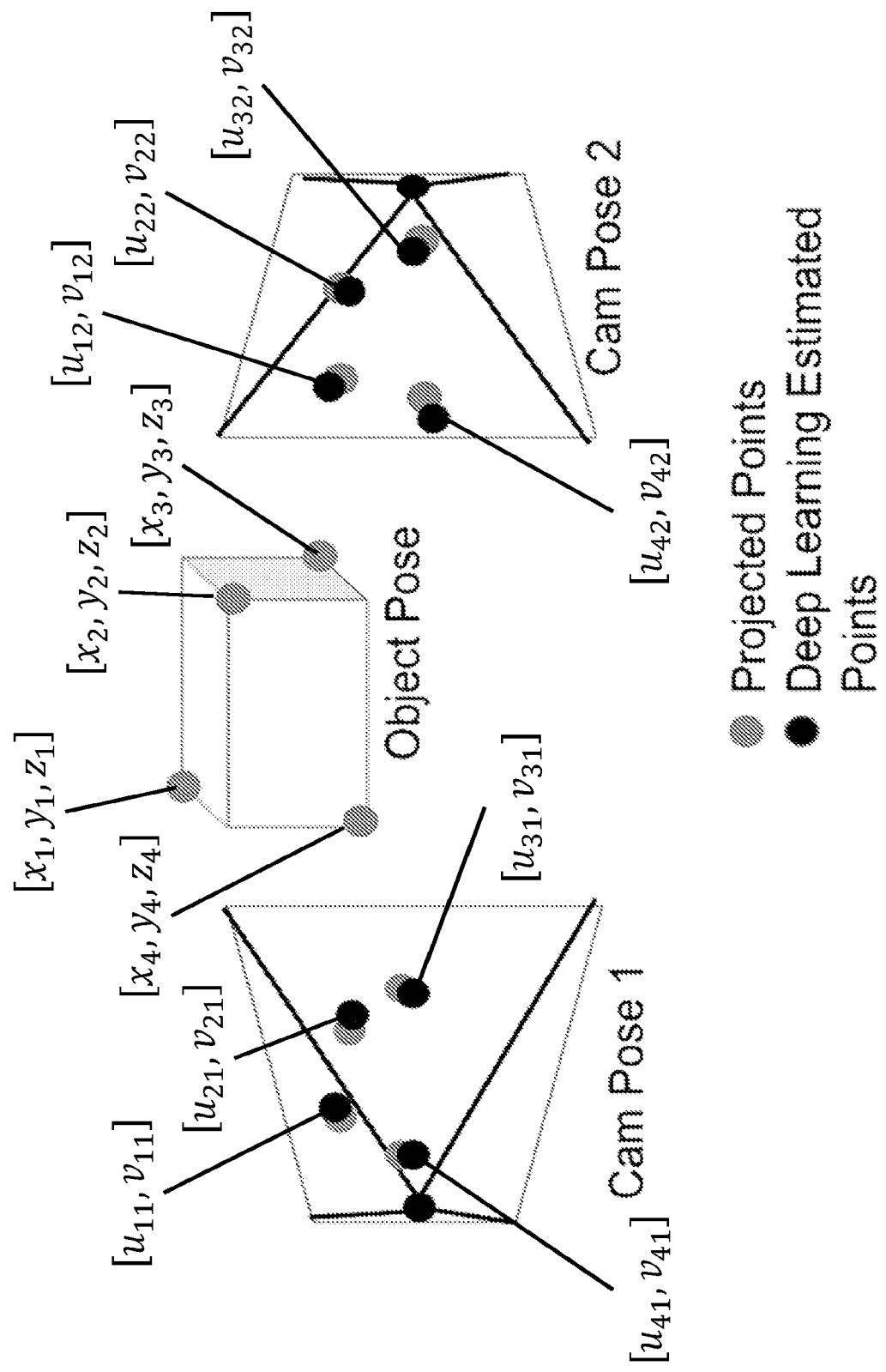
FIG. 17 is a schematic depiction of camera auto-calibration in accordance with one embodiment of the present disclosure.

FIG. 17 is a schematic depiction of camera auto-calibration in accordance with one embodiment of the present disclosure. As shown in FIG. 17, an object 1210 may have a pose within a scene, and may have corresponding 3-D keypoints $[x_1, y_1, z_1]$, $[x_2, y_2, z_2]$, $[x_3, y_3, z_3]$, and $[x_4, y_4, z_4]$. These keypoints are projected into the 2-D image spaces of corresponding to the viewpoints (or poses) of Cam 1 and Cam 2, and these projected points are illustrated as being near their corresponding deep learning estimated points. These deep learning estimated points correspond to 2-D keypoints detected in the 2-D images captured by Cam 1 and Cam 2, and are respectively labeled in FIG. 17 as $[u_{11}, v_{11}]$, $[u_{21}, v_{21}]$, $[u_{31}, v_{31}]$ and $[u_{41}, v_{41}]$ and $[u_{12}, v_{12}]$, $[u_{22}, v_{22}]$, $[u_{32}, v_{32}]$ and $[u_{42}, v_{42}]$. The pose estimator 100 automatically calibrates the camera system (e.g., determines the camera extrinsic parameters and intrinsic parameters) by jointly updating the estimated Object Pose $R_o, T_o$, estimated Cam Pose 1 $R_1$, $T_1$, $K_1$, and estimated Cam Poses 2 $R_2$, $T_2$, $K_2$.

Correlating Camera Space to Robot Space

As noted above, some aspects of embodiments of the present disclosure relate to pose estimation in the context of robotics, such as providing pose estimation for robotics systems to detect the poses of end-effectors (and other portions) of robotic arms and objects within the neighborhood of the robot. These pose estimates may then be used by a robotic controller to control the movement of robotic systems to manipulate and/or navigate around objects that are detected in its workspace or environment.

For example, in some embodiments, once the six degree of freedom (6DoF) pose of an object is computed (e.g., in accordance with FIG. 2A as described above), the pose of the object is correlated to the robot's workspace in a fashion that enables efficient translation of the end-effector to the required position for grasping the object, such as by transforming the pose to a coordinate system used by the robotic controller.

In some embodiments, fiducials (e.g., visually-detectable markers such as ArUco markers) are incorporated on the robot's end-effector to make the pose of the end-effector easier to track. Tracking these fiducials using the multi-view vision system 1, it is possible to easily interface the vision system 1 to the robotic workspace and to reduce the positional error involved in moving the end-effector of a robotic arm to the location of the object to be grasped by the end-effector based on the position of the object as calculated by the pose estimator 100.

Figure 18:
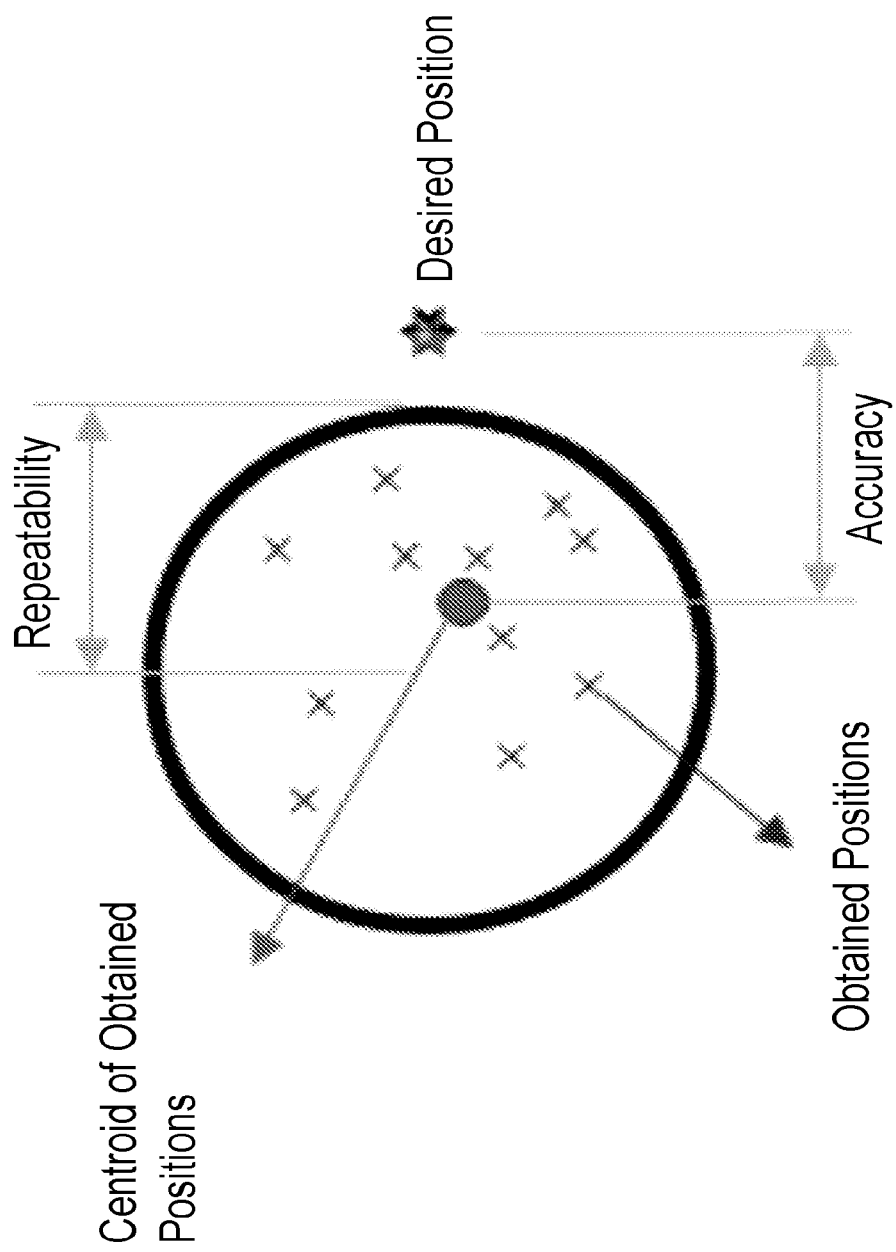
FIG. 18 is a schematic diagram depicting that the accuracy and repeatability of a robotic arm is a function of both the robot's pose and position.

FIG. 18 is a schematic diagram depicting that the accuracy and repeatability of a robotic arm is a function of both the robot's pose and position. As shown in FIG. 18, a robotic arm attempting to move its end-effector to a Desired Position over several different attempts may actually move its end-effector to a cluster of different Obtained Positions. The difference between the Centroid of the Obtained Positions and the Desired Position corresponds to the accuracy (or error) of the robotic system, where a smaller difference corresponds to a higher accuracy. The radius or size of a circle (or sphere or ball) containing all of the obtained positions corresponds to the repeatability of the movements (e.g., a smaller radius corresponds to higher repeatability).

Accordingly, aspects of embodiments of the present disclosure relate to using the multi-view vision system 1 according to one embodiment of the present disclosure to track the end-effector and/or other joints of a robotic arm (e.g., through pose estimation based on fiducials and/or a 3-D model of the end-effector and/or other joints of the robotic arm) to predict the positional error involved in moving the end-effector of the robotic arm to the Desired Position based on both the initial pose and position of the end-effector. In particular, in some embodiments, a multi-view vision system 1 according to embodiments of the present disclosure is combined with a deep learning backend to predict the error involved for every move of the end-effector based on the detected pose of the end-effector and the joints of the robotic arm. These predictions are provided as real-time feedback to the robotic controller to improve the accuracy and repeatability of the movement of the end-effector of the robotic arm to the Desired Position.

Accordingly, aspects of embodiments of the preset disclosure relate to a fully passive multi-view vision system (e.g., without additional light projectors) and that applies a deep learning based keypoint detector to perform join optimization across the multiple views to achieve high-accuracy 6 degree of freedom (6-DoF) pose estimations which otherwise would not be possible with a passive vision system. Passive vision system can be very economical because there is no need for an additional light projector and associated calibration of the light projector and, instead, can be calibrated using fiducials and/or autocalibration using the detected objects in a scene while still achieving high performance depth accuracy using deep learning and joint optimization.

In some embodiments, where the main camera 10 and one support camera are placed 30 cm apart from each other and approximately 1 meter above the objects 22, and where both the main camera 10 and the support camera 30 have two camera modules with 30 degree FoV lenses (e.g., a set of four lenses in the arrangement of FIG. 1E) and 5 megapixel image sensors, the pose estimation system is able to achieve approximately 200 µm pose detection accuracy in the depth direction (e.g., approximately parallel to the optical axes of the main camera 10 and the support camera) and sub 100 µm pose detection translation accuracy (e.g., in directions perpendicular to the optical axes) and 1 degree rotation accuracy, along with 500 µm point cloud accuracy for a variety of heavily cluttered objects and a variety of lighting conditions. These example embodiments of the present disclosure have an experimentally measured cycle time of less than 500 milliseconds (ms), as measured from the time of image capture by the main camera 10 and support cameras 30 until the time of output of the 6DoF poses of the objects and point clouds by the pose estimator 100.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:
1. A method for estimating a pose of an object comprising:
receiving a plurality of images of the object captured from multiple viewpoints with respect to the object;
initializing a current pose of the object based on computing an initial estimated pose of the object from at least one of the plurality of images;
predicting a plurality of 2-D keypoints associated with the object from each of the plurality of images; and
computing an updated pose that minimizes a cost function based on a plurality of differences between the 2-D keypoints and a plurality of 3-D keypoints associated with a 3-D model of the object as arranged in accordance with the current pose, and as projected to each of the viewpoints,
wherein each of the plurality of differences corresponds to a different viewpoint of the viewpoints, and
wherein each of the differences is computed for a viewpoint of the viewpoints based on a difference between:
the plurality of 2-D keypoints associated with an image of the plurality of images corresponding to the viewpoint; and
projecting the 3-D keypoints of the 3-D model arranged in the current pose to the viewpoint,
wherein the cost function is:

$$\min_{R_o, T_o} \sum_{i:N, j:M} c_{ij} \|[u_{ij}, v_{ij}] - K_j[R_jT_j][R_oT_o][x_i, y_i, z_i]\|$$

wherein $R_o$, $T_o$ is the pose of the object, i is an index iterating through N 3-D keypoints, j is an index iterating through M viewpoints, $c_{ij}$ is a confidence for a corresponding keypoint prediction $[u_{ij}, v_{ij}]$ of an i-th keypoint in an image for corresponding to a j-th viewpoint, $R_j$, $T_j$, $K_j$ are extrinsic parameters and intrinsic parameters of a j-th camera used to capture an image from a j-th viewpoint, and $[x_i, y_i, z_i]$ is an i-th 3-D keypoint.

2. A method for estimating a pose of an object comprising:
receiving a plurality of images of the object captured from multiple viewpoints with respect to the object;
initializing a current pose of the object based on computing an initial estimated pose of the object from at least one of the plurality of images;
predicting a plurality of 2-D keypoints associated with the object from each of the plurality of images; and
computing an updated pose that minimizes a cost function based on a plurality of differences between the 2-D keypoints and a plurality of 3-D keypoints associated with a 3-D model of the object as arranged in accordance with the current pose, and as projected to each of the viewpoints,
wherein each of the plurality of differences corresponds to a different viewpoint of the viewpoints, and
wherein each of the differences is computed for a viewpoint of the viewpoints based on a difference between:
the plurality of 2-D keypoints associated with an image of the plurality of images corresponding to the viewpoint; and
projecting the 3-D keypoints of the 3-D model arranged in the current pose to the viewpoint,
wherein the cost function further accounts for symmetries in the object in accordance with:

$$\min_{R_o, T_o} \sum_{i:N, j:M} \min_{S \sim v_j} c_{ij} \|[u_{ij}, v_{ij}] - K_jS[R_jT_j][R_oT_o][x_i, y_i, z_i]\|$$

wherein $R_o$, $T_o$ is the pose of the object, i is an index iterating through N 3-D keypoints, j is an index iterating through M viewpoints, $c_{ij}$ is a confidence for a corresponding keypoint prediction $[u_{ij}, v_{ij}]$ of an i-th keypoint in an image from a j-th viewpoint, $R_j$, $T_j$, $K_j$ are extrinsic parameters and intrinsic parameters of the j-th camera used to capture the images from a j-th viewpoint, $[x_i, y_i, z_i]$ is an i-th 3-D keypoint, S is a transform between different symmetries of the object, and $v_j$ is the j-th view.

* * * * *